United States Patent
Chen et al.

(10) Patent No.: US 10,364,319 B2
(45) Date of Patent: Jul. 30, 2019

(54) RING-OPENING POLYMERIZATION METHODS AND RECYCLABLE BIORENEWABLE POLYESTERS

(71) Applicant: Colorado State University Research Foundation, Fort Collins, CO (US)

(72) Inventors: Eugene Y. Chen, Fort Collins, CO (US); Miao Hong, Fort Collins, CO (US); Xiaoyan Tang, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 0 days.

(21) Appl. No.: 15/565,572

(22) PCT Filed: Apr. 11, 2016

(86) PCT No.: PCT/US2016/026961
§ 371 (c)(1),
(2) Date: Oct. 10, 2017

(87) PCT Pub. No.: WO2016/164911
PCT Pub. Date: Oct. 13, 2016

(65) Prior Publication Data
US 2018/0118880 A1 May 3, 2018

Related U.S. Application Data

(60) Provisional application No. 62/306,183, filed on Mar. 10, 2016, provisional application No. 62/298,236, filed on Feb. 22, 2016, provisional application No. 62/145,940, filed on Apr. 10, 2015.

(51) Int. Cl.
*C08G 63/08* (2006.01)
*C08G 63/82* (2006.01)
*C08G 69/14* (2006.01)

(52) U.S. Cl.
CPC ........... *C08G 63/08* (2013.01); *C08G 63/823* (2013.01); *C08G 69/14* (2013.01)

(58) Field of Classification Search
USPC ........................................ 528/355, 357, 359
See application file for complete search history.

(56) References Cited

U.S. PATENT DOCUMENTS

| 6,093,201 A | 7/2000 | Cooper et al. |
| 6,673,946 B2 | 1/2004 | Manzer |
| 2009/0124787 A1 | 5/2009 | Preishuber-Pflugl et al. |
| 2010/0121021 A1 | 5/2010 | Magnet et al. |
| 2014/0275325 A1 | 9/2014 | Martin et al. |

FOREIGN PATENT DOCUMENTS

| CN | 101313900 B | 1/2012 |
| DE | 102008052711 A1 | 4/2010 |
| JP | 2000281767 A | 10/2000 |
| JP | 2003252968 A | 9/2003 |

OTHER PUBLICATIONS

Chen, E.Y.., "Coordination Polymerization of Polar Vinyl Monomers by Single-site Metal Catalysts," Chem Rev., 109(11):5157-5214, Nov. 2009.
Duda et al., "Oligomerization and Copolymerization of γ-Butyrolactone—A Monomer Known as Unable to Homopolymerize, 1. Copolymerization with ε-Caprolactone," Macromol Chem Phys., 197(4):1273-1283 , Apr. 1996.
Hong et al., "Coordination Ring-Opening Copolymerization of Naturally Renewable α-Methylene-γ-butyrolactone into Unsaturated Polyesters," Macromolecules, 47(11):3614-3624, May 2014.
International Search Report and Written Opinion of the ISA/US dated Oct. 26, 2016 in International Application No. PCT/US2016/026961; 9pgs.
Korte et al, "Hochdruckreaktionen. II. Die Polymerisation von γ-Butyrolacton und δ-Valerolactam bei Hohen Drücken," J Polym Sci Pol Lett., 4:685-689, Oct. 1966.
Martin et al., "Medical Applications of Poly-4-Hydroxybutyrate: A Strong Flexible Absorbable Biomaterial," Biochem Eng J., 16(2):97-105, Nov. 2003.
Moore et al., "Chemosynthesis of Bioresorbable Poly(Gamma-Butyrolactone) by Ring-Opening Polymerisation: A Review," Biomaterials, 26(18):3771-3782, Jun. 2005.
Nobes et al., "Lipase-Catalyzed Ring-Opening Polymerization of Lactones: A Novel Route to Poly(hydroxyalkanoate)s," Macromolecules, 29(14):4829-4833, Jul. 1996.
Yamashita et al., "Acid-catalyzed Ring-opening Polymerization of γ-Butyrolactone under High-pressure Conditions," Chem Lett., 43(2):213-215, Feb. 2014.
Hoskins et al., "Cyclic Polyesters: Synthetic Approaches and Potential Applications," Polym. Chem., 2:289-299, Feb. 2011.

*Primary Examiner* — Terressa Boykin
(74) *Attorney, Agent, or Firm* — Haukaas Fortius PLLC; Michael H. Haukaas

(57) ABSTRACT

The invention provides polymers of Formulas I-III, such as polyesters and unsaturated polyesters, and crosslinked and copolymerized polymers thereof. The invention also provides methods to catalytically ring-open five-membered rings such lactones, lactams, and thiolactones, as via ring-opening polymerization. The polymerization products are recyclable and can be depolymerized back to their monomer form via thermolysis and acid or base catalysis.

23 Claims, 22 Drawing Sheets

RING-OPENING POLYMERIZATION METHODS AND RECYCLABLE BIORENEWABLE POLYESTERS

RELATED APPLICATIONS

This application is a National Stage filing under 35 U.S.C. § 371 of International Application No. PCT/US2016/026961 filed Apr. 11, 2016, which claims priority under 35 U.S.C. § 119(e) to U.S. Provisional Patent Application Nos. 62/145,940 filed Apr. 10, 2015, 62/298,236 filed Feb. 22, 2016, and 62/306,183 filed Mar. 10, 2016, which applications are incorporated herein by reference.

GOVERNMENT SUPPORT

This invention was made with government support under Grant No. CHE1300267 awarded by National Science Foundation. The government has certain rights in the invention.

BACKGROUND OF THE INVENTION

Aliphatic polyesters, an important class of technologically important biodegradable and/or biocompatible polymers, are readily accessible via chemical synthesis by ring-opening polymerization (ROP) of cyclic esters or lactones with relatively high strain energy. The five-membered γ-butyrolactone (γ-BL) would be a desirable bio-derived monomer for the chemical synthesis of the biopolyester poly(γ-butyrolactone) (PγBL), as γ-BL is a key downstream chemical of succinic acid that was recently ranked first in Department of Energy's top 12 biomass-derived compounds best suited to replace petroleum-derived chemicals. However, γ-BL, due to its low strain energy, is commonly referred as "non-polymerizable" in textbooks and literature (see, for example, Houk et al., Why δ-valerolactone polymerizes and γ-butyrolactone does not. *J. Org. Chem.* 73, 2674-2678 (2008)). Lipase-catalyzed ROP of γ-BL yielded a mixture of oligomers (~11-mer), while high molecular weight (MW) microbial poly(4-hydroxybutyrate) (P4HB), a structural equivalent of PγBL, which has been shown to exhibit more desired properties as a biomaterial (e.g., faster degradation rates and better mechanical properties) relative to other commonly used aliphatic polyesters, is produced through a bacterial fermentation process. Chemical ROP process has only been realized under ultra-high pressure (e.g., 20,000 atm) and high temperature, producing only oligomers.

Accordingly, there is a need for and techniques for polymerizing five-membered butyrolactones and substituted versions thereof without the need for significant temperature or pressure. There is also a need to identify catalysts for these techniques, a need for the novel polymers of the polymerizations, and a need for copolymers of the resulting products that are biodegradable and recyclable.

SUMMARY

The invention provides a polymer of Formula I or Formula II:

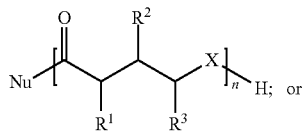

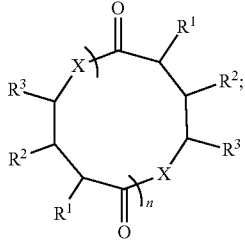

wherein

X is O, S, or NW wherein $R^a$ is H, alkyl, or aryl;

$R^1$ is H, alkyl, aryl, methylene (=CH$_2$), or substituted methylene (=CR$_2$ where each R is independently H, alkyl, aryl, substituted alkyl, or substituted aryl);

$R^2$ is H, alkyl, or aryl;

$R^3$ is H, alkyl, or aryl;

n is about 5 to about 1,000;

Nu is HO—, RO—, RS—, R$_2$N—, or a diol, polyol, or sugar moiety, where each R is independently alkyl, aryl, substituted alkyl, or substituted aryl. In some embodiments, when the polymer is a polymer of Formula I, at least one of $R^1$, $R^2$, and $R^3$ is not H. Accordingly, in some embodiments, $R^1$ or $R^2$ is not H, $R^1$ or $R^3$ is not H, or $R^2$ or $R^3$ is not H.

In additional embodiments, when Nu is a diol, polyol, or sugar moiety, a second hydroxyl moiety of the diol or additional hydroxyl moieties of the polyol or sugar moiety can be Nu of a second or a plurality of additional polymers of Formula I or II, thereby coupling two or more polymer chains together.

In one embodiment, n is about 50 to about 300. In other embodiments, n is about 10 to about 300, about 25 to about 250, about 50 to about 250, about 100 to about 250, or about 100 to about 200.

In one embodiment, X is O. In another embodiment, X is S. In yet another embodiment, X is NR$^a$. In some embodiments, R$_a$ is H, methyl, ethyl, propyl, butyl, or phenyl. In one specific embodiment, X is NH.

One specific value of $R^1$ is H. Another specific value of $R^1$ is methyl. Another specific value of $R^1$ is methylene (=CH$_2$). Another specific value of $R^1$ is substituted methylene (e.g., =CR$_2$ where each R is selected from H, methyl, ethyl, propyl, butyl, phenyl, or substituted versions thereof.

One specific value of $R^2$ is H. Another specific value of $R^2$ is methyl.

One specific value of $R^3$ is H. Another specific value of $R^3$ is methyl.

In some embodiments, two of $R^1$-$R^3$ are H.

In some embodiments, $R^1$ is methylene and one or more moieties of the polymer are crosslinked by photocuring or are functionalized by the thiol-ene reaction, for example, as shown in Scheme Z3 or Z4.

In some embodiments, the polymer of Formula II is a polymer of Formula III:

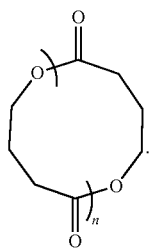

(III)

The variable n can be as defined for Formula II, for example, wherein n is about 10 to about 300. In other embodiments, the polymer of Formula I is a polymer of Formula IV:

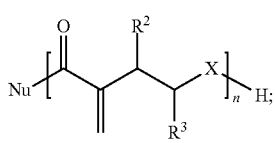

(IV)

wherein X, Nu, n, $R^2$ and $R^3$ are as defined for Formula I. In some embodiments, $R^2$ is H and $R^3$ is Me; $R^2$ is Me and $R^3$ is H; or $R^2$ and $R^3$ are both H. In one embodiment, X is O. In another embodiment, X is S or $NR^a$. In various embodiments, Nu is HO— or RO—, or a crosslinking agent such as a diol or saccharide, as described herein.

In another embodiment, the invention provides a polymer comprising Formula V:

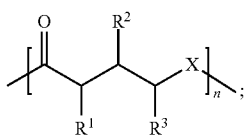

(V)

wherein

X is O, S, or $NR^a$ wherein $R^a$ is H, alkyl, or aryl;

$R^1$ is H, alkyl, aryl, methylene ($=CH_2$), or substituted methylene ($=CR_2$ where each R is independently H, alkyl, aryl, substituted alkyl, or substituted aryl);

$R^2$ is H, alkyl, or aryl;

$R^3$ is H, alkyl, or aryl; and n is about 5 to about 1,000.

In some embodiments, at least one of $R^1$, $R^2$, and $R^3$ is not H. In some embodiments, $R^1$ or $R^2$ is not H, $R^1$ or $R^3$ is not H, or $R^2$ or $R^3$ is not H. The initiator to prepare compounds of Formula V can be a diol, polyol, or sugar moiety. In such instances, a crosslinked polymer of larger molecular weight is obtained. For example, a diol initiator results in a dimer of the polymer of Formula V. A monosaccharide can provide a crosslinked polymer with up to five moieties of Formula V as part of the polymer. Disaccharides and polysaccharides can also be used. These polymers can be further modified via crosslinking by photocuring and/or via functionalization by the thiol-ene reaction.

In a further embodiment, the polymer of Formula V is a polymer of Formula VI:

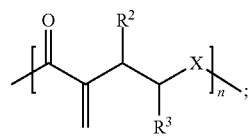

(VI)

wherein X, n, $R^2$ and $R^3$ are as defined for Formula V. In certain embodiments, $R^2$ is H and $R^3$ is Me; $R^2$ is Me and $R^3$ is H; or $R^2$ and $R^3$ are both H. Polymers of Formula I and III can be polymers of Formulas V and VI.

The invention also provides a random copolymer prepared by ring opening copolymerization of a lactone and a compound of Formula X:

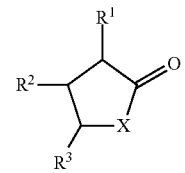

(X)

wherein

X is O, S, or NW wherein $R^a$ is H, alkyl, or aryl;

$R^1$ is H, alkyl, aryl, methylene ($=CH_2$), or substituted methylene ($=CR_2$ where each R is independently H, alkyl, aryl, substituted alkyl, or substituted aryl);

$R^2$ is H, alkyl, or aryl;

$R^3$ is H, alkyl, or aryl;

in the presence of a ring-opening catalyst, to provide the resulting random copolymer. In some embodiments, at least one of $R^1$, $R^2$, and $R^3$ is not H. In some embodiments, $R^1$ or $R^2$ is not H, $R^1$ or $R^3$ is not H, or $R^2$ or $R^3$ is not H.

In one specific embodiment, X is O. In various embodiments, the compound of Formula X is selected from the group consisting of:

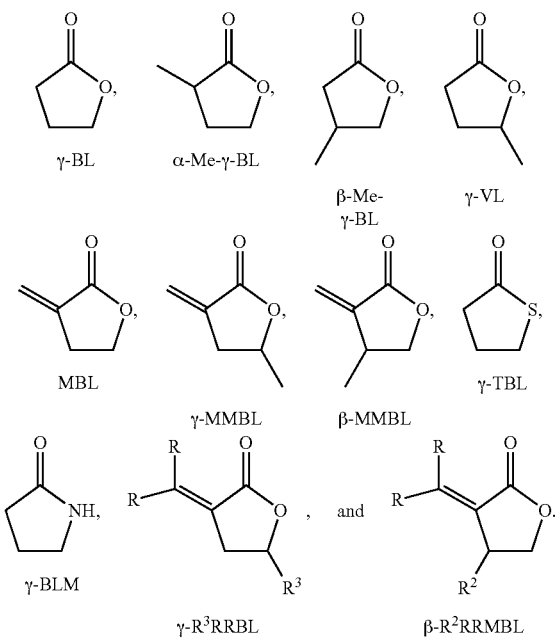

The invention yet further provides a method comprising the ring-opening polymerization of a compound of Formula X:

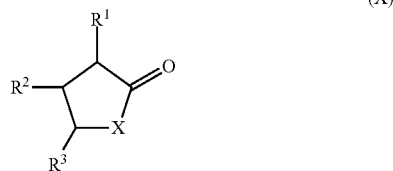

wherein

X is O, S, or NW wherein $R^a$ is H, alkyl, or aryl;

$R^1$ is H, Me, methylene (=CH$_2$), or substituted methylene (=CR$_2$ where each R is independently H, alkyl, aryl, substituted alkyl, or substituted aryl);

$R^2$ is H or alkyl (e.g., methyl);

$R^3$ is H or alkyl (e.g., methyl);

wherein the polymerization is carried out at about 1 atm and at less than about 25° C. in the presence of a ring-opening catalyst, to provide the resulting ring opened polymer in the form of a linear polymer or cyclic polymer. In some embodiments, at least one of $R^1$, $R^2$, and $R^3$ is not H. Thus, in some embodiments, $R^1$ or $R^2$ is not H, $R^1$ or $R^3$ is not H, or $R^2$ or $R^3$ is not H.

In some embodiments, the ring-opening polymerization is carried out under conditions that cause the polymerization product to crystallize or precipitate out of solution during the polymerization. In various embodiments, the ring-opening catalyst is a rare-earth metal, transition-metal, main-group, or organic catalyst. In some embodiments, the reaction conditions further comprise a protic initiator such as an alcohol, e.g., an alcohol described herein or a functional equivalent thereof. The ring-opening catalyst can be a rare-earth metal-based coordination polymerization catalyst, such as a catalyst as described herein. The ring-opening polymerization can be carried out below 0° C., below −20° C., or below −40° C. In one specific embodiment, $R^1$ is H, Me, or methylene (=CH$_2$); $R^2$ is H or Me; and $R^3$ is H or Me.

In various embodiments, the ring-opening polymerizations described herein provide a composition that comprises a linear polymer, a cyclic polymer, or a combination thereof. When the composition is a combination of linear and cyclic polymers, the ratio of linear to cyclic can be about 99:1 to about 1:99, or any ratio within that range, depending on the reaction conditions used, as described herein.

The invention therefore provides novel polymers and compositions as described herein, intermediates for their synthesis, as well as methods of preparing the polymers and compositions. The invention also provides polymers and compositions that are useful as intermediates for the synthesis of other useful polymers and compositions.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
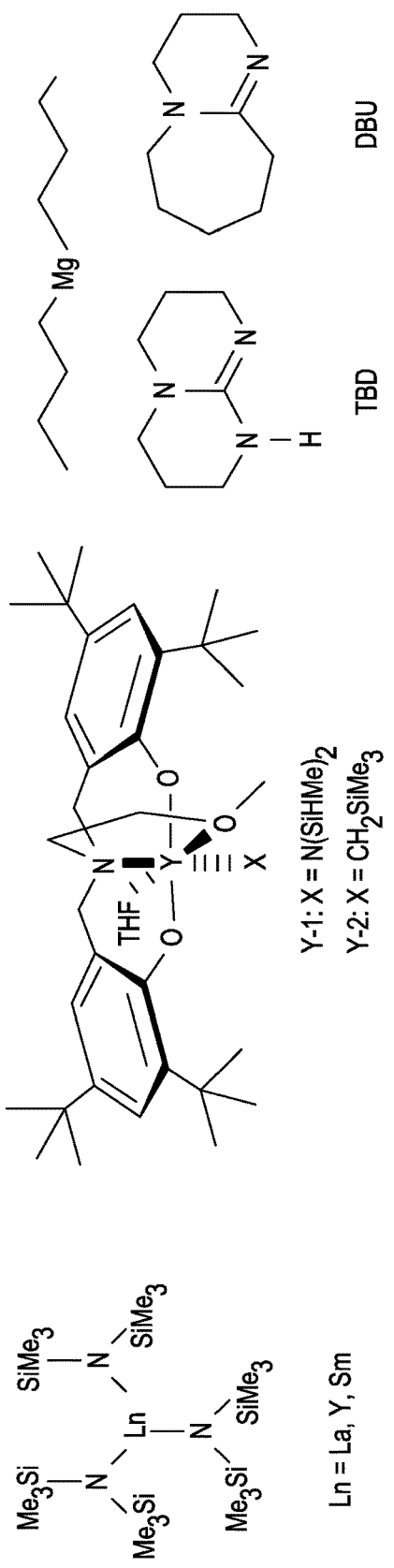
FIG. 1. Proposed mechanism and employed catalysts for the ROP of γ-BL. Four classes of catalysts employed in this study including Ln homoleptic complexes, yttrium heteroleptic complexes, main-group magnesium dibutyl, and organic catalysts TBD and DBU, and a proposed mechanism for the ROP of γ-BL by La[N(SiMe$_3$)$_2$]$_3$ alone, which produces both linear and cyclic polymers.
Figure 1:
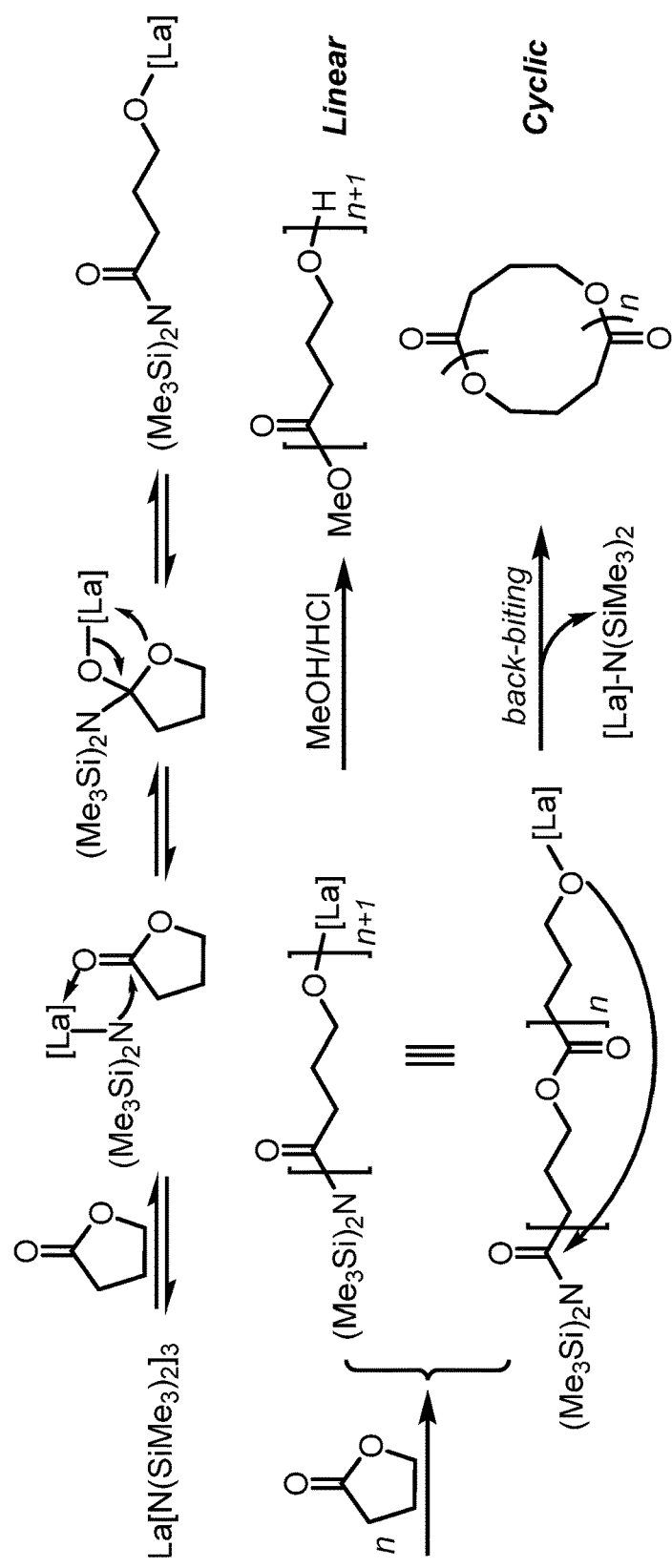

Ring-opening polymerization (ROP) is a powerful synthetic methodology for the chemical synthesis of technologically important biodegradable aliphatic polyesters from cyclic esters. However, the bio-derived five-membered γ-butyrolactone (γ-BL) is commonly referred as "non-polymerizable" due to its low strain energy. Chemical synthesis of poly(γ-butyrolactone) (PγBL) through the ROP process has only be realized under ultra-high pressure (20,000 atm, 160° C.), producing only oligomers. Here we show that the ROP of γ-BL can in fact proceed smoothly to high conversions (90%) under ambient pressure with a suitable catalyst, producing PγBL materials with number-average molecular weight up to 30 kg/mol and with controlled linear and/or cyclic topologies. Remarkably, both linear and cyclic PγBLs can be recycled back to the monomer in quantitative yield by simply heating the bulk materials at 220° C. (linear polymer) or 300° C. (cyclic polymer) for 1 h, thereby demonstrating complete recyclability of PγBL.

This disclosure thus reveals the discovery that the chemical ring-opening polymerization (ROP) of γ-BL can in fact proceed smoothly to high conversions up to 90% without added heat under ambient pressure with a suitable catalyst and/or initiator. Optimal conversions can be obtained in short periods of time at −40° C. Among the four classes of catalysts investigated in this study (lanthanide, transition-metal, main-group, and organic catalysts), an earth-abundant lanthanum (La) complex and a discrete, single-site molecular yttrium (Y) complex were found to be highly effective, enabling the facile synthesis of PγBL in a multi-gram scale with high conversions.

Impressively, the La/ROH catalyst system not only produces PγBL materials of varied molecular weights with M$_n$ up to 30 kg/mol, it can also control the topology of the resulting PγBL with linear, cyclic, or both types of structures. This unprecedented synthetic capability also enabled investigation into effects of the PγBL topology on thermal and dynamic mechanical properties of such materials, revealing that the cyclic PγBL has lower crystallinity and melting-transition temperature, but considerably higher (by ~70° C.) thermal stability, than its linear counterpart of similar molecular weights. Remarkably, both linear and cyclic PγBL materials can be readily recycled back to the monomer γ-BL in quantitative yield by simply heating the bulk materials at 220° C. (for the linear polymer) or 300° C. (for the cyclic polymer) for 1 h, therefore demonstrating complete recyclability of PγBL.

The chemical synthesis of PγBL, a structural equivalent of poly(4-hydroxybutyrate) (P4HB)—a highly useful biomaterial, is based on the biorenewable, inexpensive monomer γ-BL. This new route offers a significant economic advantage and also opens up a new route to related biomaterials.

This disclosure also describes the first effective organopolymerization of the biorenewable γ-BL to high-molecular-weight metal-free recyclable polyester. The superbase $^t$Bu-P$_4$ is found to directly initiate this polymerization through deprotonation of γ-BL to generate reactive enolate species. When combined with a suitable alcohol, the $^t$Bu-P$_4$ based system rapidly converts γ-BL into polyesters with high monomer conversions (up to 90%), high molecular weights (M$_n$ up to about 30 kg/mol), and complete recyclability (quantitative γ-BL recovery).

α-Methylene-γ-butyrolactone (MBL), a naturally occurring bifunctional monomer, contains both a highly reactive exocyclic C=C bond and a highly stable five-membered γ-butyrolactone ring. Thus, all previous work led to exclusive vinyl-addition polymer P(MBL)$_{ADD}$. The discoveries revealed in this disclosure reverse the conventional chemoselectivity to enable the first ring opening polymerization (ROP) of MBL, thereby producing exclusively unsaturated polyester P(MBL)$_{ROP}$ with Mn up to about 22 kg/mol. Remarkably, P(MBL)$_{ROP}$ can be not only be readily post-functionalized into cross-linked or thiolated materials, but can also be fully recycled back to its monomer after heating it in solution in the presence of a simple depolymerization catalyst.

Controlling the chemoselectivity of the polymerization of multi-functional monomers is of primary importance in controlling the structure and properties of the resulting polymeric materials. This is especially true in the case of α-methylene-γ-butyrolactone (MBL), a naturally occurring bifunctional monomer containing both a highly reactive exocyclic C=C bond and a highly stable five-membered γ-butyrolactone ring. All previous work exclusively led to the vinyl-addition polymer, which is a non-biodegradable and non-recyclable polymer. The work described herein reverses the conventional chemoselectivity to enable the first ring-opening polymerization of MBL, thereby producing the exclusively unsaturated polyester. Remarkably, this renewable polyester can be post-functionalized into tailor-made materials and is not only readily degradable, but it is also fully recyclable back to its monomer after heating in the presence of a simple depolymerization catalyst.

General Polymerization Techniques

A generic scheme for the ring opening polymerization (ROP) of five-membered lactones, using gamma-butyrolactone (γ-BL) as an example, is shown below. Additional embodiments include variations in the structures of the monomer, polymer, catalyst, and initiator, as well as in the process itself (see for example, FIG. 18).

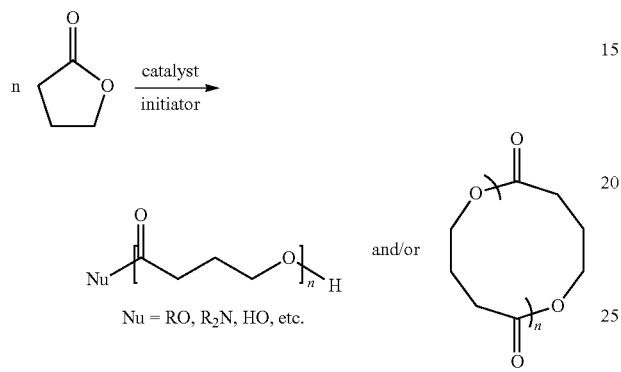

Process:

The ROP should be carried out under conditions that facilitate the forward ring-opening reaction and suppress the backward depolymerisation. Typically conditions can include: low temperature, below about 0° C., preferably below about −20° C., and most preferably at or below about −40° C.; high monomer concentration, typically about 5 M or about 10 M, bulk or in solution, typically in an aprotic solvent such as THF, toluene, dichloromethane, or DMF (dimethylformamide), under conditions where the resulting polymer can precipitate from solution; and heterogeneous conditions to precipitate or crystallize the formed polymer from the reaction mixture.

Monomers:

Suitable monomers are five-membered lactones, including, but not limited to, alkyl substituted, and/or alkene- or halide-functionalized lactones, as well as γ-thiobutyrolactone and γ-butyrolactam. The monomers can also be α-methylene-γ-butyrolactone (MBL), its γ-methyl- and β-methyl-substituted derivatives $_γ$MMBL and $_β$MMBL, or variations thereof, such as the structures listed below, where any R (e.g., R, $R^1$, $R^2$, $R^3$, $R^{10}$, and $R^{11}$) can be H, alkyl, aryl, alkenyl (e.g., methylene (=CH$_2$)), and the like. Examples of a variety of polymerizable monomers are shown below.

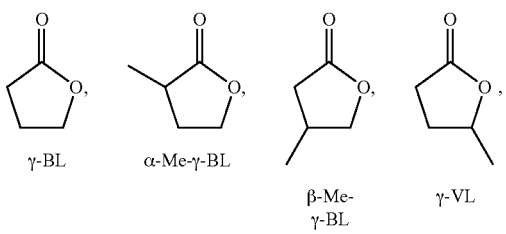

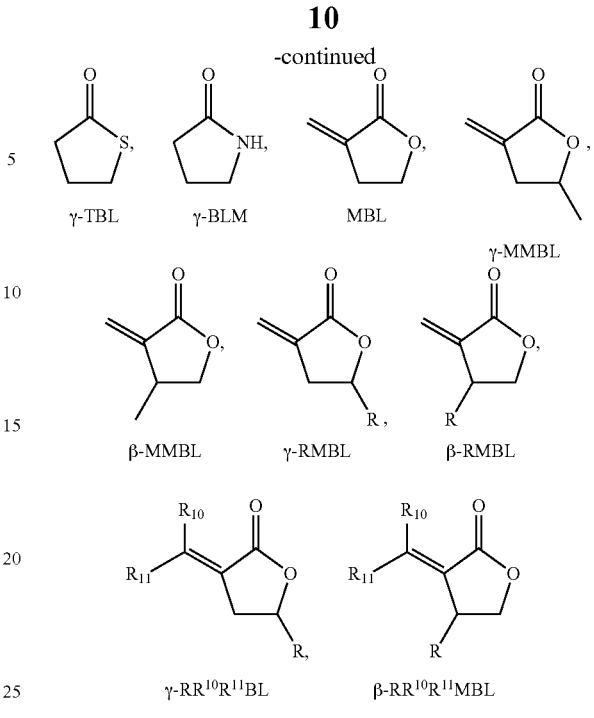

Polymers:

Depending on the lactone monomer structure, catalyst or initiator structure, and reaction conditions, the resulting polymer can be a linear polymer, cyclic polymer, or a mixture of cyclic and linear polymers. Depending on the catalyst/initiator systems and post-functionalization methods, the structures of the polymers include, but not limited to: linear (soluble) unsaturated polyester P(MBL)$_{ROP}$, cross-linked (insoluble) polyester P(MBL)$_{ROP}$-xl, cross-linked (insoluble) P(MBL)$_{ADD}$-P(MBL)$_{ROP}$-xl, P(MBL)$_{ROP}$-Fn (functionalized), and copolymers of MBL with other γ-butyrolactone monomers. For the linear polymers, the chain ends depend on the catalyst and/or initiator structure and the reagents employed to terminate the polymerization. For example, copolymers of such monomers with other heterocyclic monomers can also be synthesized, and shown below.

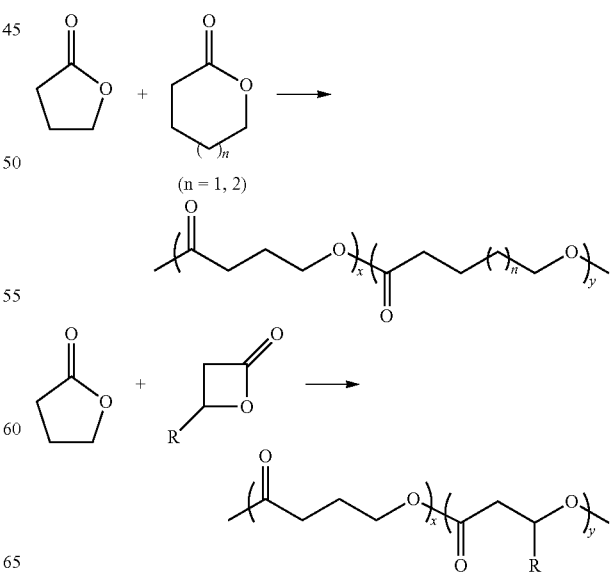

where the resulting polymers are random copolymers, R is any R or $R^x$ group as defined herein, and the variables x and y are dependent upon the stoichiometry of the initial monomer feedstock (e.g., x and y can each independently be about 20 to about 10,000).

Catalysts:

Suitable ring-opening catalysts can also be grouped into four classes: lanthanide (also referred to as rare-earth metal), transition-metal, main-group, and organic catalysts. They can be used alone but are often employed in combination with a protic initiator. Lanthanide (Ln) catalysts include f-block metal homoleptic and heteroleptic amides, alkoxide and alkyl complexes such as $Ln(NR_2)_3$, $Ln(OR)_3$, $LnR_3$, $Ln(NR_2)_x(OR)_{3-x}$ (x=1, 2), or $L_2Ln$-X (L=anionic ligand, bridged or unbridged; X=OR, $NR_2$, SR, R), where R is alkyl, aryl, substituted alkyl, or substituted aryl. Transition-metal catalysts include d-block metal discrete molecular complexes carrying at least one labile ligand, $L_nM$-X (X=OR, $NR_2$, SR, R), where R is alkyl, aryl, substituted alkyl, or substituted aryl, which complexes can either directly initiate the polymerization or react with an initiator to generate an active species. The metal center is typically protected by one or more bulky mono-dentate or polydentate organic ligands such as a tetradentate amino-alkoxy-bis(phenoxy) ligand. Main-group catalysts include s- and p-block metal (groups 1, 2, 12, and 13) metal homoleptic and heteroleptic complexes such as RLi, $MgR_2$, LM-X (M=Mg, Zn, X=R, OR, SR, $NR_2$), $Al(OR)_3$, and $L_2AlOR$, where R is alkyl, aryl, substituted alkyl, or substituted aryl.

Organic catalysts are those strong organic bases or nucleophiles, such as triazabicyclodecene (TBD), that can either directly initiate the polymerization or activate a protic initiator to promote the polymerization. Basic catalysts can be grouped into two general classes: strong organic bases and inorganic bases. They can be used alone but are often used in combination with a protic initiator. Organic catalysts include strong organic bases, especially polyaminophosphazene superbases such as 1-tert-butyl-4,4,4-tris(dimethylamino)-2,2-bis[tris(dimethylamino)-phosphoranylidenamino]-$2\lambda^5,4\lambda^5$-catenadi(phosphazene) ($^tBu$-$P_4$) and 1-tert-butyl-2,2,4,4,4-pentakis(dimethylamino)-$2\lambda^5,4\lambda^5$-catenadi(phosphazene) ($^tBu$-$P_2$); guanidines such as 1,5,7-triazabicyclo[4.4.0]dec-5-ene (TBD), proazaphosphatranes (cyclic azaphosphines), and cyclopropenimine superbases, including the following catalysts.

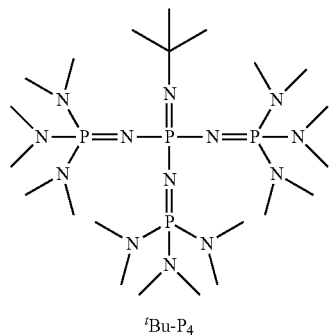

$^tBu$-$P_4$

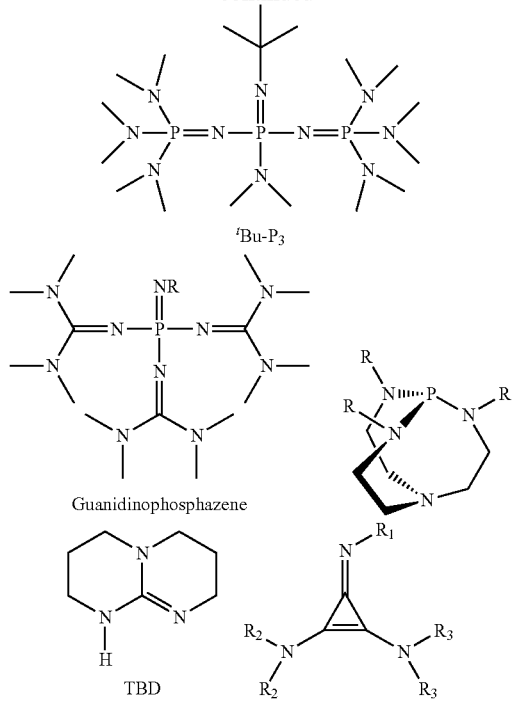

$^tBu$-$P_3$

Guanidinophosphazene

TBD where R is alkyl, aryl, substituted alkyl, or substituted aryl.

Inorganic bases include strong bases of alkaline and alkaline earth compounds such as ROM (R=Me, Et, $^iPr$, $^nBu$, $^tBu$; M=K, Na, Li), $(RO)_2M$ (R=Me, Et, $^iPr$, $^nBu$, $^tBu$; M=Mg or Ca), MH (M=K, Na, Li), MOH (M=K, Na, Li), and $R_2NM$ (R=alkyl; M=K, Na, Li) wherein R is alkyl, aryl, substituted alkyl, or substituted aryl.

The above catalysts for polymerization can also be used as catalysts for depolymerization to recover the monomer back. Preferred depolymerization catalysts include common/simple acids and bases such as metal halides, metal hydroxides, mineral acids, and the like.

Initiators:

Typical initiators include protic compounds such as alcohols (ROH), di-alcohols (HO—R—OH), polyols (compounds containing more than two OH groups, or sugars; amines ($RNH_2$, $R_2NH$); thiols (RSH), where R is alkyl, aryl, substituted alkyl, or substituted aryl, or deprotonated monomers.

Completely Recyclable Biopolymers with Linear and Cyclic Topologies Via Ring-Opening Polymerization of γ-Butyrolactone.

Unfavorable thermodynamics involved in the ROP of γ-BL, which is originated from the relative low strain energy of the five-membered lactone ring that brings about too small a negative change of enthalpy ($\Delta H_p$) to offset a large negative entropic change ($\Delta S_p$) of its ROP, explains the commonly observed no polymerization or low oligomerization of γ-BL under ambient pressure. While utilizing the ring-opening copolymerization strategy that copolymerizes α-methylene-γ-butyrolactone (MBL) containing the γ-BL moiety and ε-caprolactone with lanthanide (Ln)-based coordination polymerization catalysts, we found that performing the reaction at sub-zero temperatures greatly favored incorporation of the ring-opened MBL into the copolyester. This interesting finding prompted us to investigate the following two strategies aiming to develop the efficient ROP of γ-BL. The first is through reducing the entropic penalty of the ROP by performing the polymerization at a low enough temperature (i.e., below the ceiling temperature ($T_c$) of polymerization, for a given monomer concentration [M]), while the second is through modulating reaction conditions (concentration, solvent, and temperature) such that [M] becomes greater than the equilibrium $[M]_{eq}$ and the formed polymer crystallizes or precipitates out of solution during the polymerization to continuously perturb the propagation/depropagation equilibrium and shift it towards propagation. In this context, we employed four different classes of catalysts shown in FIG. 1 and subsequently discovered the catalyst systems and reaction conditions that can achieve the efficient chemical synthesis of PγBL via the ROP of γ-BL for the first time. Furthermore, we uncovered the cyclic structure of the resulting PγBL and synthetic control over the PγBL topology, established PγBL structure/thermal and dynamic mechanical property relationship, and demonstrated complete recyclability of PγBL hack to its monomer.

Results and Discussion.

At the outset, we first investigated the ROP of γ-BL with $La[N(SiMe_3)_2]_3$ because Ln complexes are known catalysts for mediating coordination-insertion ROP of cyclic esters while La is most earth-abundant and least expensive within the Ln series. As anticipated, no polymer was produced after 24 h when the polymerization was carried out under ambient conditions in toluene or other common organic solvents. Guided by the two hypotheses described above, we examined the ROP under different reaction conditions (temperature, solvent, concentration). Excitingly, the ROP reaction employing 2.0 mol % of the La catalyst and 10 M of γ-BL was carried out in toluene at −40° C., off-white polymer started to precipitate from solution. The $^1$H NMR spectrum of the isolated product showed that it was indeed the γ-BL ring-opened polymer PγBL with number-average MW ($M_n$)=12.1 kg/mol and molecular weight distribution (Ð)=1.99.

To obtain insight into the mechanism of the ROP, we determined the chain-end groups of the PγBL produced by matrix-assisted laser desorption/ionization time-of-flight mass spectroscopy (MALDI-TOF MS). The MALDI-TOF mass spectrum consisted of two series of molecular ion peaks, presumably corresponding to the cyclic PγBL with no chain ends, denoted as [γ-BL]$_n$, and the linear PγBL with MeO/H as chain ends, denoted as MeO-[γ-BL]$_n$-H.

These results are consistent with a mechanistic scenario outlined in FIG. 1, following a typical coordination-insertion mechanism operative in the ROP of cyclic esters for chain initiation and propagation steps. However, the unique feature of the current ROP is that, besides the formation of the expected linear polymer, chain termination occurs frequently via intramolecular backbiting to yield a cyclic polymer. Cyclic polymers are an intriguing class of macromolecules absent of chain ends. Because of synthetic challenges encountered in the synthesis of cyclic polymers, they are not as readily available as their linear counterparts for structural/property relationship studies. Hence, there has been significant interest in developing new synthetic methodologies for cyclic polymers.

However, γ-BL conversions were limited to only ~3% even after an extended time period of 32 h, regardless of different polymerization conditions employed. Furthermore, variations in the Ln ionic radius (La>Sm>Y) resulted in a small, but noticeable, decrease in activity from the largest La to the smallest Y in this series. As metal alkoxides typically exhibit superior performances and mediate more controllable ROP of cyclic esters than the corresponding alkyl and amide analogues, alcohols that can react with La[N(SiMe$_3$)$_2$]$_3$ to generate metal alkoxides via in situ alcoholysis were examined next as the initiator. When 1 equiv. of PhCH$_2$OH (BnOH), relative to La[N(SiMe$_3$)$_2$]$_3$, was used, the PγBL yield was enhanced substantially to 19% (Table X1, run 1).

TABLE X1

Results of ROP of γ-BL by La[N(SiMe$_3$)$_2$]$_3$/BnOH$^a$

| Run | γ-BL/La/BnOH | Temp. (° C.) | Solvent | Time (h) | PγBL (mg) | Yield$^b$ (%) | $M_n^c$ (kg/mol) | Ð$^c$ ($M_w$/$M_n$) |
|---|---|---|---|---|---|---|---|---|
| 1 | 100/1/1 | −40 | TOL | 24 | 80 | 19 | 10.2 | 2.17 |
| 2 | 100/1/2 | −40 | TOL | 12 | 160 | 38 | 11.9 | 2.60 |
| 3 | 100/1/3 | −40 | TOL | 12 | 150 | 36 | 5.41 | 1.26 |
| 4 | 100/1/6 | −40 | TOL | 12 | 90 | 21 | 4.63 | 1.24 |
| 5 | 20/1/1 | 25 | TOL | 24 | 0 | 0 | — | — |
| 6$^d$ | 100/1/2 | −40 | TOL | 24 | 120 | 29 | 7.96 | 2.08 |
| 7$^e$ | 100/1/2 | −40 | TOL | 24 | 30 | 7.1 | 5.68 | 1.34 |
| 8 | 100/1/2 | −40 | DCM | 12 | 160 | 38 | 12.6 | 2.70 |
| 9 | 100/1/1 | −40 | THF | 24 | 120 | 29 | 11.8 | 2.23 |
| 10 | 100/1/2 | −40 | THF | 12 | 180 | 43 | 10.0 | 2.15 |
| 11 | 100/1/3 | −40 | THF | 12 | 170 | 40 | 6.49 | 1.38 |
| 12$^f$ | 100/1 | −40 | THF | 12 | 100 | 24 | 6.81 | 1.42 |

$^a$Conditions: γ-BL = 0.42 g (4.9 mmol), [γ-BL] = 10M, $V_{solvent}$ = 0.115 mL, the La catalyst amount varied according to [γ-BL]/[La] ratio.
$^b$Isolated PγBL yield.
$^c$$M_n$ and Ð determined by GPC at 40 ° C. in DMF relative to PMMA standards.
$^d$[γ-BL] = 5.0M, $V_{solvent}$ = 0.605 mL.
$^e$[γ-BL] = 2.5M, $V_{solvent}$ = 1.585 mL.
$^f$La[N(SiMe$_3$)$_2$]$_3$ (0.049 mmol) was reacted with BnOH (0.146 mmol, 3 equiv.), followed by removal of NH(SiMe$_3$)$_2$, affording the isolated [La(OBn)$_3$]$_y$.

Figure 15:
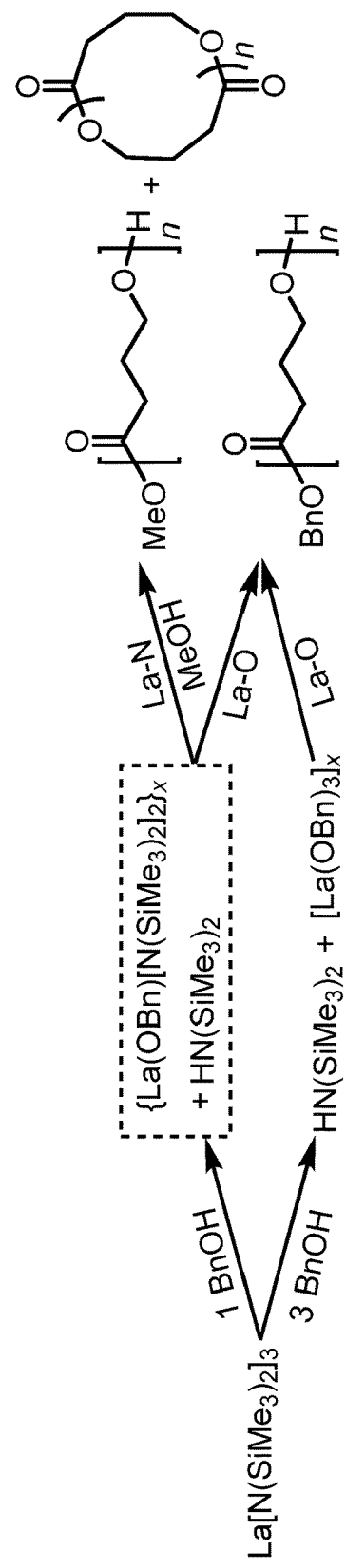
FIG. 15. Proposed scenarios for the ROP of γ-BL by La[N(SiMe$_3$)$_2$]$_3$/BnOH in two different ratios.

A further increase in the amount of BnOH to 2 equiv. continued to enhance the PγBL yield to 38% (Table X1, run 2), without decreasing the MW of PγBL ($M_n$=11.9 kg/mol). Importantly, raising the temperature of the ROP by La/BnOH from −40° C. to 25° C. yielded no polymer formation, further demonstrating that a low polymerization temperature is important to achieve the ROP of γ-BL. Further fine-tuning the conditions (γ-BL concentration and solvent) of the ROP by [γ-BL]/[La]/[BnOH] (100/1/2) enhanced the PγBL yield to 43% yield in THF at −40° C. after 12 h (Table X1, run 10). The resulting PγBL structure depends on the La/BnOH ratio employed for the ROP. When the ratio was 1/1, the MALDI-TOF MASS spectrum indicated the major linear BnO-[γ-BL]$_n$-H as well as minor cyclic [γ-BL]$_n$ and linear MeO-[γ-BL]$_n$-H structures. On the other hand, when the La/OH ratio was 1/3, linear structure BnO-[γ-BL]$_n$-H became predominant, indicating that most of the polymer chains were initiated by insertion of γ-BL into the La—OBn bond (FIG. 15).

Figure 2A:
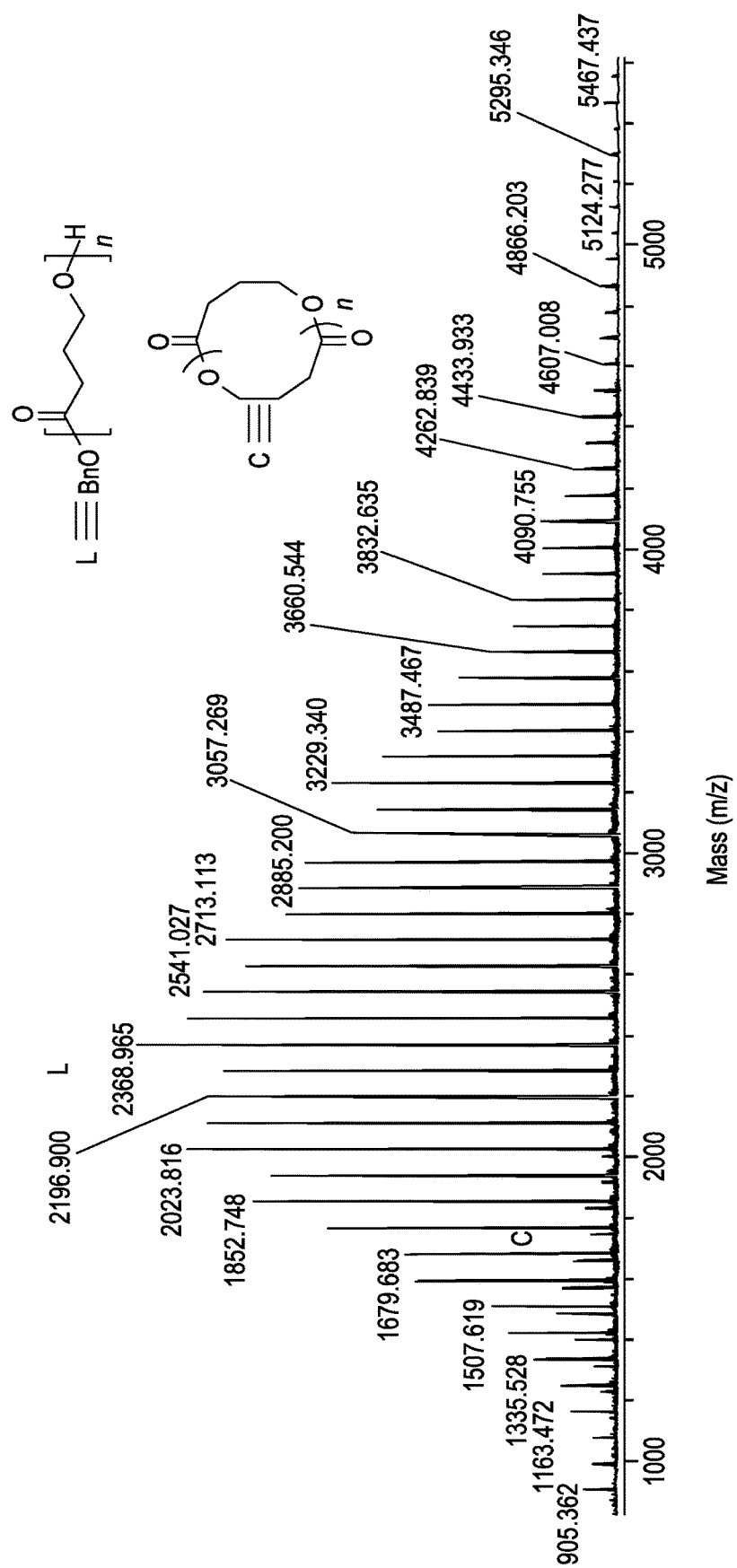
FIG. 2A-B. MALDI-TOF mass spectra of PγBLs. A, predominantly linear PγBL produced by [La(OBn)$_3$]$_y$. B, predominantly cyclic PγBL produced by γ-BL/La[N(SiMe$_3$)$_2$]$_3$/C$_6$H$_4$(CH$_2$OH)$_2$ (100/1/1.5) and plot of m/z values (y) vs the number of γ-BL repeat units (x) for major series C, [γ-BL]$_n$; L=RO-[γ-BL]$_n$-H.

Consistent with this hypothesis, the PγBL produced under this condition had a relatively low Ð value of 1.26. The facile alcoholysis reaction between La[N(SiMe$_3$)$_2$]$_3$ and BnOH (1 or 3 equiv.) was further confirmed through monitoring the reaction by $^1$H NMR. Noteworthy is that the activity of the ROP by the isolated [La(OBn)$_3$]$_y$ (24% yield, Table X1, run 12) was considerably lower than that by the in situ formed [La(OBn)$_3$]$_x$ (40% yield, Table X1, run 11), although the $M_n$ and Ð values of the resulting PγBL were similar, thus highlighting the effect of the degree of aggregation in the resulting "La(OBn)$_3$" cluster on the activity of the ROP. It is also noted here the PγBLs produced by La[N(SiMe$_3$)$_2$]$_3$/BnOH (via in situ mixing) and [La(OBn)$_3$]$_x$/HN(SiMe$_3$)$_2$ (via addition of the free amine back to the preformed lanthanum alkoxide) had essentially the same $M_n$ and Ð values, although the activity of the latter system (31% yield) was somewhat lower. The MALDI-TOF MASS spectrum (FIG. 2A) of PγBL produced by [La (OBn)$_3$]$_y$ suggested the expected linear structure BnO-[γ-BL]$_n$-H, plus a very small amount of the cyclic polymer [γ-BL]$_n$, indicating that the intramolecular backbiting also exits in the La—OBn initiated ROP, although to a much less extent when compared with the ROP initiated by La—N(SiMe$_3$)$_2$.

As addition of BnOH considerably enhanced the activity of the ROP of γ-BL catalyzed by La[N(SiMe$_3$)$_2$]$_3$, we subsequently investigated the ROP behavior as a function of steric bulk and acidity of alcohols including $^i$PrOH, PhCH$_2$OH, Ph$_2$CHCH$_2$OH, Ph$_2$CHOH, Ph$_3$COH, and C$_6$H$_4$(CH$_2$OH)$_2$ (Table X2). Notably, in a γ-BL/La/ROH ratio of 100/1/2, the ROP systems by sterically bulkier alcohols Ph$_2$CHCH$_2$OH and Ph$_2$CHOH showed much higher activity (61% yield by Ph$_2$CHCH$_2$OH and 67% yield by Ph$_2$CHOH, runs 5 and 11, Table X2) than the ROP by BnOH (43% yield), which can be attributed to their steric bulk that can effectively suppress the aggregation of the resulting La—OR active species to form high clusters.

Figure 2B:
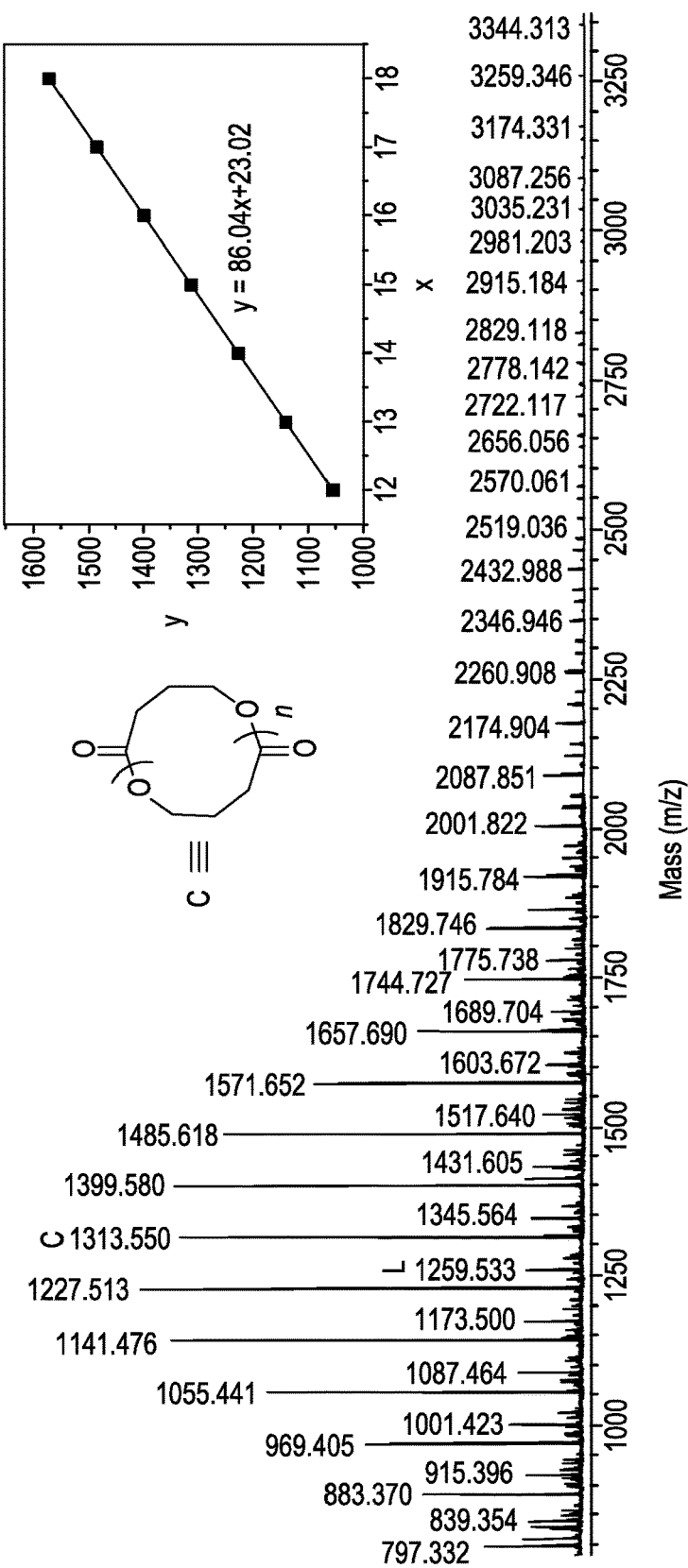
Figure 3:
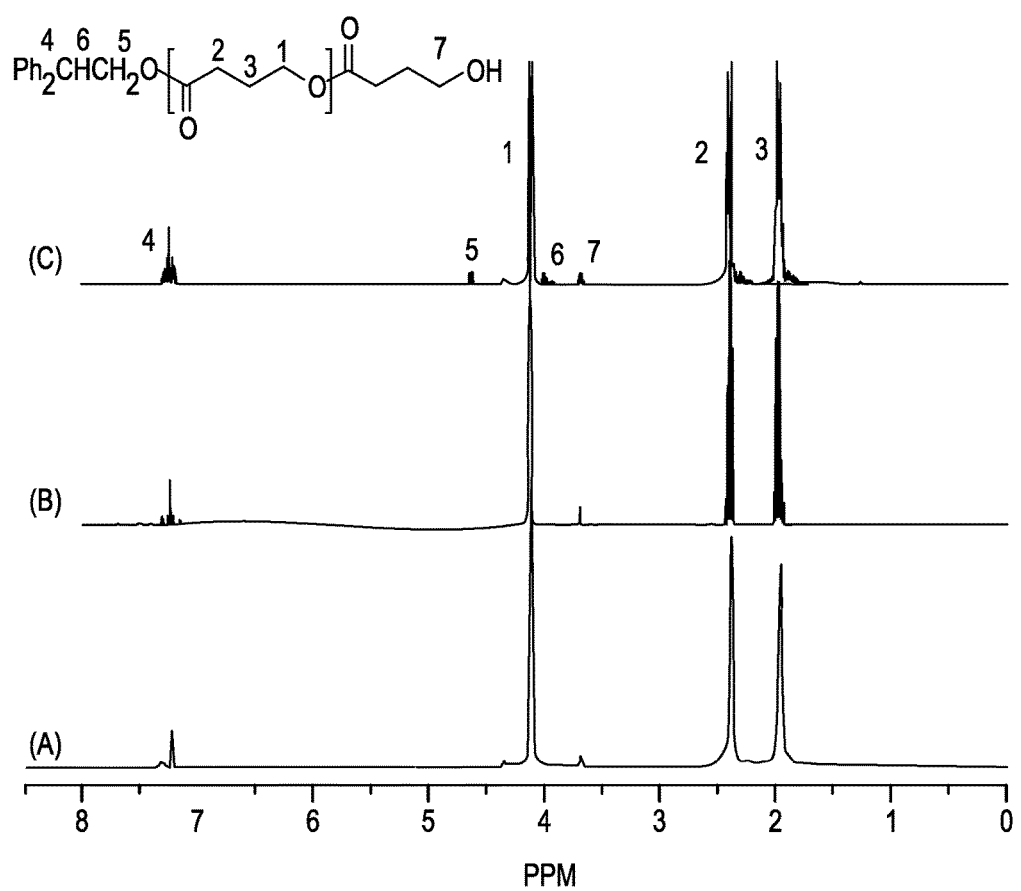
FIG. 3. PγBLs with different topologies. NMR spectra (CDCl$_3$, δ 7.26 ppm, 25° C.) of PγBLs with different γ-BL/La[N(SiMe$_3$)$_2$]$_3$/Ph$_2$CHCH$_2$OH ratios: (a) 100/1/1 (M$_n$=7.40 kg/mol, Đ=1.69, by light scattering/refractive index/viscometer triple detection; predominantly cyclic); (b) 100/1/2 (M$_n$=8.3 kg/mol, Đ=1.69, cyclic+linear); (c) 400/1/3 (M$_n$=7.00 kg/mol, Đ=1.48, predominantly linear).

Me$_3$)$_2$]$_3$/Ph$_2$CHCH$_2$OH system, the PγBL structure shifted from the predominantly cyclic one to a mixture of cyclic and linear structures to the mostly linear structure, when the feed ratio was changed from 100/1/1 to 100/1/2 to 100/1/3 (or 400/1/3), respectively. This structural change is also consistent with NMR spectra of the polymer obtained (FIG. 3). We speculate that the formation of the cyclic structure by the back-biting pathway (FIG. 1) is favored within the chain initiated by —N(SiMe$_3$)$_2$, a better leaving group. Other alcohol initiators followed a similar trend. On the other hand, the PγBL with the predominantly cyclic structure was formed with γ-BL/La[N(SiMe$_3$)$_2$]$_3$/C$_6$H$_4$(CH$_2$OH)$_2$ in a ratio of 100/1/1.5 (FIG. 2B). $^1$H NMR spectra of the PγBLs produced in the presence of different ROH initiators clearly showed, besides the major signals at 54.11, 2.39 and 1.96 ppm for the protons of the main chain, —[C(=O)CH$_2$CH$_2$CH$_2$O]$_n$—, minor signals attributed to the chain-end groups (RO/H), further confirming the coordination-insertion mechanism as outlined in FIG. 1. We also analyzed

TABLE X2

Results of ROP of γ-BL by La[N(SiMe$_3$)$_2$]$_3$/ROH$^a$

| Run | ROH | γ-BL/La/ROH | Temp. (° C.) | Solvent | Time (h) | PγBL (mg) | Yield$^b$ (%) | M$_n$$^c$ (kg/mol) | Đ$^c$ (M$_w$/M$_n$) |
|---|---|---|---|---|---|---|---|---|---|
| 1 | $^i$PrOH | 100/1/3 | −40 | THF | 12 | 120 | 29 | 9.02 | 2.18 |
| 2$^d$ | [La(O$^i$Pr)$_3$]$_x$ | 100/1 | −40 | THF | 12 | 140 | 33 | 6.86 | 1.50 |
| 3$^e$ | [La(O$^i$Pr)$_3$]$_y$ | 100/1 | −40 | THF | 12 | 90 | 21 | 7.15 | 1.47 |
| 4 | Ph$_2$CHCH$_2$OH | 100/1/1 | −40 | THF | 12 | 120 | 29 | 10.0 | 2.10 |
| 5 | Ph$_2$CHCH$_2$OH | 100/1/2 | −40 | THF | 12 | 255 | 61 | 8.30 | 1.69 |
| 6 | Ph$_2$CHCH$_2$OH | 100/1/3 | −40 | THF | 12 | 190 | 45 | 6.68 | 1.31 |
| 7 | Ph$_2$CHCH$_2$OH | 200/1/2 | −40 | THF | 12 | 230 | 55 | 10.7 | 1.86 |
| 8 | Ph$_2$CHCH$_2$OH | 400/1/2 | −40 | THF | 12 | 180 | 43 | 12.7 | 2.07 |
| 9$^d$ | [La(OCH$_2$CHPh$_2$)$_3$]$_x$ | 100/1 | −40 | THF | 12 | 140 | 33 | 7.11 | 1.50 |
| 10 | Ph$_2$CHOH | 100/1/1 | −40 | THF | 12 | 160 | 38 | 12.1 | 1.76 |
| 11 | Ph$_2$CHOH | 100/1/2 | −40 | THF | 12 | 280 | 67 | 11.0 | 1.80 |
| 12 | Ph$_2$CHOH | 100/1/3 | −40 | THF | 24 | 80 | 19 | 5.62 | 1.16 |
| 13 | Ph$_2$CHOH | 100/1/2 | −28 | THF | 24 | 65 | 16 | 6.68 | 1.39 |
| 14 | Ph$_2$CHOH | 100/1/2 | 0 | THF | 24 | 0 | 0 | — | — |
| 15 | Ph$_2$CHOH | 200/1/2 | −40 | THF | 12 | 190 | 45 | 15.0 | 1.96 |
| 16 | Ph$_2$CHOH | 400/1/2 | −40 | THF | 12 | 150 | 36 | 18.6 | 2.27 |
| 17 | Ph$_3$COH | 100/1/2 | −40 | THF | 24 | 0 | 0 | — | — |
| 18$^f$ | C$_6$H$_4$(CH$_2$OH)$_2$ | 100/1/1.5 | −40 | THF | 12 | 110 | 26 | 11.5 | 1.91 |
| 19$^g$ | C$_6$H$_4$(CH$_2$OH)$_2$ | 100/1/1.5 | −40 | THF | 12 | 140 | 33 | 24.8 | 2.47 |
| 20$^g$ | C$_6$H$_4$(CH$_2$OH)$_2$ | 200/1/1.5 | −40 | THF | 12 | 120 | 29 | 30.2 | 2.40 |

$^a$Conditions: γ-BL = 0.42 g (4.9 mmol), [γ-BL] = 10M, V$_{solvent}$ = 0.115 mL, the La catalyst amount varied according to [γ-BL]/[La] ratio.
$^b$Isolated PγBL yield.
$^c$M$_n$ and Đ determined by GPC at 40 ° C. in DMF relative to PMMA standards.
$^d$La[N(SiMe$_3$)$_2$]$_3$ (0.049 mmol) was reacted with ROH (0.146 mmol, 3 equiv.), followed by removal of HN(SiMe$_3$)$_2$, affording [La(OR)$_3$]$_x$.
$^e$Commercially available [La(O$^i$Pr)$_3$]$_y$.
$^f$La[N(SiMe$_3$)$_2$]$_3$ was first mixed with alcohol in THF, and the polymerization was started by addition of γ-BL.
$^g$Alcohol was first mixed with γ-BL, and the polymerization was started by addition of La[N(SiMe$_3$)$_2$]$_3$ in THF.

For the ROP by Ph$_2$CHCH$_2$OH, reducing the La loading to 0.5 and 0.25 mol % (Table X2, runs 7 and 8) maintained good activity while gradually enhancing the MW to M$_n$=12.7 kg/mol. Likewise for the ROP by Ph$_2$CHOH, by decreasing the La loading from 1.0 to 0.5 and 0.25 mol %, the ROP system still showed good activity while the MW of the resulting PγBL increased from M$_n$=11.0 to 15.0 and 18.6 kg/mol (Table X2, run 11 vs. 15 and 16), respectively. To further enhance the polymer MW, di-initiator C$_6$H$_4$(CH$_2$OH)$_2$ was employed for possible chain extension. Thus, the ROP with a γ-BL/La/C$_6$H$_4$(CH$_2$OH)$_2$ ratio of 100/1/1.5 afforded PγBL with a higher M$_n$ of 24.8 kg/mol (Table X2, run 19). Increasing the γ-BL/La/C$_6$H$_4$(CH$_2$OH)$_2$ ratio to 200/1/1.5 gave PγBL with a further enhanced M$_n$ of 30.2 kg/mol (Table X2, run 20).

As indicated by analyses of the MALDI-TOF mass spectra of the PγBL samples produced by the γ-BL/La[N(Si Me$_3$)$_2$]$_3$/Ph$_2$CHCH$_2$OH in a ratio of 100/1/1 with 41 NMR at −40° C. before methanolysis quenching and observed the end groups corresponding to —N(SiMe$_3$)$_2$, —OCH$_2$CHPh$_2$, and —COCH$_2$CH$_2$CH$_2$O-[La]. The polymerization control and kinetics of the γ-BL polymerization by the La[N(SiMe$_3$)$_2$]$_3$/Ph$_2$CHCH$_2$OH system were also investigated, showing the insensitivity of M$_n$ to monomer conversion.

Besides Ln[N(SiMe$_3$)$_2$]$_3$ (Ln=La, Sm, Y), other types of catalysts have also been examined (Table X3). Both the main group catalyst system Mg$^n$Bu$_2$/Ph$_2$CHOH, which has been shown to be highly efficient in the immortal ROP of L-lactide (L-LA), and the organic catalysts DBU and TBD which, when combined with a suitable alcohol initiator, have been shown to be highly efficient in the ROP of lactide, were found to be inferior to the La catalyst in both activity and polymer MW (Table X3, runs 3-7).

TABLE X3

Results of ROP of γ-BL by different catalysts[a]

| Run | Catalyst (cat) | Initiator (I) | γ-BL/cat/I | Solvent | Time (h) | PγBL (mg) | Yield (%)[b] | $M_n$[c] kg/mol | Đ[c] ($M_w/M_n$) |
|---|---|---|---|---|---|---|---|---|---|
| 1 | Sm[N(SiMe$_3$)$_2$]$_3$ | Ph$_2$CHCH$_2$OH | 100/1/2 | THF | 12 | 170 | 41 | 9.39 | 1.84 |
| 2 | Y[N(SiMe$_3$)$_2$]$_3$ | Ph$_2$CHCH$_2$OH | 100/1/2 | THF | 12 | 150 | 36 | 6.62 | 1.49 |
| 3 | Mg$^n$Bu$_2$ | Ph$_2$CHOH | 100/1/2 | THF | 24 | 100 | 24 | 6.27 | 1.26 |
| 4 | DBU | BnOH | 20/1/2 | DCM | 24 | 0 | 0 | — | — |
| 5 | TBD | BnOH | 100/1/2 | DCM | 24 | 70 | 17 | 6.14 | 1.22 |
| 6 | TBD | Ph$_2$CHCH$_2$OH | 100/1/2 | DCM | 24 | 80 | 19 | 6.15 | 1.14 |
| 7 | TBD | Ph$_2$CHCH$_2$OH | 50/1/2 | DCM | 24 | 140 | 33 | 5.55 | 1.15 |

[a]Conditions: γ-BL = 0.42 g (4.9 mmol), [γ-BL] = 10M, $V_{solvent}$ = 0.115 mL, temperature = −40° C., the catalyst amount varied according to [γ-BL]/[catalyst] ratio.
[b]Isolated PγBL yield.
[c]$M_n$ and Đ determined by GPC at 40 ° C. in DMF relative to PMMA standards.

Based on the results obtained with the La[N(SiMe$_3$)$_2$]$_3$/ROH system, which showed significant effects of the degree of aggregation of the simple Ln alkoxy or mixed amido/alkoxy cluster complexes on the activity and other characteristics of the ROP of γ-BL, we reasoned that molecular catalysts with discrete, single metal sites should hold potential for even higher activity. Hence, after having attempted several molecular catalyst systems with only limited success, we arrived to discrete, single-site yttrium complexes supported by the tetradentate, dianionic amino-bisphenolate ligand bearing a pendant ether group, which have been shown to be highly efficient in the ROP of lactide and β-butyrolactone. The ROP of γ-BL by yttrium amide Y-1 (1 mol %) in the presence or absence of BnOH at −40° C. produced PγBL in low yields after 24 h (14-19%, Table X4, runs 1 and 2). In sharp contrast, yttrium alkyl Y-2 (1 mol %) reached 76% yield in 6 h (Table X4, run 5). By increasing the [γ-BL]/[Y-2] ratio from 100 to 200 to 400, the $M_n$ value of the resulting PγBL increased from 12.2 to 16.1 to 25.6 kg/mol, respectively, while the Đ value remained nearly constant at ~1.80 (Table X4, runs 5-7).

with 2-propanol, gave the essentially the same performance with the same polymer yield (31%; γ-BL/Y—O$^i$Pr=100/1, γ-BL=0.42 g, [γ-BL]=10 M, THF, −40° C., 6 h) and similar $M_n$ and Đ values: $M_n$=9.50 kg/mol, Đ=1.30 by Y—O$^i$Pr from Y-1; =9.20 kg/mol, Đ=1.26 by Y—O$^i$Pr from Y-2. The resulting PγBLs were both end-capped with $^i$PrO/H groups, as revealed by $^1$H NMR spectra: 55.00 ppm [—CH(CH$_3$)$_2$, m], 1.23 ppm [—CH(CH$_3$)$_2$, d] and 3.68 ppm (—CH$_2$OH, m) with the integral ratio of 1/6/2, indicating that the ROP by Y—O$^i$Pr proceeds through insertion of γ-BL into the Y—O$^i$Pr bond.

Figure 4A:
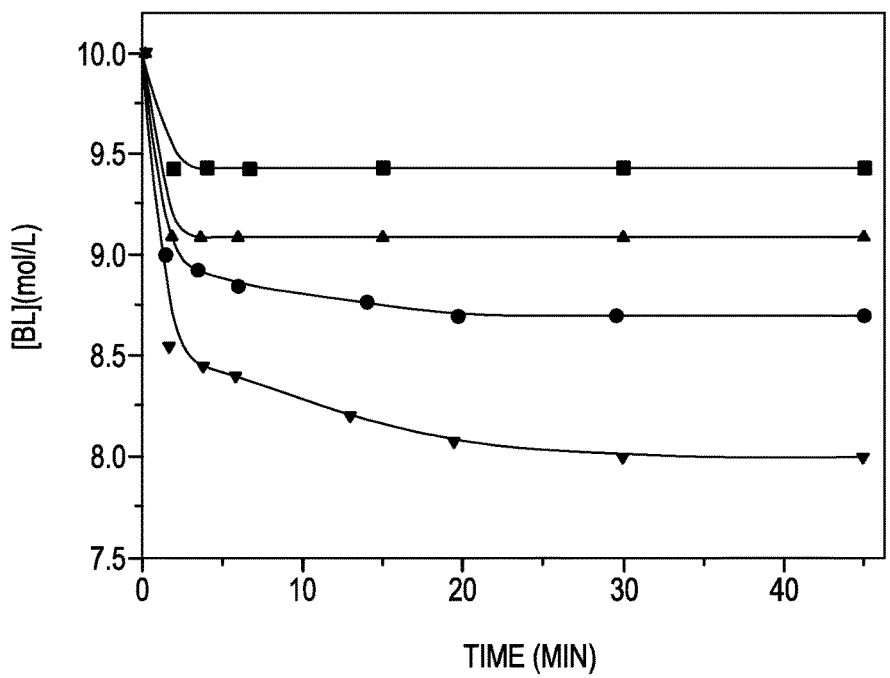
FIG. 4A-B. Thermodynamics of γ-BL polymerization. A, Plot of γ-BL concentration as a function time during polymerization with a at different temperatures: (■)=−15° C.; (▲)=−20° C., (•)=−25° C., (▼)=−30° C.; conditions: γ-BL/La[N(SiMe$_3$)$_2$]$_3$/Ph$_2$CHCH$_2$OH=100/1/3, γ-BL=10 M in CD$_2$Cl$_2$. B, Van't Hoff plot of ln[γ-BL]$_{eq}$ vs. reciprocal of the absolute temperature (T$^-$).

Thermodynamics of the γ-BL polymerization was investigated using γ-BL/La/Ph$_2$CHCH$_2$OH=100/1/3 and [γ-BL]$_0$=10.0 M in CD$_2$Cl$_2$ through VT NMR studies at low temperatures. The equilibrium monomer concentration, [γ-BL]$_{eq}$, obtained by plotting γ-BL concentration as a function time until the monomer concentration reached constant (FIG. 4A), was measured to be 9.45, 9.09, 8.70, and 8.00 M for −15° C., −20° C., −25° C., and −30° C. (Table X5), respectively (note that lowering the temperature further resulted in polymer precipitation). The Van't Hoff plot of

TABLE X4

Results of ROP of γ-BL by bisphenolate yttrium catalysts[a]

| Run | Catalyst | Initiator | γ-BL/Cat/I | Time (h) | PγBL (mg) | Yield[b] (%) | $M_n$[c] kg/mol | Đ[c] ($M_w/M_n$) |
|---|---|---|---|---|---|---|---|---|
| 1 | Y-1 | — | 100/1 | 24 | 80 | 19 | 15.3 | 1.88 |
| 2 | Y-1 | BnOH | 100/1/2 | 24 | 60 | 14 | 5.37 | 1.09 |
| 3 | Y[N(SiHMe$_2$)$_2$]$_3$THF$_2$ | — | 100/1 | 24 | 0 | 0 | — | — |
| 4 | Y[N(SiHMe$_2$)$_2$]$_3$THF$_2$ | BnOH | 100/1/2 | 24 | 0 | 0 | — | — |
| 5 | Y-2 | — | 100/1 | 6 | 320 | 76 | 12.2 | 1.78 |
| 6 | Y-2 | — | 200/1 | 12 | 200 | 48 | 16.1 | 1.79 |
| 7 | Y-2 | — | 400/1 | 12 | 160 | 38 | 25.6 | 1.86 |
| 8 | Y-2 | BnOH | 100/1/2 | 12 | 100 | 24 | 4.73 | 1.13 |
| 9 | Y(CH$_2$SiMe$_3$)$_3$THF$_2$ | — | 100/1 | 24 | 30 | 7.1 | 4.54 | 1.33 |
| 10 | Y(CH$_2$SiMe$_3$)$_3$THF$_2$ | BnOH | 100/1/2 | 12 | 100 | 24 | 6.79 | 1.50 |
| 11[d] | Y-2 | — | 100/1 | 6 | 3775 | 90 | 11.5 | 1.80 |

[a]Conditions: γ-BL = 0.42 g (4.9 mmol), [γ-BL] = 10M, $V_{THF}$ = 0.115 mL, temperature = −40° C., the catalyst amount varied according to [γ-BL]/[catalyst] ratio.
[b]Isolated PγBL yield.
[c]$M_n$ and Đ determined by GPC at 40 ° C. in DMF relative to PMMA standards.
[d]γ-BL = 4.2 g (49 mmol), [γ-BL] = 10M in THF, $V_{THF}$ = 1.15 mL, temperature = −40° C.

Figure 4B:
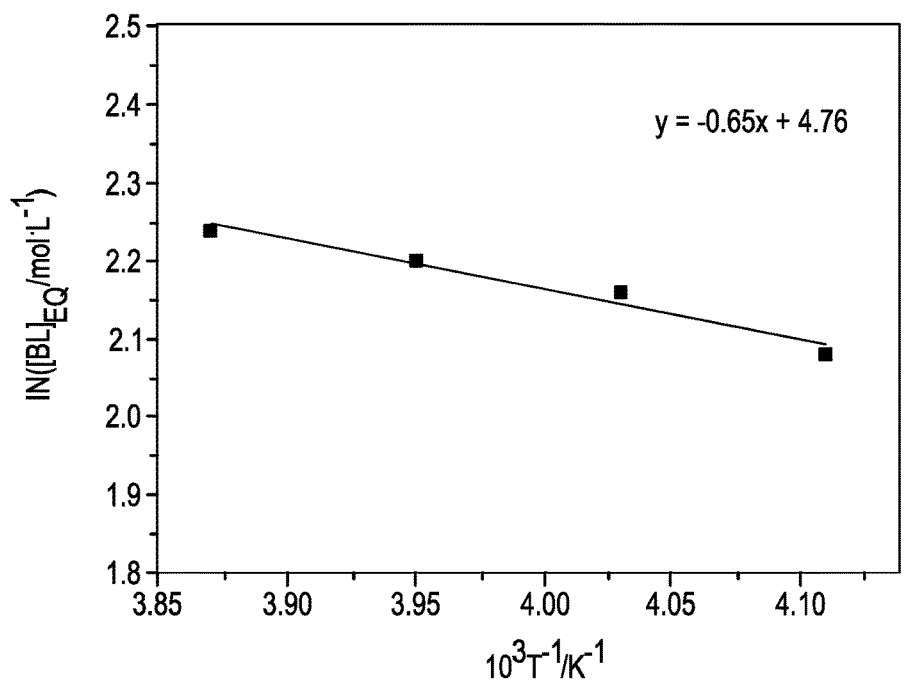

A multi-gram scale of the ROP of γ-BL (4.2 g) by Y-2 was carried out in 6 h, achieving 90% yield of PγBL as an off-white power material, with $M_n$=11.5 kg/mol, Đ=1.80 (Table X4, run 11). MALDI-TOF mass spectra of PγBLs produced by Y-1 and Y-2 were similar, featuring the predominantly linear structure of PγBL. The polymerizations by the corresponding isopropoxide complex Y—O$^i$Pr, derived from the stoichiometric reaction of either Y-1 or Y-2 ln[γ-BL]$_{eq}$ vs. 1/T gave a straight line with a slope of −0.65 and an intercept of 4.76 (FIG. 4B), from which thermodynamic parameters were calculated to be $\Delta H_p$=−5.4 kJ·mol$^{-1}$ and $\Delta S°_p$=−39.6 J·mol$^{-1}$·K$^{-1}$, based on the equation ln[γ-BL]$_{eq}$=$\Delta H_p$/RT−$\Delta S°_p$/R. The ceiling temperature was calculated to be $T_c$=264 K (−9° C.) at [γ-BL]$_0$=10 mol/L, or $T_c$=137 K (−136° C.) at [γ-BL]$_0$=1.0 mol/L, based on the equation $T_c$=$\Delta H_p$/($\Delta S°_p$+R ln[γ-BL]$_0$).

TABLE X5

Monomer concentration as a function of time at different temperature[a]

| -15 °C. | | -20 °C. | | -25° C. | | -30° C. | |
|---|---|---|---|---|---|---|---|
| Time (min) | [γ-BL]$_t$ (mol/L) | Time (min) | [γ-BL]$_t$ (mol/L) | Time (min) | [γ-BL]$_t$ (mol/L) | Time (min) | [γ-BL]$_t$ (mol/L) |
| 0.00 | 10.0 | 0.00 | 10.0 | 0.00 | 10.0 | 0.00 | 10.0 |
| 2.00 | 9.43 | 1.77 | 9.09 | 1.50 | 9.00 | 1.67 | 8.55 |
| 4.08 | 9.43 | 3.67 | 9.09 | 3.50 | 8.93 | 3.83 | 8.45 |
| 6.67 | 9.43 | 6.00 | 9.09 | 6.00 | 8.85 | 5.83 | 8.40 |
| 15.0 | 9.43 | 15.0 | 9.09 | 14.0 | 8.77 | 13.0 | 8.20 |
| 30.0 | 9.43 | 30.0 | 9.09 | 19.7 | 8.70 | 19.5 | 8.07 |
| 45.0 | 9.43 | 45.0 | 9.09 | 29.7 | 8.70 | 30.0 | 8.00 |
| — | — | — | — | 45.0 | 8.70 | 45.0 | 8.00 |

[a]Conditions: γ-BL/La/Ph$_2$CHCH$_2$OH = 100/1/3, γ-BL = 0.42 g, γ-BL = 10M in CD$_2$Cl$_2$.

Figure 5A:
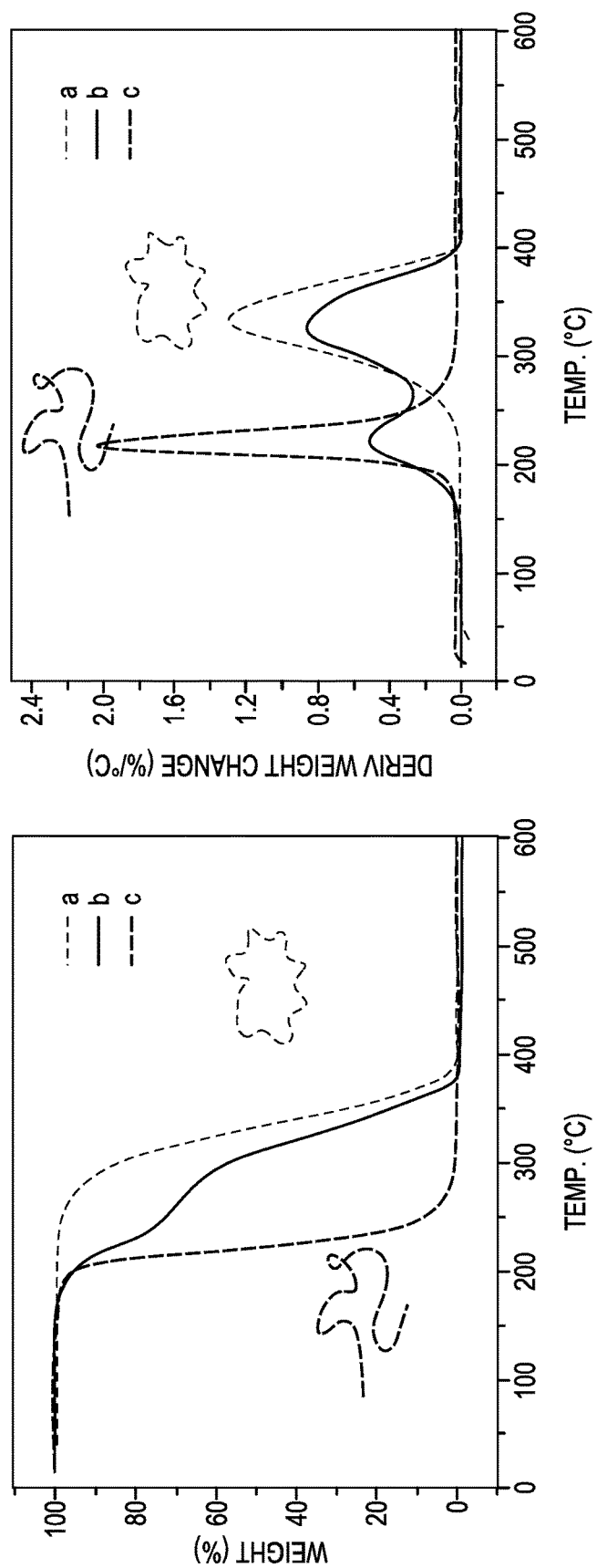
FIG. 5A-C. PγBL topology, thermal stability, intrinsic viscosity, and dynamic mechanical behavior. A, Overlays of TGA (left) and DTG (right) curves of linear and cyclic PγBLs obtained by the La/ROH system with three different γ-BL/La/Ph$_2$CHCH$_2$OH ratios: (a) 100/1/1; (b) 100/1/2; and (c) 400/1/3. B, Double logarithm (Mark-Houwink) plots of intrinsic viscosity [η] vs. weight-average molecular weight (M$_w$) of the linear and cyclic PγBLs. C, DMA curves of the PγBLs obtained by La/C$_6$H$_4$(CH$_2$OH)$_2$ with two different ratios: (a) 100/1/1.5, which produced predominantly the cyclic polymer (M$_n$=25.1 kg/mol) and (b) 200/1/1.5, which gave predominantly the linear polymer (M$_n$=30.0 kg/mol).

Thermal properties of the PγBL produced by the different catalyst systems were investigated by thermal gravimetric analysis (TGA) and differential scanning calorimetry (DSC). Intriguingly, the polymers produced with different γ-BL/La[N(SiMe$_3$)$_2$]$_3$/Ph$_2$CHCH$_2$OH ratios exhibited markedly different thermal stability or behavior. The TGA curve of the PγBL produced with a ratio of 100/1/1, which had predominantly the cyclic structure, exhibited essentially a one-step degradation profile with a $T_d$ (onset degradation temperature, defined by the temperature of 5% weight loss in the TGA curve) of 273° C. and a $T_{max}$ (maximum degradation temperature, defined by the peak value in the relative derivative thermogravimetry, DTG) of 334° C. [FIG. 5A(a)]. When the ratio was 100/1/3, the resulting PγBL, which comprised the predominant linear structure and the minor cyclic structure, displayed two degradation steps on the TGA curve, with the first weight loss (90%) attributing to the degradation of the major linear fraction, while the second weight loss (10%) accounting for the degradation of the minor cyclic fraction. When the ratio was changed to 400/1/3, the resulting PγBL was essentially a linear polymer, without a detectable amount of the cyclic component by TGA [FIG. 5A(c)]. This linear PγBL had a $T_d$ of 201° C. and a $T_{max}$ of 218° C. When the 100/1/2 ratio was employed, the resulting PγBL contained linear and cyclic structures, both in significant amounts, although the cyclic polymer was more than the linear one. Accordingly, the TGA curve of this polymer product showed clearly the presence of the two structures with the cyclic one being the major component [FIG. 5A(b)], and the $T_d$ value of 202° C. (linear PγBL) as well as $T_{max}$ values of 225° C. (linear PγBL) and 326° C. (cyclic PγBL) correlate well with those values observed for independent linear and cyclic structures [FIG. 5A(a)(c)]. These results demonstrate that TGA is a convenient method to determine the topology (linear vs. cyclic) of the resulting PγBL. Noteworthy also is that the $T_d$ of the cyclic structure is about 70° C. higher than that of the linear polymer, which is consistent with the hypothesis that the thermal stability of the cyclic polymer without chain ends is generally higher than the linear analog.

Figure 5B:
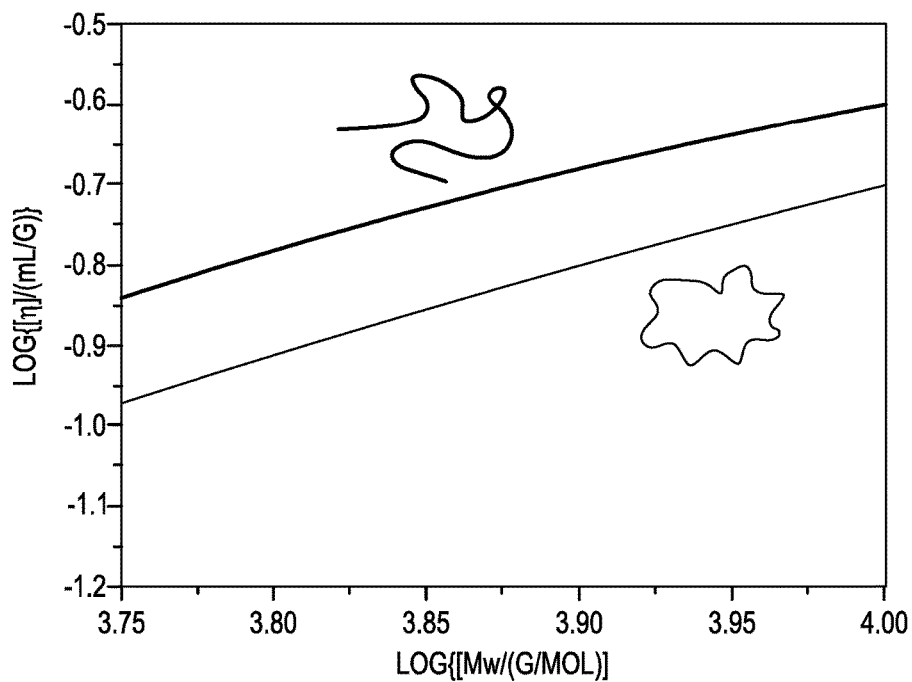

To provide further experimental evidence to distinguish between the linear and cyclic PγBL topologies, we utilized gel-permeation chromatography (GPC) with light scattering, refractive index, and viscosity triple detection to analyze and compare the PγBL materials of similar MW and Đ values produced by La[N(SiMe$_3$)$_2$]$_3$/Ph$_2$CHCH$_2$OH. Specifically, a predominantly cyclic PγBL with $M_n$=7.40 kg/mol and Đ=1.69 was synthesized using a γ-BL/La[N(SiMe$_3$)$_2$]$_3$/Ph$_2$CHCH$_2$OH ratio 100/1/1 ratio, while the linear counterpart with $M_n$=7.00 kg/mol and Đ=1.48 was synthesized using a 400/1/3 ratio. A Mark-Houwink plot (i.e., double logarithm plots of intrinsic viscosity [η] vs. $M_w$ determined by light scattering methods) of the two types of the PγBL samples is depicted in FIG. 5B. As expected, the cyclic polymer, due to its smaller hydrodynamic volume (thus eluted later), exhibited a lower intrinsic viscosity than its linear analog, with a $[72]_{cyclic}/[\eta]_{linear}$ ratio of approximately 0.8. This observed ratio somewhat deviated from the theoretically predicted value (~0.7) for cyclic polymers, attributable to the linear contaminant present in the mostly cyclic polymer, the case of which typically gives rise to a higher than theory value. The nearly identical Mark-Houwink exponent α (0.84 vs. 0.87, i.e., both are random coils in solution) obtained from linear fits of the respective Mark-Houwink plots of the cyclic and linear PγBLs ruled out possible conformational effects being responsible for their intrinsic viscosity differences.

PγBLs produced by the La/ROH system exhibited a glass-transition temperature ($T_g$) in the range of −52 to −42° C.), with the sample of the lowest $M_n$ sample exhibiting the lowest $T_g$ value. Intriguingly, PγBLs displayed two melting-transition temperatures ($T_m$), in which the lower temperature transition (~52° C.) is attributed to the $T_m$ of the cyclic polymer, while the higher temperature one (~63° C.) is attributed to the $T_m$ of the linear polymer, highlighting the impact of cyclic structure on chain folding and packing into a crystal lattice. This assignment is consistent with the known cyclic polymer systems as well as with the relative linear vs. cyclic content of the polymers through the combined MALDI-TOF MS and TGA analyses (vide supra).

Figure 5C:
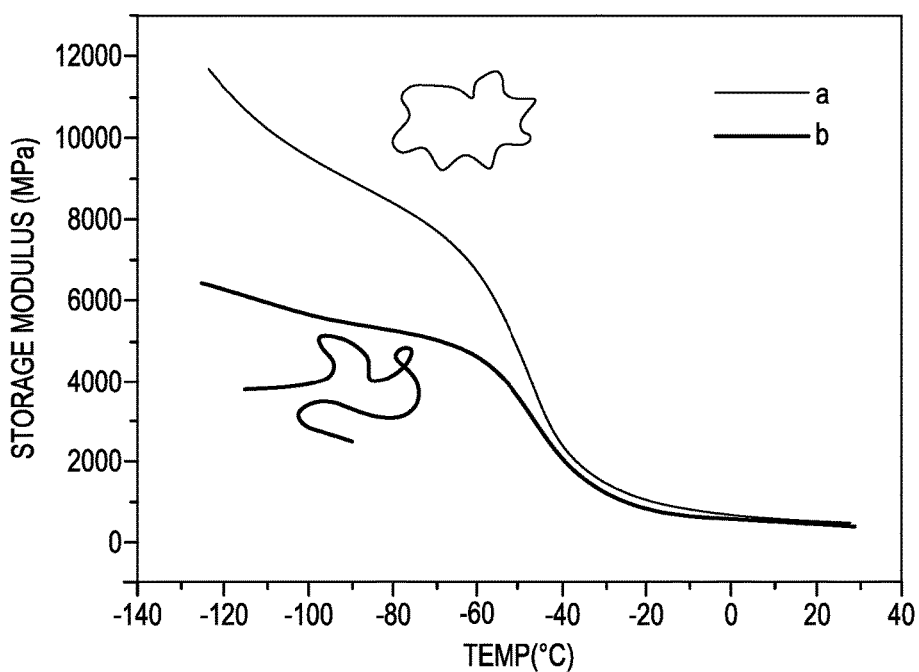

PγBL film specimens for dynamic mechanical analysis (DMA, FIG. 5C) were prepared by compression molding of the polymers (produced on multi-gram scales) with $M_n$=25.1 kg/mol and 30.0 kg/mol for the cyclic and linear PγBLs, respectively. In the rubbery state, for a chosen temperature of 25° C., the predominantly cyclic polymer had a storage modulus (E') of 455 MPa and a loss modulus (E") of 45.2 MPa. In comparison, the predominantly linear polymer exhibited a lower E' of 412 MPa and E" of 20.5 MPa, indicating that the linear polymer is a more flexible material relative to the cyclic counterpart. Interestingly, the differences in E' and E" in the glassy state are markedly larger. For instance, at −120° C., the values of E' are 11.4 GPa and 6.28 GPa and E" values are 1.17 GPa and 0.234 GPa for the cyclic and linear polymers, respectively.

Figure 6A:
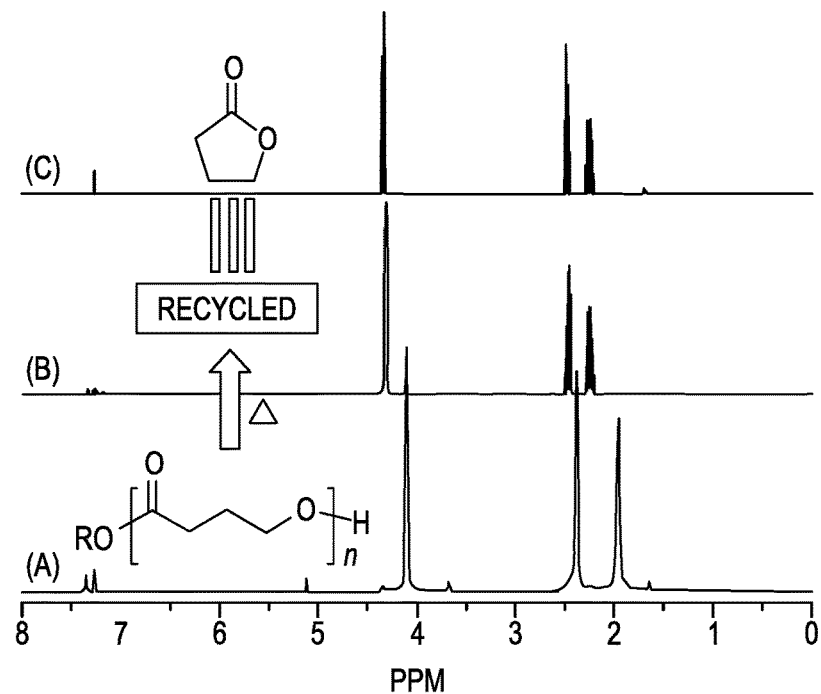
FIG. 6A-B. Thermal recyclability of linear and cyclic PγBL. A, $^1$H NMR spectra (CDCl$_3$): (a) linear PγBL (prepared from the ROP with γ-BL/La[N(SiMe$_3$)$_2$]$_3$/BnOH=100/1/3, note that the minor peaks due to the end groups and NMR solvent); (b) the liquid product obtained after thermal degradation at 220° C. for 1 h; (c) γ-BL monomer for comparison. B, $^1$H NMR spectra (CDCl$_3$): (a) cyclic PγBL (prepared from the polymerization with γ-BL/La[N(SiMe$_3$)$_2$]$_3$/Ph$_2$CHCH$_2$OH=100/1/1; (b) the liquid product obtained after thermal degradation at 300° C. for 1 h; (c) γ-BL monomer for comparison.
Figure 6B:
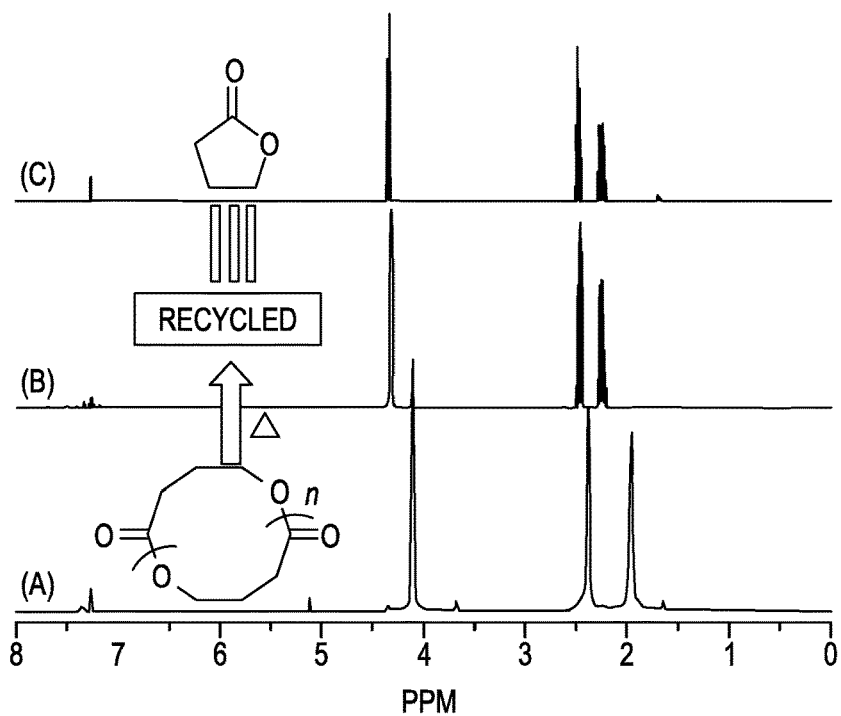

Recognizing the thermodynamic driving force for depolymerization of PγBL, we examined thermal recyclability of the PγBL materials produced with the La/ROH system and purified (removal of the catalyst) by simply heating the bulk material at 220° C. (for the linear polymer) or at 300° C. (for the cyclic polymer) for 1 h under a nitrogen atmosphere in a stainless steel reactor. After cooling, a colorless liquid formed was directly (without any purification) analyzed by $^1$H NMR (FIG. 6), revealing complete conversion of PγBL back into γ-BL was observed after thermal decomposition, as evidenced by the disappearance of chemical shifts characteristics of PγBL and appearance of the chemical shifts characteristic of γ-BL. Noteworthy also is that the thermal decomposition of PγBL back into its monomer γ-BL is quantitative for both linear and cyclic polymers, thereby demonstrating complete thermal recyclability of the PγBL materials derived from the ROP of γ-BL.

In the presence of an organic or metal catalyst, the PγBL depolymerization occurs rapidly even at RT (Table X6). For instance, a first-order kinetic plot for the PγBL depolymerization by TBD (2.0 mol % in CH$_2$Cl$_2$) at 25° C. yielded a rate constant of k=0.10 min$^{-1}$ corresponding to a half-life $t_{1/2}$ of 6.9 min at this temperature. The depolymerization by La[N(SiMe$_3$)$_2$]$_3$ (2.0 mol % in THF) is even faster, with k=0.84 min$^{-1}$ and $t_{1/2}$=0.82 at 25° C.

TABLE X6

Results of depolymerization of PγBL (25° C.) in the presence of organic or metal catalyst$^a$

| | TBD | | | La[N(SiMe$_3$)$_2$]$_3$ | |
|---|---|---|---|---|---|
| Time (min) | Conv. (%) | In([PγBL]/ [PγBL]$_0$) | Time (min) | Conv. (%) | [PγBL]/ [PγBL]$_0$ |
| 5.0 | 20.0 | −0.22 | 1.50 | 50.0 | −0.69 |
| 10 | 50.0 | −0.69 | 3.0 | 76.0 | −1.43 |
| 20 | 77.8 | −1.50 | 5.0 | 95.2 | −3.04 |
| 30 | 93.8 | −2.77 | 7.0 | 99.5 | −5.30 |
| 1440 | 100 | — | 10.0 | 100 | — |

$^a$Conditions: PγBL/catalyst = 50/1, PγBL = 0.2 g (produced by γ-BL/La/Ph$_2$CHCH$_2$OH = 100/1/2), TBD = 6.5 mg, La[N(SiMe$_3$)$_2$]$_3$ = 28.9 mg, solvent = 1.0 mL [DCM for TBD catalyzed depolymerization, THF for La[N(SiMe$_3$)$_2$]$_3$ catalyzed depolymerization].

In summary, the synthetic methodology developed in this work not only achieves the efficient chemical synthesis of the biopolymer PγBL via the ROP of γ-BL for the first time, it also provides a synthetic control over the PγBL topology. In addition, the work established PγBL structure/thermal and dynamic mechanical property relationship and demonstrated complete thermal recyclability of PγBL back to its monomer, thereby opening up unique opportunities for discovering new sustainable biomaterials based on the ROP of other five-membered lactones.

Sustainable Polymers: Metal-Free Recyclable Polyester from Bio-Renewable Non-Strained γ-Butyrolactone.

The first effective organopolymerization of the biorenewable "non-polymerizable" γ-butyrolactone (γ-BL) to high-molecular-weight metal-free recyclable polyester is reported herein. The superbase $^t$Bu-P$_4$ is found to directly initiate this polymerization through deprotonation of γ-BL to generate reactive enolate species. When combined with a suitable alcohol, the $^t$Bu-P$_4$ based system rapidly converts γ-BL into polyesters with high monomer conversions (up to 90%), high molecular weights (M$_n$ up to 26.7 kg/mol), and complete recyclability (quantitative γ-BL recovery).

Organopolymerization utilizing small-molecule organic compounds as catalysts or initiators has enabled the synthesis of a broad range of polymers via various mechanistic pathways and grown into a preferred method when metal-free products or processes are of primary concern. A class of organic catalysts that attracted increasing attention in polymer synthesis is polyaminophosphazenes, which are uncharged, extremely strong organic bases with low nucleophilicity. In particular, the P$_4$-phosphazene base, 1-tert-butyl-4,4,4-tris(dimethylamino)-2,2-bis[tris(dimethylamino)phosphoranylidenamino]-2λ$^5$,4λ$^5$-catenadi (phosphazene) ($^t$Bu-P$_4$), is one of the strongest known neutral bases with a pK$_a$ of 30.2$_5$ (DMSO) for its conjugate acid and the cation [$^t$Bu-P$_4$H]$^+$ being ~1.4 nm in diameter. Utilizing its high Brønsted basicity, several effective metal-free initiator systems have been developed by combining $^t$Bu-P$_4$ with a co-initiator such as an enolizable organic acid (to generate enolate active species) and alcohol (to generate alkoxide active species); examples highlighted here include anionic polymerization of methyl methacrylate (MMA), ring-opening polymerization (ROP) of cyclosiloxanes and ethylene oxide, as well as stereoselective ROP of lactide by the related 1-pyrene-butanol (PBNOL)/1-tert-butyl-2,2,4,4,4-pentakis(dimethylamino)-2λ$^5$,4λ$^5$-catenadi(phosphazene) ($^t$Bu-P$_2$) initiating system. $^t$Bu-P$_4$ has also been employed as an efficient catalyst for the well-controlled group-transfer polymerization of MMA and other functionalized methacrylates initiated by a silyl ketene acetal.

On the other hand, high MW microbial poly(4-hydroxybutyrate) (P4HB), a structural equivalent of PγBL, is produced through a bacterial fermentation process. As discussed above, we recently discovered catalytic and thermodynamic conditions that enabled the first successful chemical ROP of γ-BL into high MW PγBL with controlled linear or cyclic topologies and complete thermal recyclability, under readily accessible conditions (e.g., 1 atm, −40° C., THF). In that process, metal (La, Y)-catalyzed coordination ROP was found to be a highly effective method to achieve high MW PγBL (M$_n$ up to 30 kg/mol) and high monomer conversion (up to 90%). Considering the ROP of γ-BL to PγBL as the chemical route to the biomaterial P4HB, it would be desirable that PγBL could be produced by metal-free organopolymerization of γ-BL. However, commonly used organic catalysts highly effective for the ROP of typical cyclic esters, such as 1,5,7-triazabicyclo[4.4.0]dec-5-ene (TBD), failed to produce high MW PγBL, with M$_n$≤6.2 kg/mol and yield≤33%. Table Y1 summarizes the results of the ROP of γ-BL by five common organocatalysts, all of which produced low MW PγBL with low yield. In short, the development of an effective organopolymerization of the non-strained γ-BL that exhibits good activity and can produce high MW polyester has remained elusive, which was the central goal of this study.

TABLE Y1

Results of ROP of γ-BL by Different Organic Catalysts $^a$

| Run # | Catalyst $^d$ (cat) | Initiator (I) | γ-BL/cat/I | Solvent | Time (h) | Yield (%) $^b$ | M$_n^c$ kg/mol | Đ $^c$ (M$_w$/M$_n$) |
|---|---|---|---|---|---|---|---|---|
| 1 | DBU | BnOH | 20/1/2 | DCM | 24 | 0 | — | — |
| 2 | TBD | BnOH | 100/1/2 | DCM | 24 | 17 | 6.14 | 1.22 |
| 3 | TBD | Ph$_2$CHCH$_2$OH | 100/1/2 | DCM | 24 | 19 | 6.15 | 1.14 |
| 4 | TBD | Ph$_2$CHCH$_2$OH | 50/1/2 | DCM | 24 | 33 | 5.55 | 1.15 |
| 5 | IMes | BnOH | 100/1/1.5 | THF | 24 | 28 | 9.26 | 1.26 |
| 6 | TU/R$_3$N | PNOL | 100/5/1 | DCM | 24 | 0 | — | — |

Figure 16:
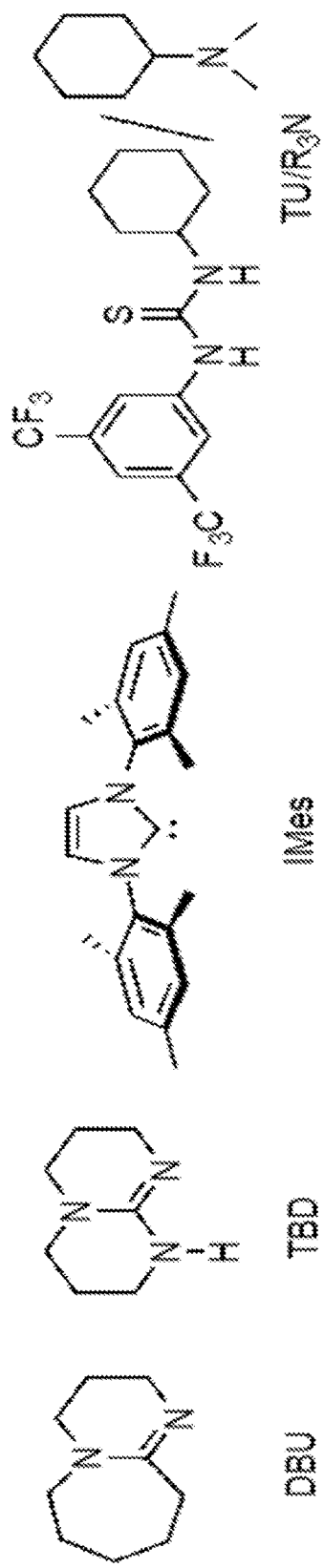
FIG. 16. Organic catalysts cited in Table Y1.

$^a$ Conditions: γ-BL = 0.42 g (4.9 mmol), [γ-BL] = 10M, V$_{solvent}$ = 0.115 mL, temperature = −40° C., the catalyst amount varied according to [γ-BL]/[catalyst] ratios.
$^b$ Isolated PγBL yield.
$^c$ M$_n$ and Đ determined by GPC at 40° C. in DMF relative to PMMA standards.
$^d$ FIG. 16.

Figure 17:
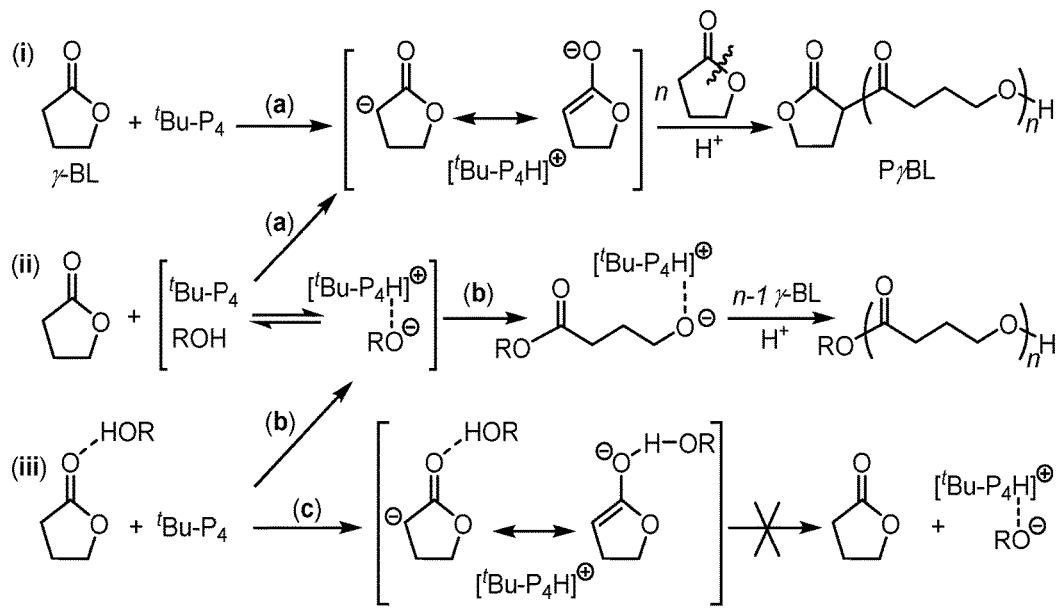
FIG. 17. ROP of γ-BL via three different mixing procedures.
Figure 17:
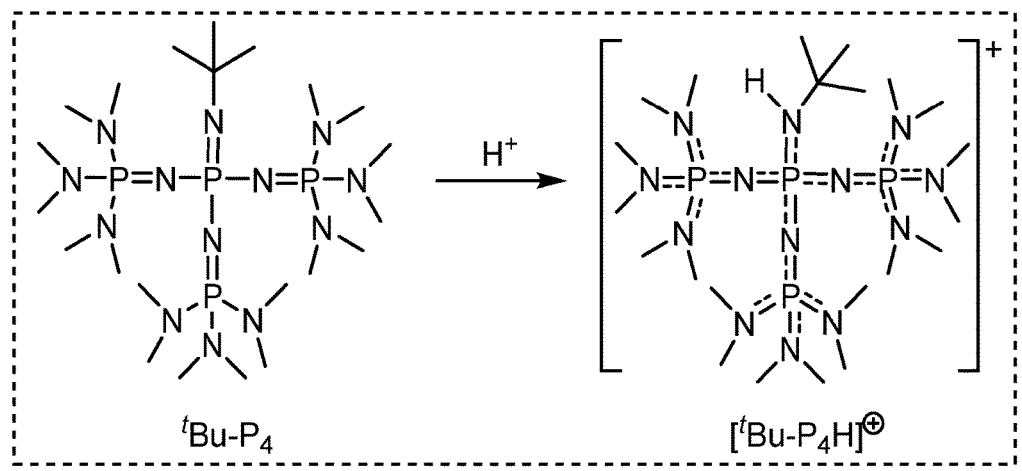

We hypothesized that the superbase $^t$Bu-P$_4$ may promote rapid organopolymerization of γ-BL to high MW PγBL through generation of highly active enolate anions via deprotonation of γ-BL by $^t$Bu-P$_4$, followed by the ROP events (FIG. 17 (i)). In fact, we showed experimentally and theoretically the feasibility for abstraction of the proton from α-C of γ-methyl-γ-butyrolactone (γ-valerolactone) by $^t$Bu-P$_4$ to generate reactive enolate species.

Guided by the above hypothesis and observation, we first examined the ROP of γ-BL using $^t$Bu-P$_4$ alone (1.0 mol % loading) in toluene at −40° C. Indeed, the ROP proceeded appreciably, achieving 30.4% conversion after 12 h and producing relatively high MW PγBL with $M_n$=26.4 kg/mol and Đ ($M_w/M_n$)=1.79 (run 1, Table Y2). Increasing the base loading to 2.0 and 10 mol %, the polymerization achieved higher conversions of 38.3 and 59.0%, while the resulting PγBL had lower MWs with $M_n$=20.7 (Đ=1.63, run 2) and 9.17 kg/mol (Đ=1.16, run 3), respectively. However, the polymerization was much more rapid and effective when $^t$Bu-P$_4$ was premixed with BnOH, followed by addition of γ-BL. Thus, with a [γ-BL]/[$^t$Bu-P$_4$]/[BnOH] ratio of 100/1/1, the ROP under the same conditions achieved 70% monomer conversion in 4 h (the reaction mixture gelled in 5 min), affording PγBL with $M_n$=26.7 kg/mol and Đ=2.01 (run 4). Interestingly, when the ROP was started by adding $^t$Bu-P$_4$ in toluene to a mixture of monomer and BnOH, the polymerization became much slower (34.7% conversion in 12 h) but more controlled, producing PγBL with a lower $M_n$ of 18.7 kg/mol and a narrower Đ of 1.37 (run 5).

molecular ion peaks, with the lower MW series A tentatively assigning to the cyclic PγBL with no chain ends [$M_{end}$=0+23 (Na$^+$) g/mol] and the higher MW series B to the linear PγBL with acylated lactone/H chain ends [$M_{end}$=86.03+23 (Na$^+$) g/mol]. Consistent with this bimodal MS distribution, the thermal gravimetric analysis (TGA) curve of this polymer also showed two compositions, with the cyclic structure (the more thermally stable component) being the minor component. Furthermore, the acylated lactone/H chain ends were confirmed by $^1$H and $^{13}$C NMR spectra, as evidenced by the resonances at δ 4.24-4.40 [—CH$_2$—OC(O)—], 3.07-3.16 [—C(O)—CH<] and 2.65 ppm [—CH$_2$—CH$_2$—OC(O)—] in NMR and the resonances at δ 194.26 (C=O), 67.46 [—CH$_2$—OC(O)—], 52.33 [—C(O)—CH<] and 30.87 ppm [—CH$_2$—CH$_2$—OC(O)—] in $^{13}$C NMR. These results are consistent with the mechanistic scenario (a) outlined in FIG. 17(i) involving deprotonation of γ-BL by $^t$Bu-P$_4$ to generate the reactive lactone enolate anion that initiates the rapid polymerization. Noteworthy is that the signals corresponding to the C=C double bond were absent in $^{13}$C NMR, indicating that initiation involves the nucleophilic attack by the C-bonded enolate rather than the O-bonded enolate.

The ability of $^t$Bu-P$_4$ to abstract α-H of γ-BL was also demonstrated by NMR studies of stoichiometric reactions. In a 1:1 ratio reaction in toluene-d$_8$ at room temperature (RT;

TABLE Y2

Results of ROP of γ-BL by Base/Alcohol Systems[a]

| Run # | Base (B) | Initiator (I) | M/B/I ratio | Temp. (° C.) | Solvent | Time (h) | Conv.[b] (%) | $M_n$[c] (kg/mol) | Đ[c] ($M_w/M_n$) |
|---|---|---|---|---|---|---|---|---|---|
| 1 | $^t$Bu-P$_4$ | — | 100/1/0 | −40 | TOL | 12 | 30.4 | 26.4 | 1.79 |
| 2 | $^t$Bu-P$_4$ | — | 50/1/0 | −40 | TOL | 12 | 38.3 | 20.7 | 1.63 |
| 3 | $^t$Bu-P$_4$ | — | 10/1/0 | −40 | TOL | 12 | 59.0 | 9.17 | 1.16 |
| 4 | $^t$Bu-P$_4$ | BnOH | 100/1/1 | −40 | TOL | 4 | 70.0 | 26.7 | 2.01 |
| 5[d] | $^t$Bu-P$_4$ | BnOH | 100/1/1 | −40 | TOL | 12 | 34.7 | 18.7 | 1.37 |
| 6 | $^t$Bu-P$_4$ | BnOH | 100/1/1 | −40 | THF | 4 | 81.0 | 26.2 | 2.05 |
| 7 | $^t$Bu-P$_4$ | BnOH | 100/1/1 | −40 | DMF | 4 | 56.0 | 22.1 | 1.71 |
| 8 | $^t$Bu-P$_4$ | BnOH | 100/1/1 | −28 | THF | 12 | 20.0 | 9.11 | 1.41 |
| 9 | $^t$Bu-P$_4$ | BnOH | 100/1/1 | 0 | THF | 12 | 2.24 | n.d. | n.d. |
| 10 | $^t$Bu-P$_4$ | BnOH | 100/1/1 | 25 | THF | 12 | 0 | — | — |
| 11 | $^t$Bu-P$_4$ | BnOH | 100/1/0.5 | −40 | THF | 12 | 52.4 | 27.1 | 2.11 |
| 12 | $^t$Bu-P$_4$ | BnOH | 100/1/1.5 | −40 | THF | 4 | 90.0 | 25.0 | 2.04 |
| 13 | $^t$Bu-P$_4$ | BnOH | 200/1/1 | −40 | THF | 12 | 56.0 | 18.2 | 1.62 |
| 14 | $^t$Bu-P$_4$ | Ph$_2$CHOH | 100/1/1 | −40 | THF | 4 | 85.0 | 23.2 | 1.97 |
| 15 | $^t$Bu-P$_4$ | $^i$PrOH | 100/1/1 | −40 | THF | 4 | 82.7 | 22.9 | 2.06 |
| 16 | $^t$Bu-P$_4$ | PBNOL | 100/1/1 | −40 | THF | 4 | 77.9 | 21.5 | 1.97 |
| 17 | $^t$Bu-P$_4$ | $^t$BuOH | 100/1/1 | −40 | THF | 4 | 60.0 | 18.0 | 1.81 |
| 18 | $^t$Bu-P$_2$ | BnOH | 100/1/1 | −40 | THF | 4 | 45.1 | 15.0 | 1.34 |
| 19 | $^t$Bu-P$_2$ | Ph$_2$CHOH | 100/1/1 | −40 | THF | 4 | 48.4 | 12.2 | 1.30 |
| 20 | $^t$Bu-P$_1$ | Ph$_2$CHOH | 100/1/1 | −40 | THF | 4 | 0 | — | — |
| 21 | $^t$BuOK | — | 100/1 | −40 | THF | 4 | 55.4 | 26.1 | 2.00 |
| 22 | $^t$BuOK | BnOH | 100/1/1 | −40 | THF | 4 | 74.5 | 17.7 | 1.54 |
| 23 | NaOMe | — | 100/1 | −40 | THF | 4 | 12.6 | 19.8 | 1.51 |
| 24 | NaOMe | BnOH | 100/1/1 | −40 | THF | 4 | 72.8 | 14.7 | 1.53 |
| 25 | KH | — | 100/1 | −40 | THF | 4 | 13.9 | 36.8 | 1.82 |
| 26 | KH | BnOH | 100/1/1 | −40 | THF | 4 | 73.3 | 21.7 | 1.71 |

[a]Conditions: [γ-BL] = 10M (4.9 g, 4.9 mmol); base and initiator were mixed first, followed by γ-BL; n.d. = not determined.
[b]Monomer conversion measured by $^1$H NMR.
[c]$M_n$ and Đ were determined by GPC at 40 ° C. in DMF relative to PMMA standards.
[d]BnOH initiator and γ-BL were mixed first, followed by addition of base.

Figure 7:
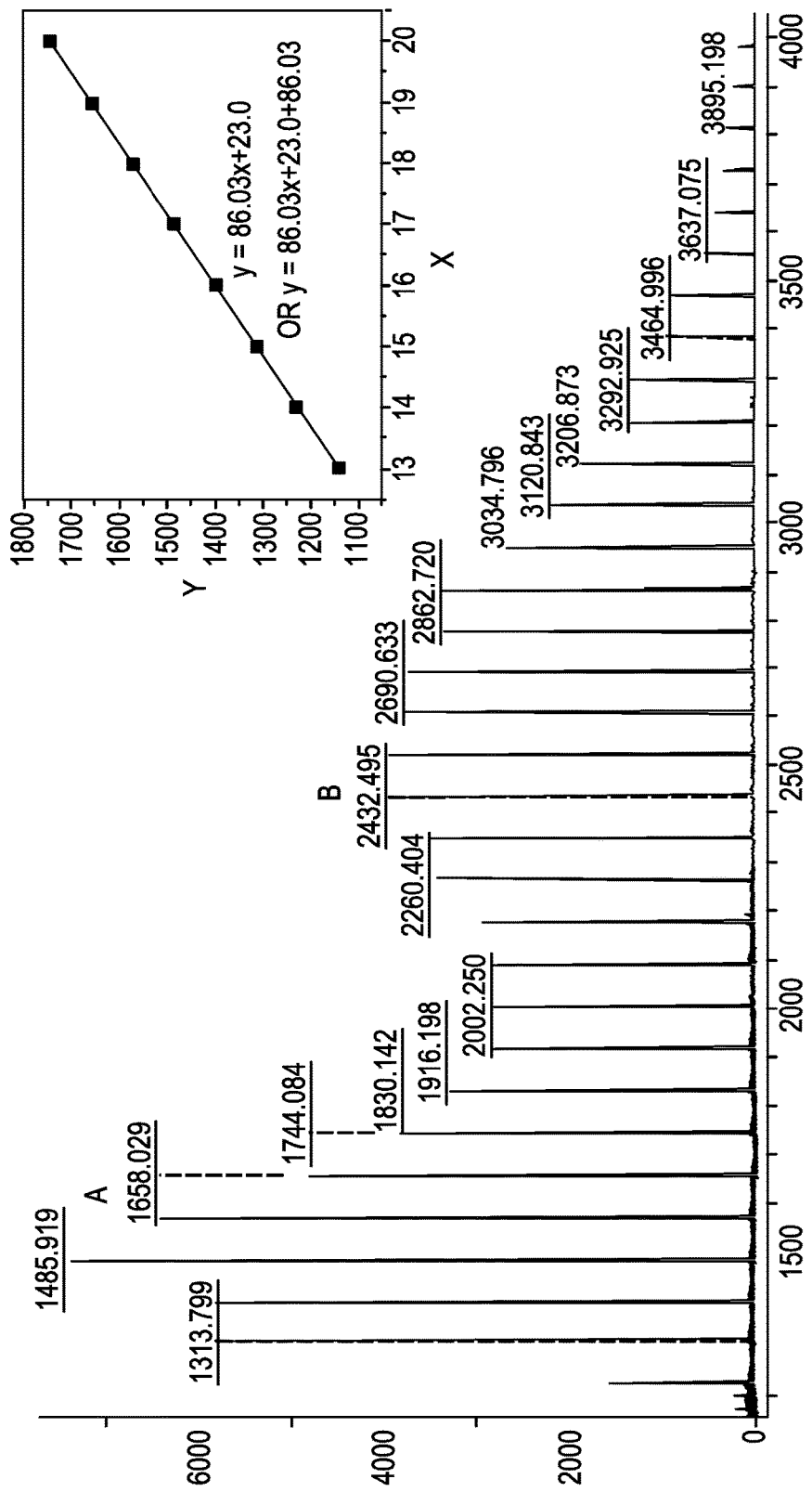
FIG. 7. MALDI-TOF mass spectrum of PγBL produced directly by $^t$Bu-P$_4$ (x=m/z, y=intensity). Inset: plot of m/z values (y) vs. the number of γ-BL repeat units (x).

The above intriguing findings from the above three different ROP procedures were further examined collaboratively through analysis by matrix-assisted laser desorption/ionization time-of-flight mass spectroscopy (MALDI-TOF MS) and NMR methods, and we subsequently explained the results with different initiating/propagating pathways. In the first procedure of the ROP by $^t$Bu-P$_4$ alone, the MS spectrum (FIG. 7) of the resulting PγBL consists of two series of under which conditions no polymerization took place), $^1$H NMR spectrum taken after 10 min showed that all γ-BL was consumed but not all $^t$Bu-P$_4$ (δ 2.68 and 1.68 ppm in $^1$H NMR; δ 4.84 and −25.34 ppm in $^{31}$P NMR). The formation of [$^t$Bu-P$_4$H]$^+$ was confirmed via signals at δ 8.14-8.40, 2.56 and 1.50 ppm in $^1$H NMR and δ 12.46 and −23.84 ppm in $^{31}$P NMR. Increasing the amount of γ-BL to 2.2 equiv. fully consumed all $^t$Bu-P$_4$, indicating that 1 equiv. of $^t$Bu-P$_4$ reacts with 2 equiv. of γ-BL to form an ion pair. The anion showed a complex series of resonances in $^1$H NMR (toluene-$d_8$), which was further analyzed by $^1$H-$^1$H COSY spectra. Overall, these results indicated that the direct reaction of γ-BL and $^t$Bu-P$_4$ formed [$^t$Bu-P$_4$H]$^+$ paired with an anionic dimer which can exist in either the ring-retention or ring-opening form, the ratio of which can be varied with reaction conditions (substrate ratio and reaction time). The NMR spectra taken in bromobenzene-$d_5$ are consistent with the above structural analysis.

The second procedure of the ROP started by adding γ-BL to a premixed solution of $^t$Bu-P$_4$ and BnOH resulted in the enhanced rate of the polymerization over the system by using $^t$Bu-P$_4$ alone (vide supra). Monitoring the stoichiometric reaction between BnOH and $^t$Bu-P$_4$ at RT by $^1$H NMR clearly revealed formation of complex [$^t$Bu-P$_4$H$^+$—OBn$^-$] which is weakly paired through H-bonding, as evidenced by the disappearance of the signal of the PhCH$_2$OH proton at 1.26 ppm and other corresponding spectral changes; the signal of the [$^t$Bu-P$_4$H]$^+$ proton was not observed at RT due to fast proton exchange, but the resonance of this proton at 13.9 ppm was observed at –60° C. The MS spectrum of the PγBL produced by this procedure exhibited two series of molecular ion peaks, corresponding to PγBL with acylated lactone/H chain ends (A series) and BnO/H chain ends (B series); the presence of such chain ends was also confirmed by $^1$H NMR, showing a ~1:1 ratio of the two types of the chain ends. Overall, these results are consistent with the mechanistic scenario outlined in FIG. 17(ii), involving initiation pathways via both the BnO$^-$ anion (pathway b) and the enolate anion (pathway a) formed through deprotonation of BnOH and γ-BL by $^t$Bu-P$_4$, respectively. This dual initiation gave faster rates of polymerization but also led to PγBL with a broader molecular weight distribution (Đ=2.01).

The third procedure of the polymerization started by adding $^t$Bu-P$_4$ to the mixture of γ-BL and BnOH led to the decreased activity but increased control (vide supra). The stoichiometric reaction between γ-BL and BnOH revealed weak activation of BnOH by γ-BL through hydrogen bonding. The MS spectrum of the PγBL obtained using this procedure also showed two series of molecular ion peaks attributed to acylated lactone/H and BnO/H chain ends, with the estimated ratio of acylated lactone/BnO=15/85 by $^1$H NMR. Overall, these results are consistent with the mechanistic scenario outlined in FIG. 17(iii), involving also two initiation pathways via the BnO$^-$ anion (pathway b) and the enolate anion (pathway a). However, this procedure apparently preferred pathway b over a, thus producing PγBL with predominant BnO/H chain ends. In addition, pathway b involves the stabilized propagating alkoxide chain ends via H-bonding, thus accounting for the observed more controlled polymerization. The reduced activity is presumably due to the presence of non-productive pathway c, namely (i)+ROH, as we observed that the system became inactive when BnOH was added to the premixed solution of $^t$Bu-P$_4$ and γ-BL (pathway a).

Figure 8:
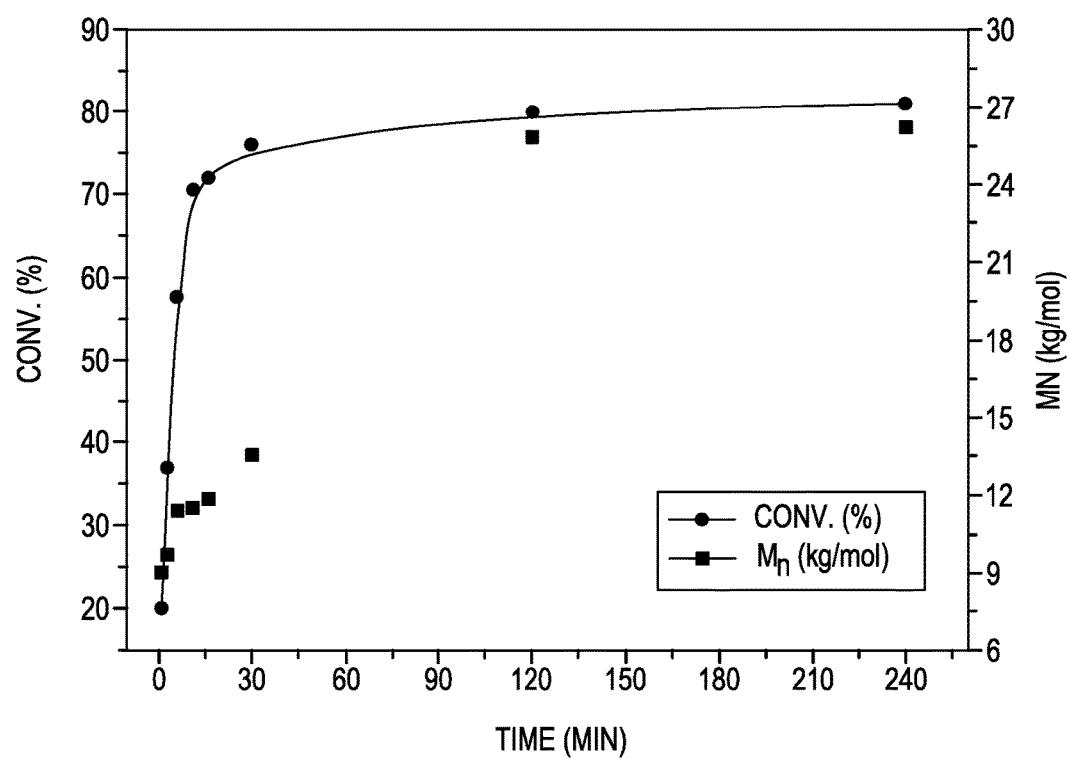
FIG. 8. Dependence of monomer conversion and M$_n$ on polymerization time. Conditions: γ-BL/$^t$Bu-P$_4$/BnOH=100/1/1, THF, −40° C., 10 M. Time (min), conversion (%), M. (kg/mol), D (M$_w$/M$_n$): 1, 20, 9.01, 1.14; 3, 37, 9.62, 1.25; 6, 57.6, 11.4, 1.39; 11, 70.7, 11.5, 1.44; 16, 72.0, 11.8, 1.46; 30, 76.0, 13.5, 1.50; 120, 80.0, 25.8, 1.98; 240, 81.0, 26.2, 2.05.

Fixing the ROP procedure to FIG. 17(ii), which was the most rapid polymerization system and also produced PγBL with the highest MW, we further explored this ROP under different reaction conditions, initiators and bases. First, changing the solvent from the relative nonpolar toluene to polar dichloromethane (DCM) resulted in no monomer conversion due to rapid decomposition of $^t$Bu-P$_4$ in this solvent (dissolving $^t$Bu-P$_4$ in DCM resulted in a brown solution). On the other hand, performing the polymerization in THF enhanced the conversion to 81.0% (run 6) from 70.0% in toluene while the MW remained high (M$_n$=26.2 kg/mol). However, using the more polar DMF decreased the activity achieving only modest conversion of 56.0% (run 7). Kinetic profiling of the ROP at –40° C. in THF revealed that the ROP proceeded rapidly in the beginning and conversion up to 70.7% was achieved in only 11 min (FIG. 8), after which time the ROP went slowly and achieved only additional 10% of monomer conversion in next 4 h. However, a gradual increase in MW of the resulting polymers was observed. Second, elevating the temperature from –40° C. to –28° C., the conversion decreased drastically from 81.0% to 20.0% (run 8), and the conversion was only 2.24% for the polymerization at 0° C. (run 9) and no polymerization was observed at 25° C. (run 10). Third, increasing the amount of BnOH from 0.5 to 1.0 to 1.5 equiv. relative to $^t$Bu-P$_4$, the conversion enhanced significantly from 52.4% (12 h, run 11) to 81.0% (4 h, run 6) to 90.0% (4 h, run 12) with only a little change in polymer MW (M$_n$=25.0-27.1 kg/mol). On the other hand, increasing the [γ-BL]/[BnOH] ratio from 100/1 to 200/1 led to a decrease in MW from 26.2 to 14.4 kg/mol (run 13), caused presumably by chain transfer to monomer. Fourth, screening the alcohols having different steric bulk and acidity included BnOH, Ph$_2$CHOH, PrOH, PBNOL, and $^t$BuOH. Under the same conditions, the γ-BL conversion was found to increase in the following order: $^t$BuOH<PBNOL<BnOH<$^i$PrOH<Ph$_2$CHOH (runs 6, 14-17), which apparently correlates with the steric bulk and acidity of alcohol and the nucleophilicity of the alkoxy anion. Fifth, under the same conditions for the base/ROH system, the weaker base $^t$Bu-P$_2$ (the basicity of which is not high enough to deprotonate γ-BL) reduced the conversion by about one half (runs 18 and 19) compared with that by $^t$Bu-P$_4$, while no activity was observed when the weakest base of the series, $^t$Bu-P$_1$, was employed (run 20). These results showed that the ROP activity decreases with decreasing the basicity of the superbase, which correlates well with the degree of alcohol activation as revealed by NMR analysis.

As a comparative study, we also investigated the performance of some common inorganic bases including $^t$BuOK, NaOMe and KH. Overall, the polymerizations by such bases were less active than that by $^t$Bu-P$_4$, either using alone or in combination with BnOH (runs 21-26), although in some cases comparable (M$_n$=26.1 kg/mol by $^t$BuOK) or even higher (M$_n$=36.8 kg/mol by KH) MW polymers can be achieved. Investigations by MS and NMR also indicated that the initiation pathways via monomer deprotonation and alcohol activation by the base are similar to those already demonstrated by $^t$Bu-P$_4$.

Figure 9:
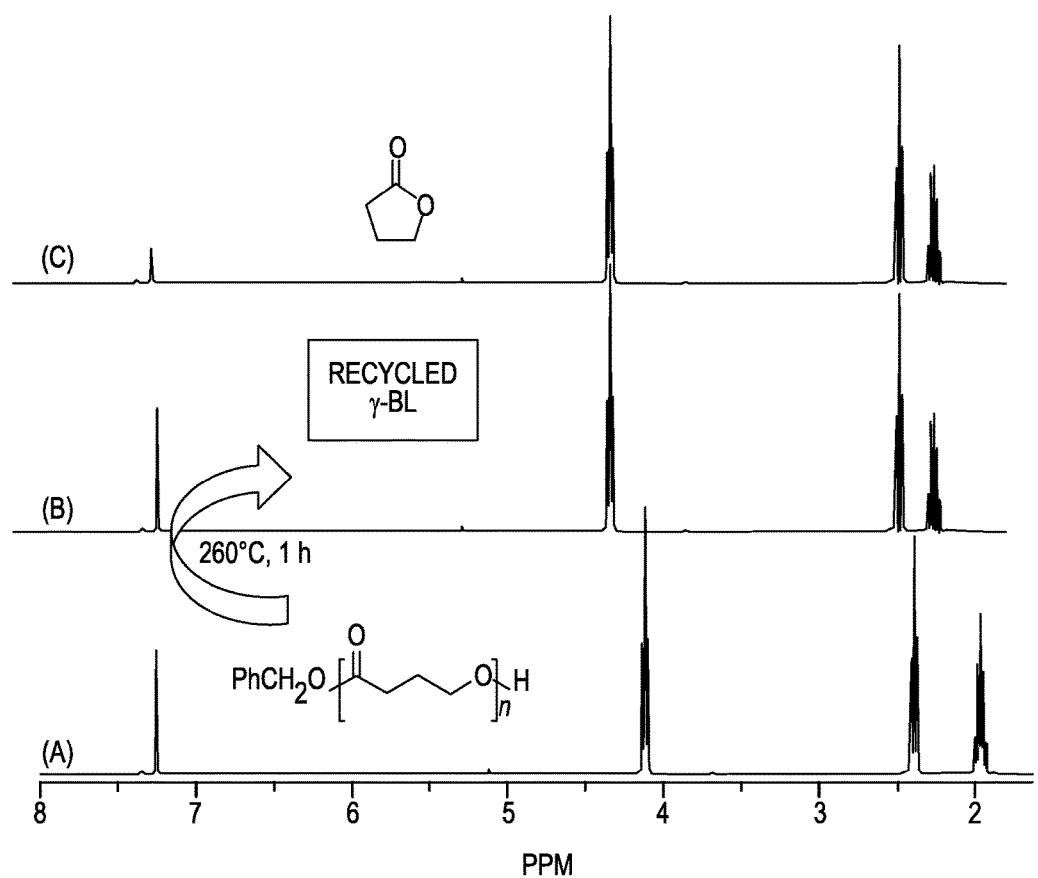
FIG. 9. $^1$H NMR spectra (CDCl$_3$, 25° C.): (a) PγBL (M$_n$=26.7 kg/mol, prepared by $^t$Bu-P$_4$/BnOH); (h) the liquid product obtained after heating PγBL at 260° C. for 1 h; (c) γ-BL monomer for comparison.

In conclusion, we have developed the first effective organopolymerization of the bio-derived non-strained five-membered lactone γ-BL for the synthesis of high MW, metal-free polyester PγBL. As the PγBL produced by the metal-mediated coordination ROP, the PγBL obtained by the current organopolymerization is completely recyclable back to its monomer in the pure state upon heating the bulk polymer at 260° C. for 1 h (FIG. 9). The BnO/H end groups also reform back to the starting initiator BnOH after thermal recycling. The superbase $^t$Bu-P$_4$ can directly initiate this challenging ROP through deprotonation of γ-BL to generate the reactive enolate species. However, an even more effective ROP system is based on the H-bonding paired complex [$^t$Bu-P$_4$H$^+$—OBn$^-$], formed via mixing of $^t$Bu-P$_4$ with ROH; this system enabled high monomer conversions (up to 90%) and high MW polymers (M$_n$ up to 26.7 kg/mol) in a relatively short time period (4 h or less). Investigations into the effects of reaction conditions as well as structures of alcohol initiators and organic base catalysts have identified the currently most effective organic initiator and catalyst for this ROP to be BnOH or Ph$_2$CHOH and $^t$Bu-P$_4$ superbase, respectively. An understanding of mechanistic scenarios of this organopolymerization has also led to the effective ROP system based on simple inorganic bases such as $^t$BuOK/BnOH and KH/BnOH. Overall, the results reported herein established PγBL as a truly sustainable polymer: it is biorenewable, organically synthesized, and completely recyclable.

Ring-Opening Vs Vinyl-Addition Polymerization of Tulipalin A: Controlling Chemoselectivity for Fully Recyclable Unsaturated Polyester.

α-Methylene-γ-butyrolactone (MBL), a naturally occurring bifunctional monomer, contains both a highly reactive exocyclic C=C bond and a highly stable five-membered γ-butyrolactone ring. Thus, all previous work led to exclusive vinyl-addition polymer P(MBL)$_{ADD}$. The disclosure provided herein now reverses the conventional chemoselectivity to enable the first ring-opening polymerization (ROP) of MBL, thereby producing exclusively unsaturated polyester P(MBL)$_{ROP}$ with $M_n$ up to 21.0 kg/mol. Remarkably, P(MBL)$_{ROP}$ can be not only readily post-functionalized into cross-linked or thiolated materials, but also fully recycled back to its monomer after heating its solution in the presence of a simple catalyst.

Figure 18:
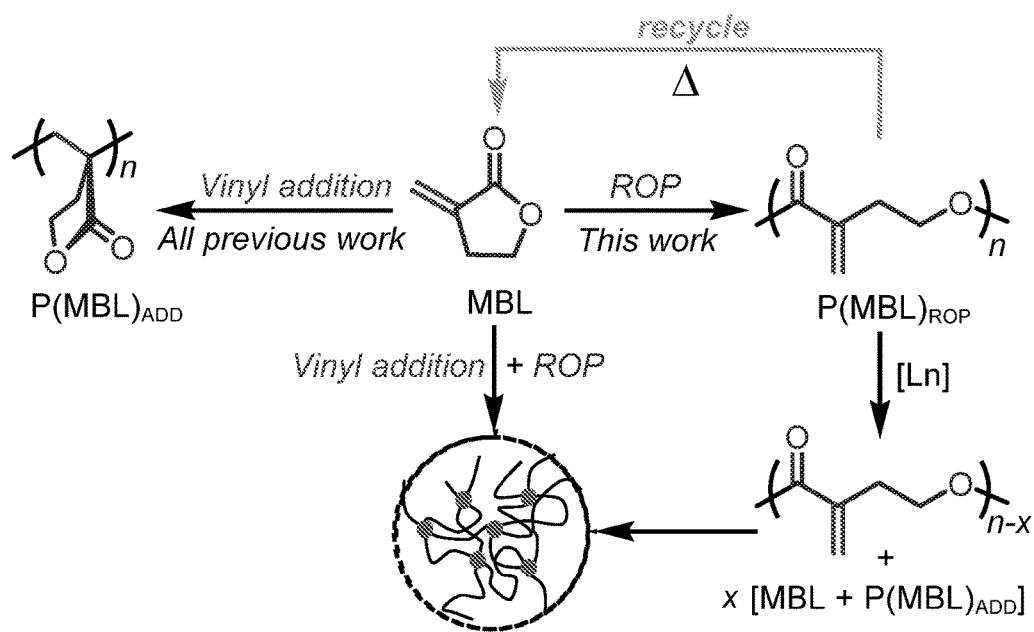
FIG. 18. Vinyl-addition polymerization of MBL of all previous work vs. ROP of MBL of the current work leading to recyclable and post-functionalizable unsaturated polyester.

Found naturally in tulips or produced chemically from biomass feedstocks, tulipalin A [α-methylene-γ-butyrolactone (MBL), FIG. 18 is the simplest member of the sesquiterpene lactone family and the most studied monomer of the bio-based tulipalin family for biorenewable polymers. MBL, along with its γ-methyl- and β-methyl-substituted derivatives $_γ$MMBL and $_β$MMBL, derived from biomass-sourced levulinic and itaconic acids, respectively, exhibits higher reactivity and forms polymers with superior materials properties, relative to its linear analog methyl methacrylate, thereby receiving a renaissance of interest in the prospects of offering a renewable alternative to the petroleum-based methacrylates for the production of specialty chemicals and acrylic bioplastics. In this context, various types of polymerization processes have been employed to polymerize such renewable methylene lactones, including radical, anionic, zwitterionic, group-transfer, organocatalytic, and coordination polymerization methods. Regardless of the method, however, the processes reported to date produced exclusively vinyl-addition polymer P(MBL)$_{ADD}$, proceeding through conjugate addition across the highly reactive exocyclic C=C double bond without ring-opening of the stable five-membered γ-butyrolactone (γ-BL) ring.

An intriguing fundamental question is whether one could reverse this conventional chemoselectivity by turning on the ring-opening polymerization (ROP) of MBL while shutting down the vinyl-addition polymerization, which would enable the synthesis of degradable unsaturated polyesters (FIG. 18). Such unsaturated polyesters will provide needed functional handles compared to the aliphatic polyesters prepared by the ROP of typical lactones and lactides, as they can be post-functionalized into tailor-made polyester materials. However, achieving this objective was met with two challenges: the high reactivity of the exocyclic C=C double bond (vide supra) and the high stability of the γ-BL ring (vide infra) present in MBL, both of which point to the exclusive vinyl-addition polymerization pathway observed to date. In fact, the non-strained γ-BL was commonly referred as "non-polymerizable". The non-polymerizability observed in the ROP of γ-BL under ambient pressure can be explained by its unfavorable thermodynamics as the large negative entropic penalty is not compensated by the small change of enthalpy. As discussed above, we recently discovered thermodynamic, catalytic, and processing conditions that enabled the first successful chemical ROP of γ-BL into high molecular weight (MW) poly(γ-BL), PγBL, with controlled linear or cyclic topologies and complete thermal recyclability, under readily accessible conditions (e.g., 1 atm, −40° C., THF). In that process, metal (La, Y)-catalyzed coordination ROP was found to be a highly effective method to achieve high MW PγBL and high monomer conversion. We also recently discovered the organocatalytic ROP of γ-BL to high MW PγBL, establishing PγBL as a truly sustainable material.

However, enabling the ROP of the bifunctional MBL, known to favor vinyl addition and resist ROP, is even more challenging, due to the additional obstacle to control the chemoselectivity. A known strategy to ring-open polymerize MBL is to copolymerize it with a lactone having high ring strain energy, such as ε-caprolactone (ε-CL). This ring-opening copolymerization (ROC) approach has indeed produced copolyester P(MBL)$_{ROP}$-co-PCL. Interestingly, we found that, while performing the ROC by Bi(OTf)$_3$ at 130° C. led to a mixture of P(MBL)$_{ROP}$-co-PCL and vinyl-addition polymer P(MBL)$_{ADD}$, carrying out the ROC by lanthanide (Ln)-based coordination polymerization catalysts at sub-zero temperatures greatly favored incorporation of the ring-opened MBL into the copolyester, thus achieving P(MBL)$_{ROP}$-co-PCL with the MBL incorporation up to 40 mol % and without formation of P(MBL)$_{ADD}$. Based on these earlier results, we hypothesized that uncovering the thermodynamic, catalytic, and processing conditions could eventually lead to a homopolymerization system that renders the first ROP of MBL to produce exclusively unsaturated polyester P(MBL)$_{ROP}$, which was the central objective that this work has achieved (FIG. 18, above).

Figure 10:
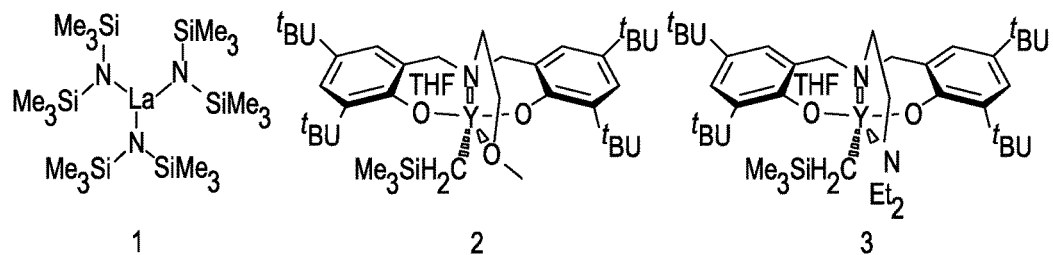
FIG. 10. Overlay of $^1$H NMR spectra (DMSO-$d_6$, residual peak marked as *) of MBL (i), P(MBL)$_{ROP}$ (ii), and P(MBL)$_{ADD}$ (iii).
Figure 10:
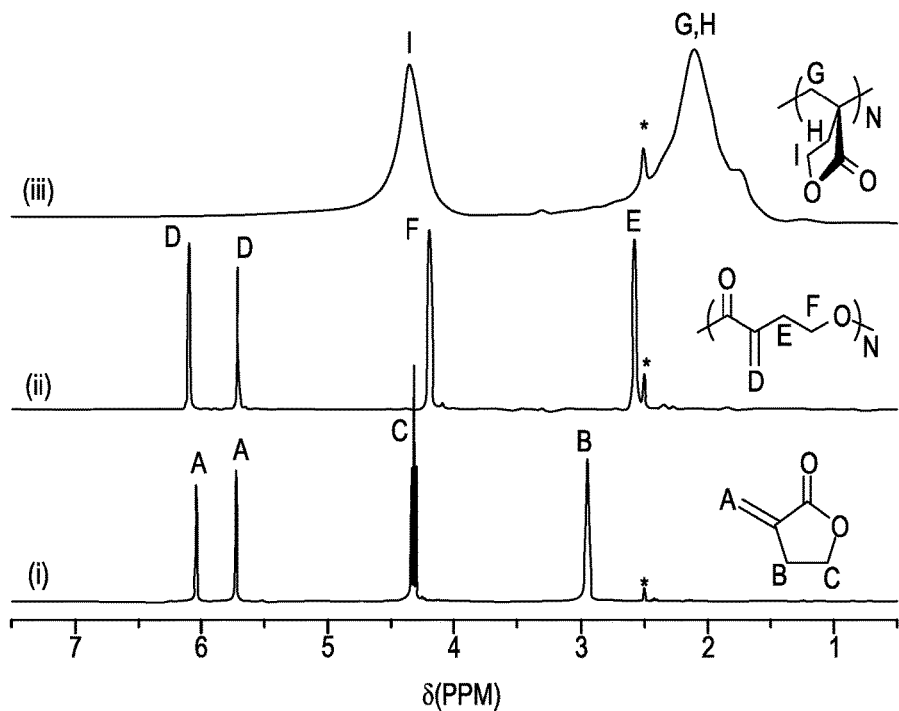

At the outset, lanthanum complex La[N(SiMe$_3$)$_2$]$_3$ (1), which has been shown to be an effective catalyst for the ROP of γ-BL, was used for initial screening of the polymerization of MBL. As anticipated, at room temperature it mediated rapid vinyl-addition polymerization with or without addition of initiator BnOH, leading to exclusive formation of P(MBL)$_{ADD}$ [runs 1-4, Table Z1, FIG. 10(iii)].

TABLE Z1

Results of MBL Polymerization by La[N(SiMe$_3$)$_2$]$_3$/BnOH in Toluene at 25 °C.$^a$

| Run # | Initiator (I) | [MBL]/ [La]/[I] | Time (min) | Polymer (mg) | Yield$^b$ (%) | $M_n^c$ (kg/mol) | Đ$^c$ ($M_w$/ $M_n$) | Polymer type |
|---|---|---|---|---|---|---|---|---|
| 1 | — | 100/1/- | 7 | 196 | 40 | 29.8 | 2.07 | Vinyl addition |
| 2 | BnOH | 100/1/1 | 7 | 281 | 57 | 23.4 | 2.81 | Vinyl addition |
| 3 | BnOH | 100/1/2 | 7 | 270 | 55 | 21.6 | 3.61 | Vinyl addition |
| 4 | BnOH | 100/1/3 | 7 | 266 | 54 | 14.0 | 3.35 | Vinyl addition |

$^a$Conditions: MBL = 0.49 g (5 mmol), [MBL] = 5.0M, toluene as the solvent, $V_{solvent}$ = 0.56 mL, 7 min, the La catalyst and initiator amount varied according to the [MBL]/[cat]/[I] ratio.
$^b$Isolated polymer yield.
$^c M_n$ and Đ determined by GPC at 40 °C. in DMF relative to PMMA standards.

To realize the possible ROP of MBL, subsequent polymerizations were conducted at low temperatures, ranging from −40° C. to −78° C., in different solvents (THF, DMF, dichloromethane), with different alcohol initiators, and in varied MBL/La/ROH ratios, the results of which were summarized in Table Z2. At −60° C. in THF with a 1.0 mol % loading of 1 and [MBL]=5.0 M (the maximum concentration achievable at this temperature), the polymerization still gave the vinyl-addition product P(MBL)$_{ADD}$ (run 1, Table Z2).

TABLE Z2

Results of MBL Polymerization by Ln/ROH Catalyst/Initiator Systems[a]

| Run # | Catalyst (cat) | Initiator (I) | [MBL]/[cat]/[I] | Solvent | MBL conc. (mol/L) | Temp. (° C.) | Time (h) | Yield[b] [mg (%)] | $M_n$[c] (kg/mol) | Đ[c] ($M_w/M_n$) | Polymer type |
|---|---|---|---|---|---|---|---|---|---|---|---|
| 1 | 1 | — | 100/1/- | THF | 5.0 | −60 | 3 | 110 (22%) | 54.2 | 2.85 | Vinyl-addition |
| 2 | 1 | BnOH | 100/1/1 | THF | 5.0 | −60 | 24 | 74 (15%) | n.d. | n.d. | Cross-linked |
| 3 | 1 | BnOH | 100/1/2 | THF | 5.0 | −60 | 24 | 100 (20%) | n.d. | n.d. | Cross-linked + Vinyl-addition + Ring-opening |
| 4 | 1 | BnOH | 100/1/3 | THF | 5.0 | −60 | 12 | 51 (10%) | 5.1 | 1.16 | Ring-opening |
| 5 | 1 | BnOH | 100/1/3 | THF | 5.0 | −60 | 17 | 145 (30%) | 5.0 | 1.26 | Ring-opening |
| 6 | 1 | BnOH | 100/1/3 | THF | 5.0 | −60 | 24 | 158 (32%) | 5.5 | 1.16 | Ring-opening |
| 7 | 1 | BnOH | 100/1/4 | THF | 5.0 | −60 | 24 | 35 (7.1%) | 3.8 | 1.17 | Ring-opening |
| 8 | 1 | BnOH | 200/1/3 | THF | 5.0 | −60 | 24 | 156 (32%) | 10.4 | 1.28 | Ring-opening |
| 9 | 1 | BnOH | 400/1/3 | THF | 5.0 | −60 | 24 | 17 (3.5%) | 5.6 | 1.15 | Ring-opening |
| 10 | [La(OBn)$_3$]$_n$ | — | 100/1/- | THF | 5.0 | −60 | 24 | 108 (22%) | 5.2 | 1.21 | Ring-opening |
| 11 | 1 | BnOH | 100/1/3 | DMF | 5.0 | −60 | 24 | 40 (8.2%) | 15.6 | 2.08 | Vinyl-addition |
| 12 | 1 | BnOH | 100/1/2 | THF | 2.5 | −60 | 18 | 141 (29%) | n.d. | n.d. | Cross-linked |
| 13 | 1 | BnOH | 100/1/3 | THF | 2.0 | −60 | 24 | trace | n.d. | n.d. | Cross-linked |
| 14 | 1 | BnOH | 100/1/2 | THF | 1.7 | −78 | 48 | 100 (20%) | n.d. | n.d. | Cross-linked |
| 15 | 1 | BnOH | 100/1/3 | THF | 2.0 | −78 | 24 | 9 (1.8%) | n.d. | n.d. | Cross-linked |
| 16 | 1 | BnOH | 100/1/3 | THF | 8.0 | −40 | 24 | 95 (19%) | 5.0 | 1.28 | Ring-opening |
| 17 | 1 | BnOH | 100/1/3 | THF | 5.0 | −40 | 24 | 14 (2.9%) | n.d. | n.d. | Cross-linked |
| 18 | 1 | BnOH | 100/1/2 | THF | 8.0 | −40 | 16 | 409 (84%) | n.d. | n.d. | Cross-linked |
| 19 | 1 | BnOH | 100/1/2 | THF | 5.0 | −40 | 16 | 320 (65%) | n.d. | n.d. | Cross-linked + Vinyl-addition |
| 20 | 1 | Ph$_2$CHCH$_2$OH | 100/1/1 | THF | 5.0 | −60 | 24 | 108 (22%) | n.d. | n.d. | Cross-linked + Vinyl-addition + Ring-opening |
| 21 | 1 | Ph$_2$CHCH$_2$OH | 100/1/2 | THF | 5.0 | −60 | 12 | 184 (38%) | n.d. | n.d. | Cross-linked + Vinyl-addition + Ring-opening |
| 22 | 1 | Ph$_2$CHCH$_2$OH | 100/1/3 | THF | 5.0 | −60 | 12 | 136 (28%) | 5.8 | 1.23 | Ring-opening |
| 23[d] | 1 | Ph$_2$CHCH$_2$OH | 100/1/3 | THF | 5.0 | −60 | 24 | 209 (43%) | 5.3 | 1.24 | Ring-opening |
| 24 | 1 | Ph$_2$CHCH$_2$OH | 100/1/3 | DCM | 5.0 | −60 | 24 | 67 (14%) | 4.7 | 1.18 | Ring-opening |
| 25 | 1 | Ph$_2$CHCH$_2$OH | 200/1/3 | THF | 5.0 | −60 | 24 | 205 (42%) | 6.7 | 1.17 | Ring-opening |
| 26 | 1 | Ph$_2$CHCH$_2$OH | 100/1/3 | THF | 8.0 | −40 | 24 | 59 (12%) | 5.3 | 1.21 | Ring-opening |
| 27 | 1 | Ph$_2$CHOH | 100/1/1 | THF | 5.0 | −60 | 24 | 54 (11%) | n.d. | n.d. | Vinyl-addition + Ring-opening |
| 28 | 1 | Ph$_2$CHOH | 100/1/2 | THF | 5.0 | −60 | 24 | 117 (24%) | n.d. | n.d. | Cross-linked + Vinyl-addition + Ring-opening |
| 29 | 1 | Ph$_2$CHOH | 100/1/3 | THF | 5.0 | −60 | 24 | 12 (2.4%) | n.d. | n.d. | Cross-linked + Vinyl-addition + Ring-opening |
| 30 | 1 | Ph$_2$CHOH | 100/1/2 | THF | 8.0 | −40 | 16 | 358 (73%) | n.d. | n.d. | Cross-linked + Vinyl-addition |
| 31 | 1 | Ph$_2$CHOH | 100/1/3 | THF | 8.0 | −40 | 24 | 16 (3.3%) | n.d. | n.d. | Vinyl-addition + Ring-opening |
| 32 | 1 | $^i$PrOH | 100/1/1 | THF | 5.0 | −60 | 24 | 152 (31%) | n.d. | n.d. | Cross-linked + Vinyl-addition + Ring-opening |
| 33 | 1 | $^i$PrOH | 100/1/2 | THF | 5.0 | −60 | 16 | 161 (33%) | n.d. | n.d. | Cross-linked + Vinyl-addition + Ring-opening |
| 34 | 1 | $^i$PrOH | 100/1/3 | THF | 5.0 | −60 | 12 | 66 (14%) | 4.6 | 1.45 | Ring-opening |
| 35 | 1 | $^i$PrOH | 100/1/3 | THF | 5.0 | −60 | 24 | 172 (35%) | 4.7 | 1.15 | Ring-opening |
| 36 | 1 | $^i$PrOH | 200/1/3 | THF | 5.0 | −60 | 24 | 155 (32%) | 5.6 | 1.19 | Ring-opening |
| 37 | 1 | C$_6$H$_4$(CH$_2$OH)$_2$ | 100/1/1.5 | THF | 5.0 | −60 | 24 | 12 (2.4%) | n.d. | n.d. | Cross-linked |
| 38 | 1 | C$_6$H$_4$(CH$_2$OH)$_2$ | 100/1/1.5 | DCM | 5.0 | −60 | 24 | 31 (6.3%) | n.d. | n.d. | Vinyl-addition + Cross-linked |
| 39 | 1 | C$_6$H$_4$(CH$_2$OH)$_2$ | 100/1/2 | THF | 5.0 | −60 | 24 | trace | — | — | — |
| 40[e] | 1 | C$_6$H$_4$(CH$_2$OH)$_2$ | 100/1/1.5 | THF | 5.0 | −60 | 2 | 59 (12%) | n.d. | n.d. | Vinyl-addition |
| 41 | 2 | — | 100/1/- | THF | 5.0 | −60 | 4 | 140 (29%) | 16.9 | 1.53 | Ring-opening |
| 42 | 2 | — | 100/1/- | THF | 5.0 | −60 | 6 | 170 (35%) | 14.3 | 1.79 | Ring-opening |
| 43 | 2 | — | 100/1/- | THF | 5.0 | −60 | 12 | 251 (51%) | 18.3 | 1.75 | Ring-opening |
| 44 | 2 | — | 200/1/- | THF | 5.0 | −60 | 5 | 138 (28%) | 18.3 | 1.76 | Ring-opening |
| 45 | 2 | — | 200/1/- | THF | 5.0 | −60 | 12 | 198 (40%) | 21.0 | 1.75 | Ring-opening |
| 46 | 2 | — | 400/1/- | THF | 5.0 | −60 | 24 | 36 (7.4%) | 12.3 | 1.43 | Ring-opening |
| 47[f] | 2 | — | 100/1/- | THF | 5.0 | −60 | 12 | 2700 (55%) | 21.0 | 1.42 | Ring-opening |
| 48 | 2 | BnOH | 100/1/1 | THF | 5.0 | −60 | 24 | 11 (2.2%) | 3.9 | 1.11 | Ring-opening |
| 49 | 2 | $^i$PrOH | 100/1/1 | THF | 5.0 | −60 | 24 | 86 (18%) | 4.8 | 1.19 | Ring-opening |
| 50 | 2 | Ph$_2$CHCH$_2$OH | 100/1/1 | THF | 5.0 | −60 | 24 | 75 (15%) | 5.5 | 1.15 | Ring-opening |
| 51 | 3 | — | 100/1/- | THF | 5.0 | −60 | 24 | 24 (4.9%) | 10.6 | 1.19 | Ring-opening |
| 52 | 3 | $^i$PrOH | 100/1/1 | THF | 5.0 | −60 | 24 | 5 (1.0%) | n.d. | n.d. | Ring-opening |
| 53 | Mg$^n$Bu$_2$ | — | 100/1/- | THF | 5.0 | −60 | 5 | 217 (44%) | n.d. | n.d. | Cross-linked + Vinyl-addition |

TABLE Z2-continued

Results of MBL Polymerization by Ln/ROH Catalyst/Initiator Systems[a]

| Run # | Catalyst (cat) | Initiator (I) | [MBL]/ [cat]/[I] | Solvent | MBL conc. (mol/L) | Temp. (° C.) | Time (h) | Yield[b] [mg (%)] | $M_n$[c] (kg/mol) | Đ[c] ($M_w/M_n$) | Polymer type |
|---|---|---|---|---|---|---|---|---|---|---|---|
| 54 | Mg$^n$Bu$_2$ | BnOH | 100/1/1 | THF | 5.0 | −60 | 5 | 332 (68%) | n.d. | n.d. | Cross-linked + Vinyl-addition |
| 55 | Mg$^n$Bu$_2$ | BnOH | 100/1/2 | THF | 5.0 | −60 | 24 | — | n.d. | n.d. | — |
| 56 | Mg$^n$Bu$_2$ | Ph$_2$CHCH$_2$OH | 100/1/2 | THF | 5.0 | −60 | 2 | 252 (51%) | n.d. | n.d. | Cross-linked + Vinyl-addition + Ring-opening |
| 57 | Mg$^n$Bu$_2$ | Ph$_2$CHOH | 100/1/2 | THF | 5.0 | −60 | 24 | trace | — | — | — |

[a]Conditions: MBL = 0.49 g (5.0 mmol). the catalyst and initiator amount varied according to [MBL]/[cat]/[I] molar ratio.
N.D. (not determined) $M_n$ and Đ not determined) due to cross-linking.
[b]Isolated polymer yield.
[c]$M_n$ and Đ determined by GPC at 40 °C. in DMF relative to PMMA standards.
[d]The monomer conversion was 52%. No polymer precipitation occurred with 1 h, which occurred after a few hours. The reaction mixture was solidified within 15 h.
[e]Alcohol was first mixed with MBL, and the polymerization was started by addition of La[N(SiMe$_3$)$_2$]$_3$ in THF.
[f]MBL = 4.9 g (50 mmol), [MBL] = 5.0 M in THF, $V_{THF}$ = 5.6 mL.

As alcohols react readily with Ln amides via in situ alcoholysis to generate Ln alkoxides, which usually exhibit superior performances and mediate more controllable ROP of cyclic esters than the corresponding amido analogues, we introduced alcohol into the catalyst system. Interestingly, with La/BnOH=1/1, only insoluble, cross-linked product P(MBL)$_{ADD}$-xl was obtained (run 2). Changing the ratio to 1/2, a mixture of cross-linked, vinyl-addition and ring-opening polymer products was produced (run 3). Excitingly, the exclusive formation of ROP product P(MBL)$_{ROP}$ was achieved with La/BnOH=1/3 (runs 4-6). Under such conditions, the P(MBL)$_{ROP}$ produced had a low MW of $M_n$=5.5 kg/mol and a narrow molecular weight distribution of Đ=1.16 (run 6). Changing the MBL/La/BnOH ratio from 100/1/3 to 200/1/3 enhanced the MW of P(MBL)$_{ROP}$ to $M_n$=10.4 kg/mol (run 8). The above results indicate that the La—NR$_2$ group exhibits a preference for vinyl-addition polymerization, while the La—OBn group has a preference for ROP. A control run with the isolated [La(OBn)$_3$]$_n$ led to formation of the same ROP product P(MBL)$_{ROP}$ (run 10), thus supporting the above hypothesis.

Besides the above discussed catalyst (La)/initiator (ROH) ratio, five other factors (solvent, concentration, temperature, initiator, and catalyst) also critically affect the chemoselectivity thus the resulting polymer type. First, changing the solvent of the current standard conditions (MBL/La/BnOH=100/1/3, [MBL]=5.0 M in THF, −60° C.) from THF to the more polar DMF switched from the ROP product P(MBL)$_{ROP}$ to the vinyl-addition product P(MBL)$_{ADD}$ (run 11). Second, decreasing [MBL] from 5.0 M to 2.0 M while keeping other conditions the same resulted in formation of only a trace amount of the cross-linked polymer (run 13). Third, increasing the temperature of the standard conditions to −40° C. gave only cross-linked polymer (runs 17-19), unless [MBL] was increased to 8.0 M under which conditions P(MBL)$_{ROP}$ can still be produced (run 16). Fourth, amongst the five alcohol initiators investigated (runs 20-40), including BnOH, $^i$PrOH, Ph$_2$CHCH$_2$OH, Ph$_2$CHOH, and C$_6$H$_4$(CH$_2$OH)$_2$, the sterically bulkier alcohol Ph$_2$CHCH$_2$OH achieved the highest monomer conversion (52%) and thus gave the best isolated ROP product yield of 43% (run 23), which is attributable to its steric bulk that can effectively suppress the aggregation of the resulting [La(OCH$_2$CHPh$_2$)$_3$]$_n$ active species to form higher clusters. Fifth, discrete, single-site yttrium complex 2 (FIG. 1), supported by a tetradentate, dianionic amino-bisphenolate ligand bearing a pendant ether group and previously revealed as a superior catalyst for the ROP of γ-BL, also gave the best performance in the ROP of MBL, producing P(MBL)$_{ROP}$ with $M_n$ up to 21.0 kg/mol [FIG. 10(ii), run 45]. A multi-gram scale of the ROP of MBL (4.90 g) by 2 produced exclusively P(MBL)$_{ROP}$ with $M_n$=21.0 kg/mol and Đ=1.42 in 55% isolated yield (run 47). Intriguingly, a minor yet subtle change in the Y catalyst structure from the pendant ether group in 2 to the pendant diamino group in 3 (FIG. 10) resulted in a drastic drop in the ROP product yield to only 4.9% (run 51). The main group catalyst Mg$^n$Bu$_2$ gave no pure ROP product under various conditions (runs 53-57).

Figure 11:
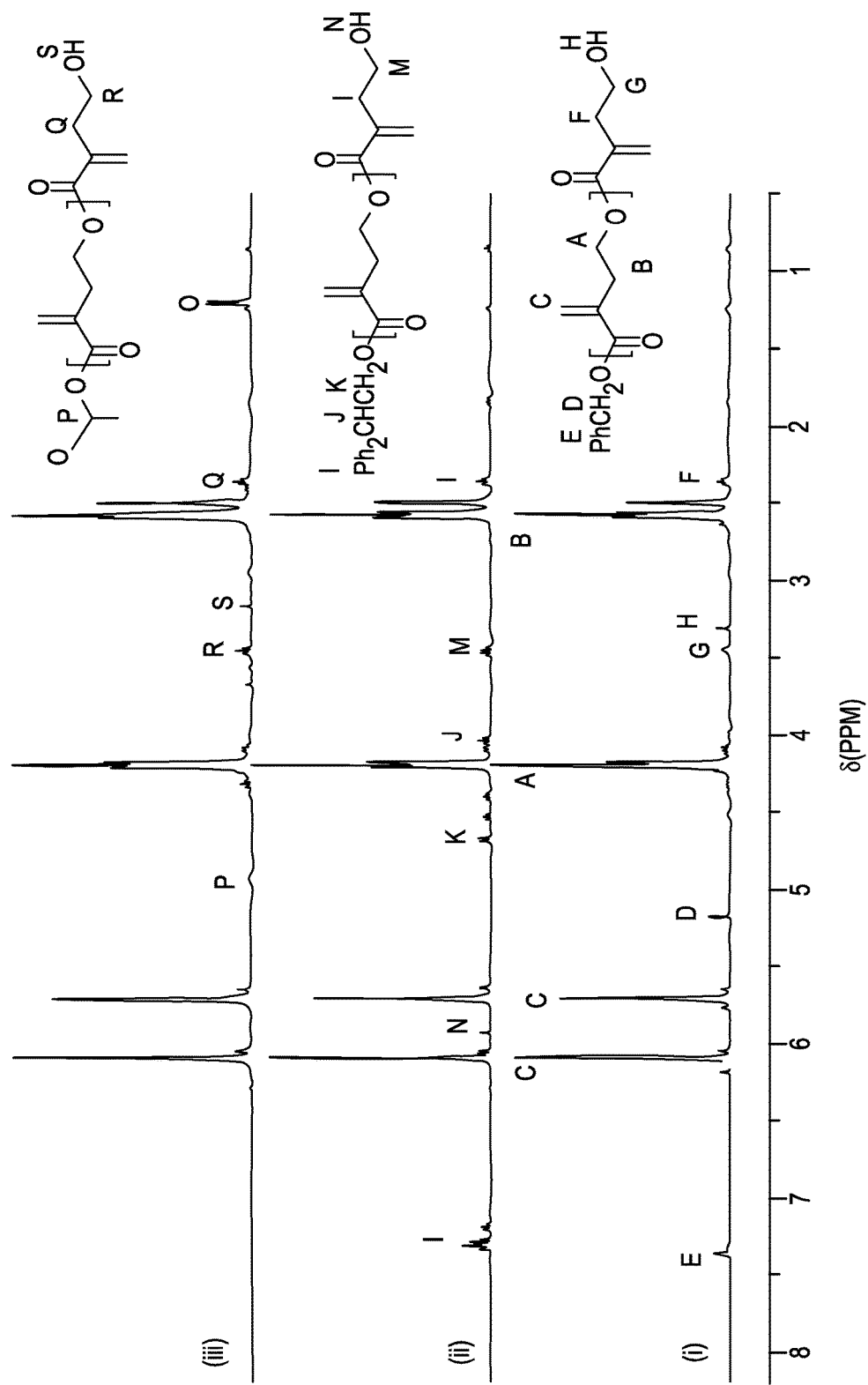
FIG. 11. $^1$H NMR spectra (DMSO-$d_6$) of RO-[(MBL)$_{ROP}$]$_n$-H by 1/ROH (1/3): (i) R=PhCH$_2$, (ii) R=Ph$_2$CHCH$_2$, (iii) R=$^i$Pr.

To gain insight into the mechanism of the ROP, we determined chain initiation and termination end groups of P(MBL)$_{ROP}$ produced by 1/ROH (1/3 ratio) with matrix-assisted laser desorption/ionization time-of-flight mass spectroscopy (MALDI-TOF MS) and $^1$H NMR. The MALDI-TOF MS spectra of the P(MBL)$_{ROP}$ samples prepared with BnOH, Ph$_2$CHCH$_2$OH, and $^i$PrOH showed the same spacing between the two neighboring molecular ion peaks being that of the exact molar mass of the repeat unit, MBL (m/z=98.04), as shown by the slopes of the linear plots of m/z values (y) vs the number of MBL repeat units (x). The intercepts of the plots, 131, 221 and 83, indicated that each -[(MBL)$_{ROP}$]$_n$- chain carries RO/H as chain ends [$M_{end}$=108 (BnO/H)+23 (Na$^+$) g/mol; $M_{end}$=198 (Ph$_2$CHCH$_2$O/H)+23 (Na$^+$) g/mol; 60 ($^i$PrO/H)+23 (Na$^+$) g/mol], denoted as RO-[(MBL)$_{ROP}$]$_n$-H. The same analysis of a low MW P(MBL)$_{ROP}$ sample by yttrium alkyl 2 revealed the correct end groups of Me$_3$SiCH$_2$/H. The corresponding $^1$H NMR spectra of RO-[(MBL)$_{ROP}$]$_n$-H are depicted in FIG. 11, showing, besides the major signals at δ 6.09, 5.71, 4.20 and 2.58 ppm for the main chain protons —[C(=O)C(=CH$_2^{[6.09,\ 5.71]}$)CH$_2^{[2.58]}$CH$_2^{[4.20]}$O]$_n$—, minor signals attributed to the chain ends (RO/H). Overall, these results are consistent with the coordination-insertion mechanism for chain initiation and propagation steps (FIG. 19), analogous to that proposed for the ROP of typical cyclic esters and γ-BL.

To shed light on why the ROP of MBL requires a low temperature and a high monomer concentration, typically at −60° C. and 5.0 M, we measured the thermodynamics of the polymerization (MBL/1/Ph$_2$CHCH$_2$OH=100/1/3, [MBL]$_0$=5.0 M) in CD$_2$Cl$_2$ through variable temperature NMR studies at low temperatures. First, the equilibrium monomer concentration, [MBL]$_{eq}$, was obtained by plotting [MBL]$_t$ as a function time until the concentration reached a constant. Next, a Van't Hoff plot of ln[MBL]$_{eq}$ vs. 1/T gave a straight line, from which thermodynamic parameters were calculated to be $\Delta H_p$=−5.9 kJ·mol$^{-1}$ and $\Delta S°_p$=−40.1 J·mol$^{-1}$·K$^{-1}$, based on the equation ln[MBL]$_{eq}$=$\Delta H_p$/RT−$\Delta S°_p$/R. Third, the ceiling temperature (T$_c$) was calculated to be T$_c$=221 K (−52° C.) at [MBL]$_0$=5.0 M, or T$_c$=147 K (−126° C.) at [MBL]$_0$=1.0 M, based on the equation T$_c$=$\Delta H_p$/($\Delta S°_p$+R ln[MBL]$_0$). Overall, these values are consistent with the conditions observed experimentally that enabled the ROP of MBL.

Thermal and mechanical properties of P(MBL)$_{ROP}$ produced by the different catalyst/initiator systems were investigated by thermal gravimetric analysis (TGA), differential scanning calorimetry (DSC), and dynamic mechanical analysis (DMA). TGA and relative derivative thermogravimetry (DTG) curves of low MW P(MBL)$_{ROP}$ prepared by 1/ROH (1/3 ratio) displayed three degradation steps, attributable to extrusion of MBL at the initial step of T≤250° C., followed by cross-linking of the pendant double bonds (vide infra) and final decomposition. On the other hand, the high MW P(MBL)$_{ROP}$ prepared by 2 showed only the last two degradation steps, also with a higher degradation temperature (T$_d$, defined by the temperature of 5% weight loss) of 293° C. The glass-transition temperatures (T$_g$) measured by DSC were in the range of −44.7 to −34.9° C., with the sample of the lowest M$_n$ exhibiting the lowest T$_g$ value. To investigate the possible cross-linking during heating, the DSC of P(MBL)$_{ROP}$ prepared by 2 was scanned to a much higher temperature of 400° C. It is clear from the first heating scan that P(MBL)$_{ROP}$ started to crosslink at ~250° C. and then decompose at ~340° C., after which no subsequent thermal transitions were observed on the first cooling and second heating scan cycles. These results further confirmed that P(MBL)$_{ROP}$ undergoes thermal cross-linking before decomposition. The casted thin film of P(MBL)$_{ROP}$ (M$_n$=21.0 kg/mol, Đ=1.42) was analyzed by DMA, which gave a storage modulus (E') of 3.55 GPa and a loss modulus (E") of 119.4 MPa at −100° C. (glassy state), or =159.9 MPa and E"=10.53 MPa at 25° C. (rubbery state).

Post-functionalization of the unsaturated polyester P(MBL)$_{ROP}$ produced by 2 was examined with two different approaches. First, photocuring under UV (350 nm) photoradical initiation with photoinitiator 2,2-dimethoxy-2-phenylacetophenone produced an insoluble cross-linked colorless thin film, P(MBL)$_{ROP}$-hv. The FT-IR spectrum of the film showed similar features to those of P(MBL)$_{ROP}$, but with weaker absorption bands corresponding to the C=C bonds, indicating that only some of vinylidene groups participated in the cross-linking (Scheme Z3 and Z4).

Scheme Z3. Post-functionalization of P(MBL)$_{ROP}$ via photocuring and the thiol-ene click reaction.

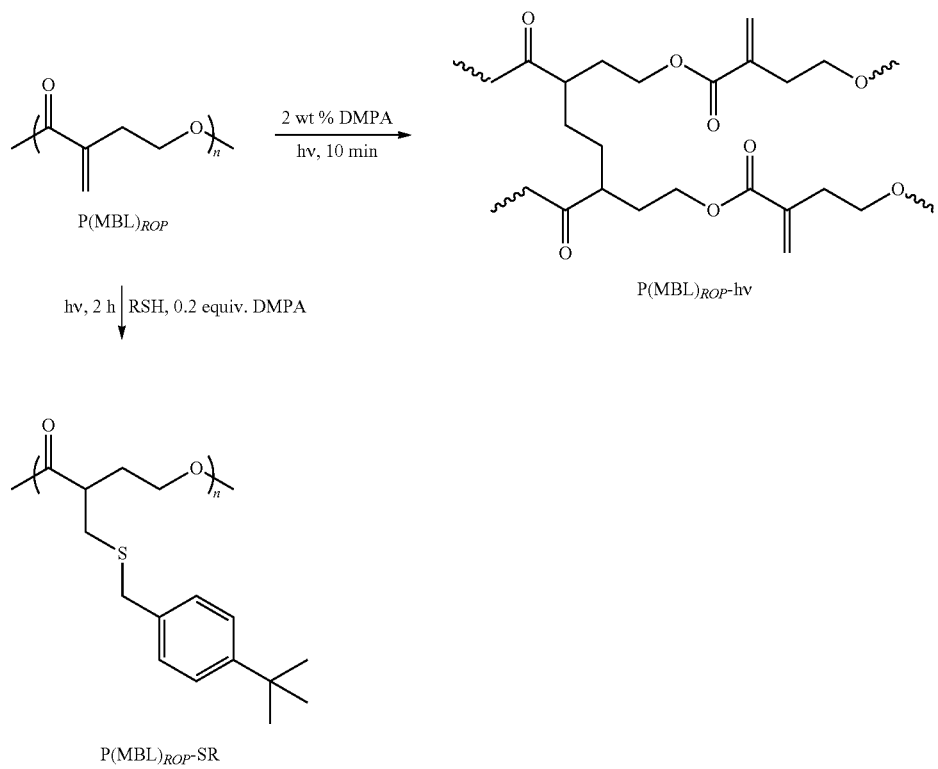

Scheme Z4. Mechanism of cross-linking by LA[N(SiMe₃)₂]₃/BnOH; molar ratio of 1/1 at -60° C.

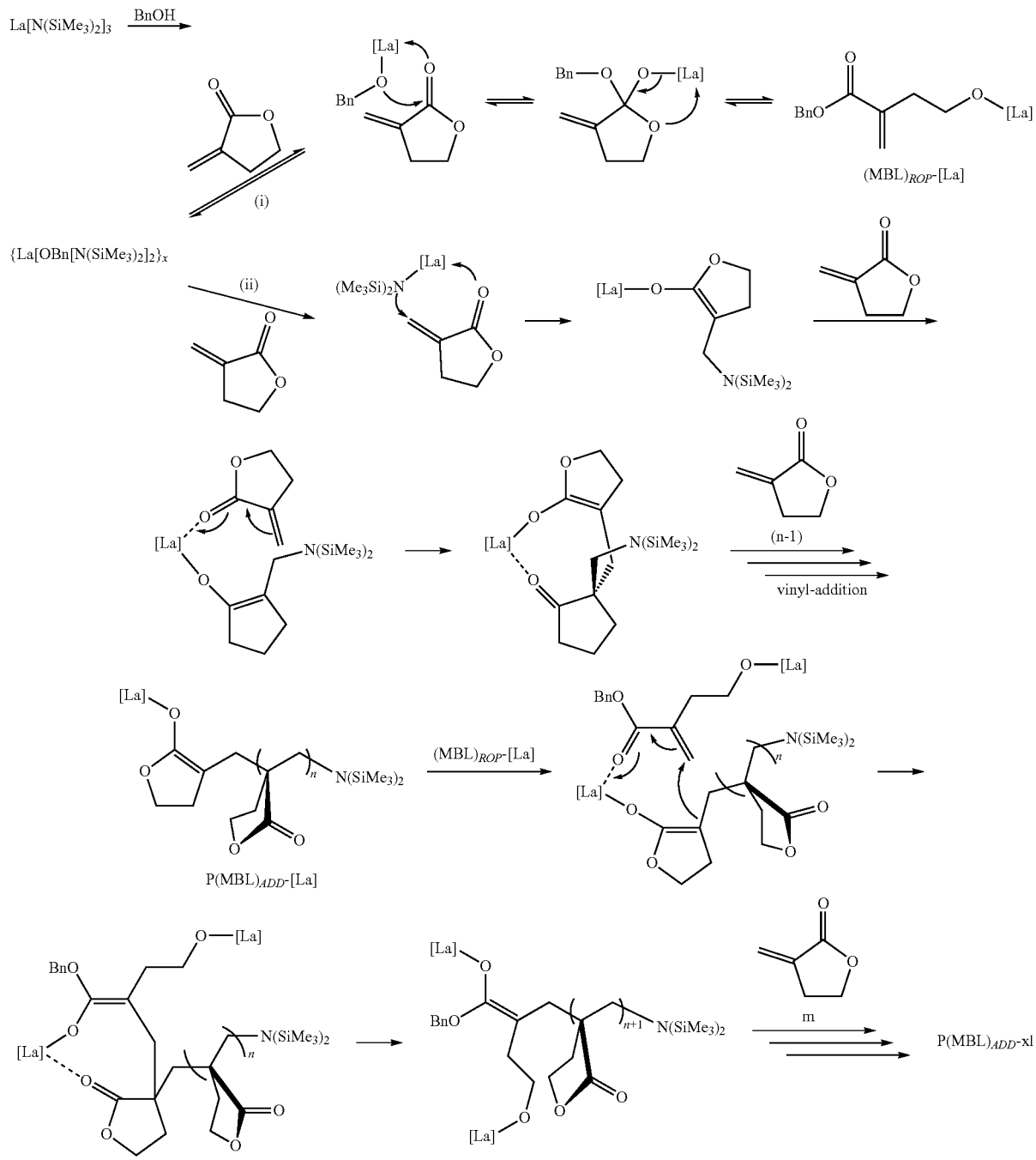

Figure 19:
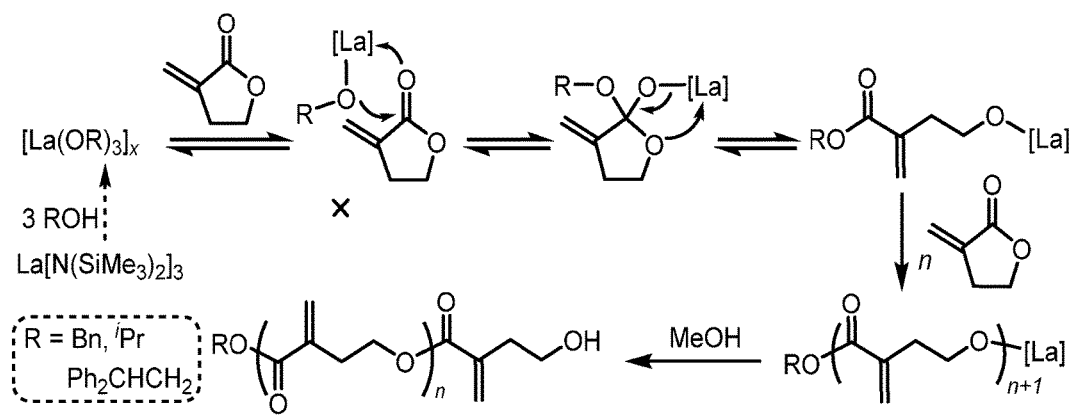
FIG. 19. Proposed mechanism for the ROP of MBL by 1 in the presence of 3 equiv. ROH (R=Bn, Ph$_2$CHCH$_2$, $^i$Pr).

No apparent $T_g$ was observed for the cross-linked film, but its TGA and DTG curves are similar to that of P(MBL)$_{ROP}$, further confirming the hypothesis of P(MBL)$_{ROP}$ undergoing thermal cross-linking before decomposition during TGA analysis. On the other hand, photocuring of the low MW P(MBL)$_{ROP}$ prepared by 1/BnOH (1/3) yielded P(MBL)$_{ROP}$-hv with a TGA curve being different than its precursor, eliminating the initial MBL extrusion step. Worth noting here is that P(MBL)$_{ROP}$-hv produced by post-photocuring is different from P(MBL)$_{ADD}$-xl as prepared by 1/BnOH (1/1) at −60° C. (vide supra), which was shown to contain mainly P(MBL)$_{ADD}$ chains, as evidenced by their nearly identical IR spectra as well as TGA and DSC curves of P(MBL)$_{ADD}$-xl and P(MBL)$_{ADD}$. Based on the above results and the observations that the La—OR group prefers ring opening and the La—NR₂ group prefers vinyl addition, the putative mechanism proposed for the cross-linking process involves cross-over addition of the initial ring-opening product (MBL)$_{ROP}$-[La] to the growing vinyl-addition chain P(MBL)$_{ADD}$-[La] (FIG. 19). The second approach for post-functionalization was readily realized by the thiol-ene click reaction, affording completely thiolated polyester P(MBL)$_{ROP}$-SR (FIG. 18).

Figure 12:
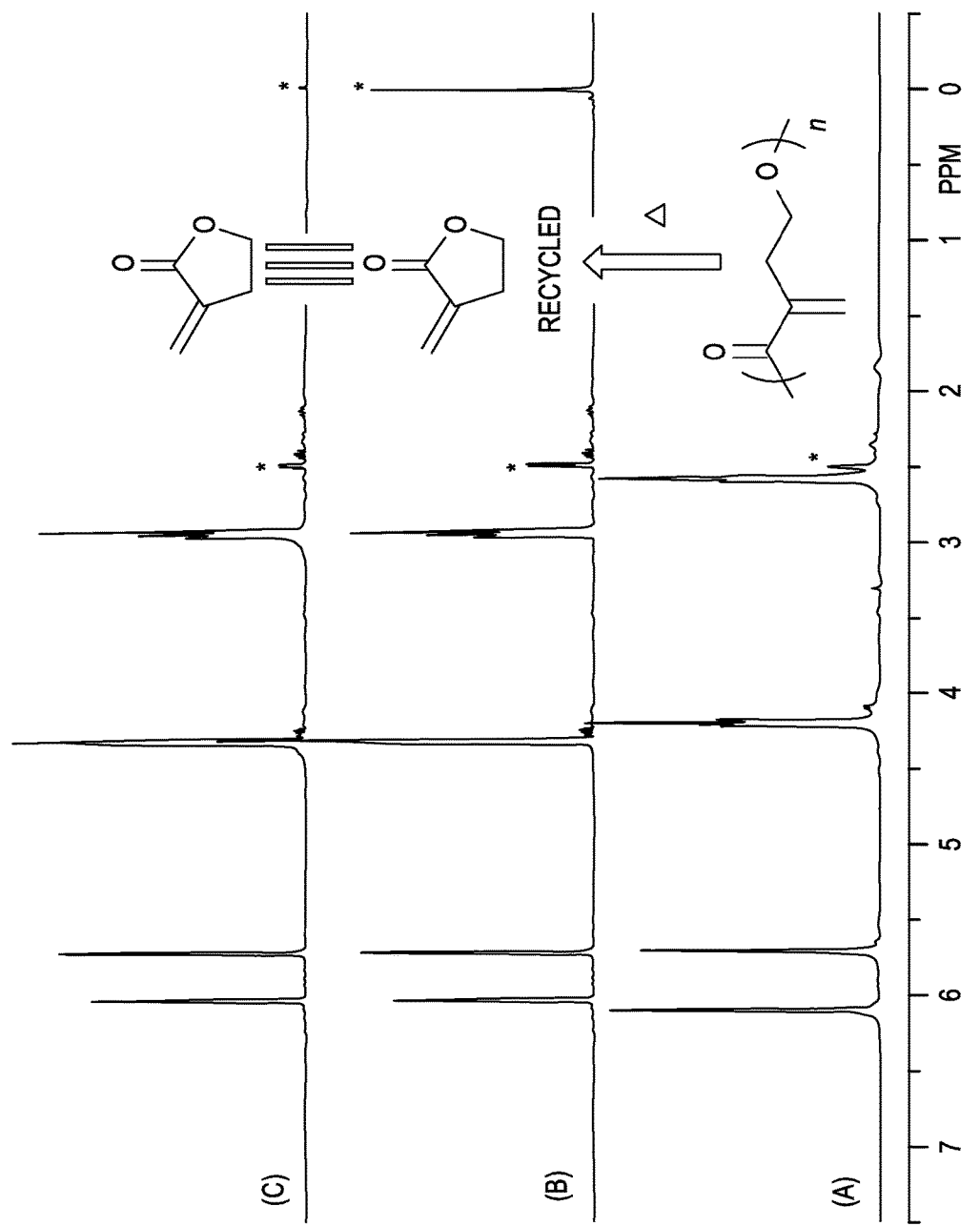
FIG. 12. $^1$H NMR spectra (DMSO-$d_6$): (a) P(MBL)$_{ROP}$ (M$_n$=21.0 kg/mol); (b) the liquid product obtained after heating the "wet" DMSO solution with 3.5 mM water at 100° C. for 1 h; (c) MBL monomer for comparison. NMR solvent peaks marked as *.
Figure 13A:
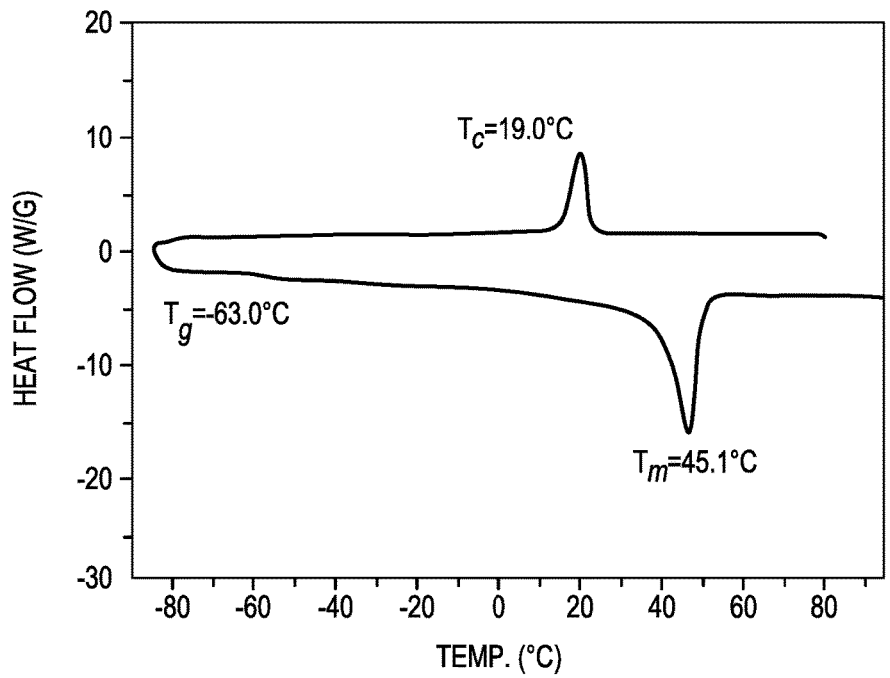
FIG. 13A-E. DSC curves: (A) ε-CL/γ-BLcopolymer (γ-BL mol %=17.5%, Table 4-1, Run 4); (B) ε-CL/γ-BLcopolymer (γ-BL mol %=31.0%, Table 4-1, Run 5); (C) ε-CL/γ-BLcopolymer (γ-BL mol %=45.0%, Table 4-1, Run 11); (D) δ-VL/γ-BL copolymer (γ-BL mol %=13.5%, Table 4-2, Run 2); (E) β-BL/γ-BL copolymer (γ-BL mol %=16.0%, Table 4-3, Run 7).
Figure 13B:
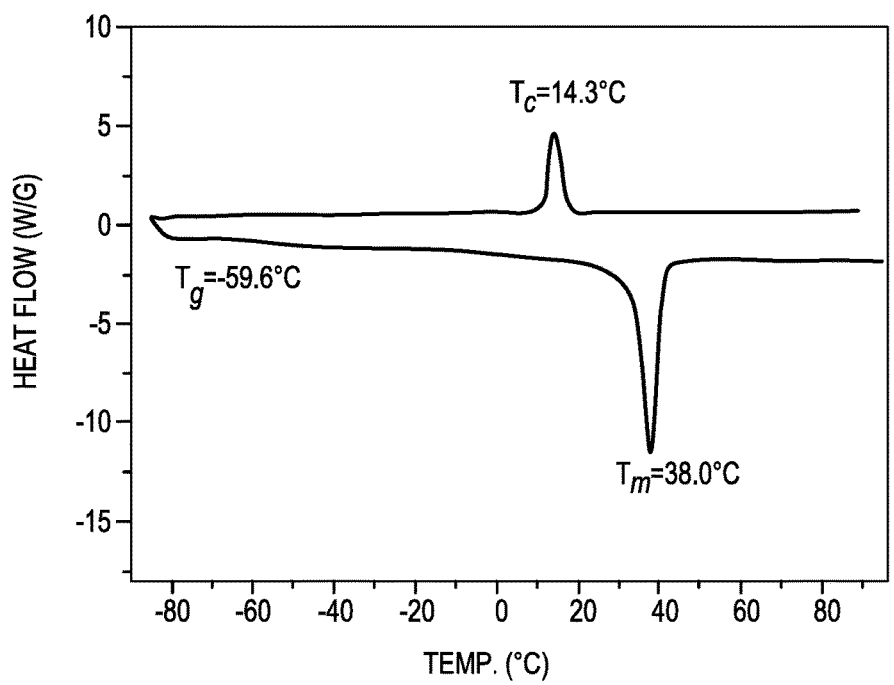
Figure 13C:
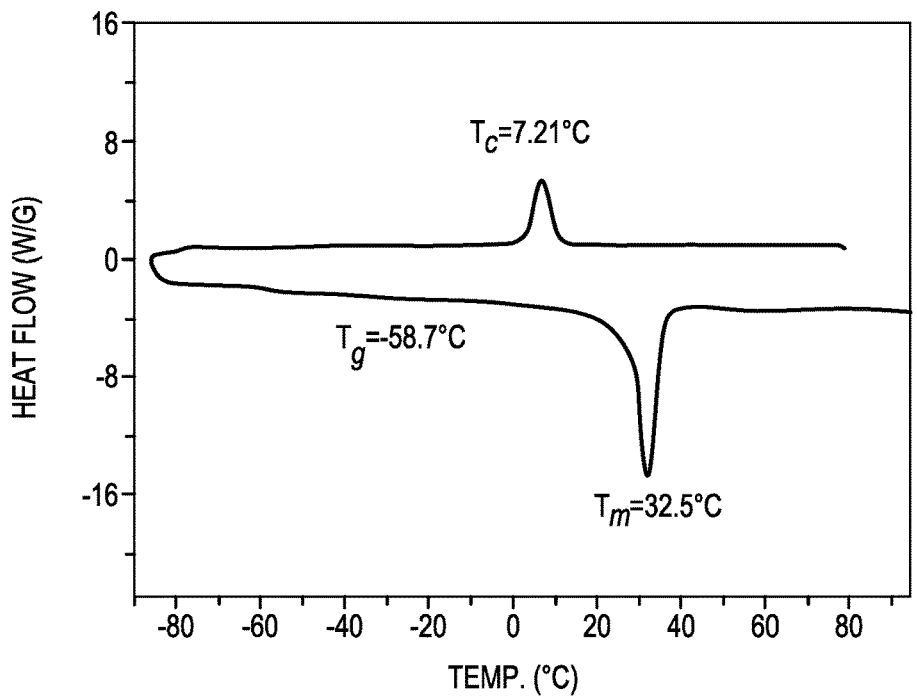
Figure 13D:
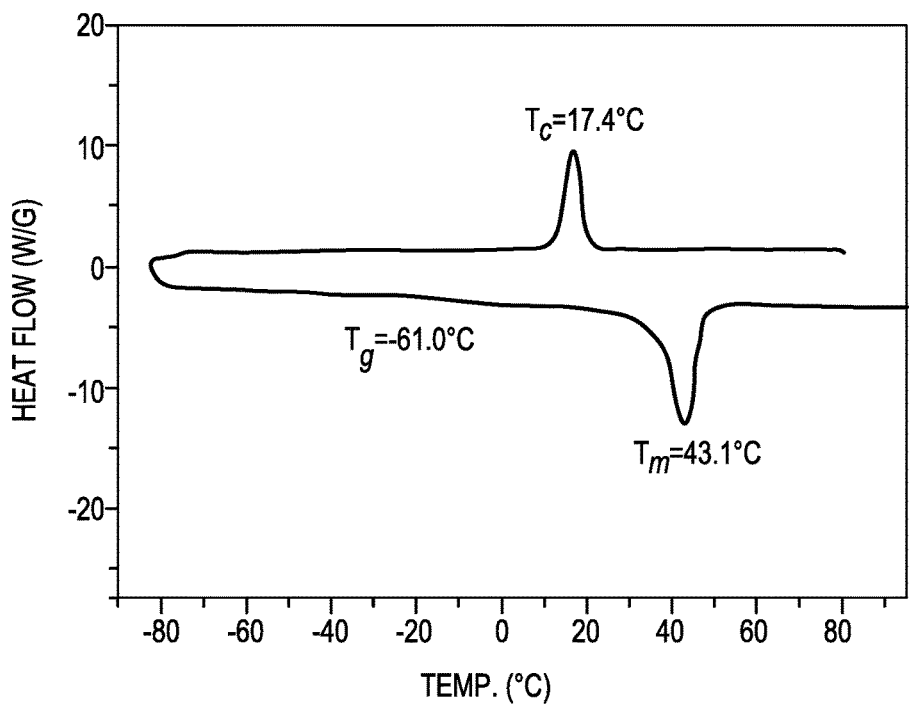
Figure 13E:
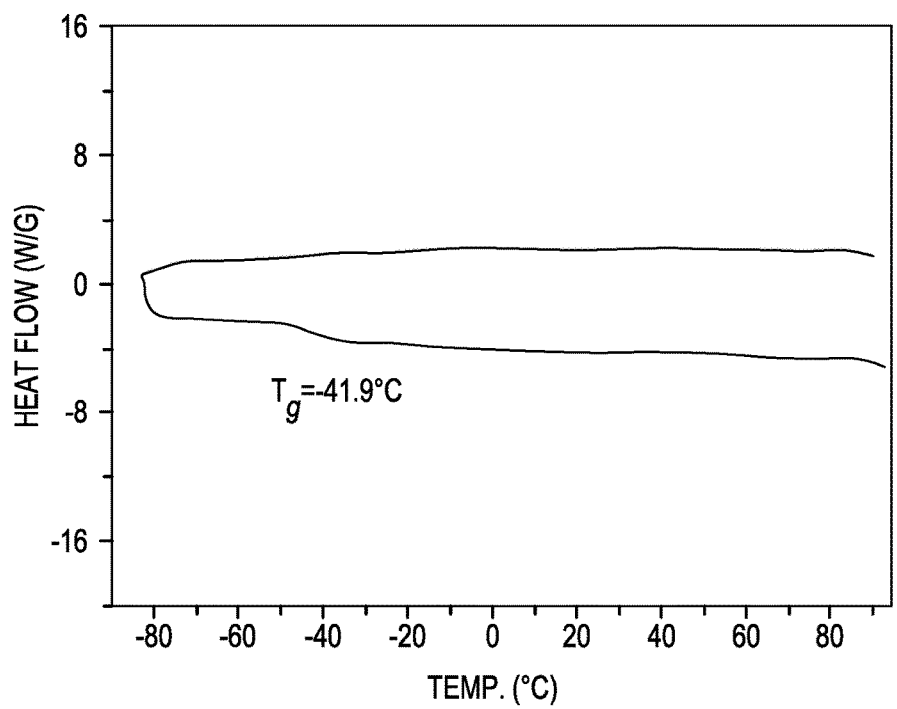

The ability of P(MBL)$_{ROP}$ to recycle back to its feedstock was investigated by three approaches. First, heating the bulk material at high temperatures resulted in formation of cross-linked polymer. Second, the depolymerization performed at 25° C. in the presence of 1 produced initially some MBL which was subsequently polymerized by 1 into P(MBL)$_{ADD}$, plus some insoluble cross-linked material. Third, heating a 0.2 M solution of P(MBL)$_{ROP}$ in DMSO-d$_6$ in the presence of 1 (1 mol %) and water (3.5 mM, used to inhabit polymerization) at 100° C. or 130° C. for 1 h, or 60° C. for 24 h, yielded cleanly the monomer MBL in quantitative yield (FIG. 12, Table Z3). Simple metal halides such as LaCl$_3$, which is incapable of reinitiating the vinyl-addition polymerization of MBL generated from depolymerization, can also be used as the catalyst to achieve complete recycling of P(MBL)$_{ROP}$ back to MBL (Table Z4).

exocyclic C=C bond and the highly stable non-strained γ-BL ring, achieving the ROP of MBL by reversing the conventional chemoselectivity through this work is particularly noteworthy. Lanthanum amide 1 is a versatile precatalyst, producing P(MBL)$_{ADD}$, P(MBL)$_{ADD}$-xl, and P(MBL)$_{ROP}$, with 1/ROH ratio=1:0, 1:1, and 1:3, respectively, while single-site yttrium 2 gave the best overall performance, producing P(MBL)$_{ROP}$ with M$_n$ up to 21.0 kg/mol. Interestingly, the La—OR group prefers the ROP, while the La—NR$_2$ group leads to the vinyl-addition polymerization. The thermal analysis showed that P(MBL)$_{ROP}$ undergoes thermal cross-linking before decomposition, and it can be readily post-functionalized via photocuring and the thiol-ene click reaction. Remarkably, P(MBL)$_{ROP}$ can be fully recycled back to MBL after heating its solution at ≥100° C. for 1 h in the presence of a simple catalyst.

TABLE Z3

Results of Depolymerization of P(MBL)$_{ROP}$ via La[N(SiMe$_3$)$_2$]$_3$ in "wet" DMSO-d$_6$[a]

| | | | | Products | | |
|---|---|---|---|---|---|---|
| [P(MBL)$_{ROP}$]$_0$ (M) | H$_2$O conc. in DMSO-d$_6$ (mM) | Temp. (° C.) | Time (h) | MBL (%) | P(MBL)$_{ROP}$ (%) | P(MBL)$_{ADD}$ (%) |
| 0.2 | 3.5 | 130 | 1 | 100 | 0 | 0 |
| 0.4 | 3.5 | 130 | 1 | 84.2 | 0 | 15.8 |
| 0.6 | 3.5 | 130 | 1 | 41.9 | 0 | 58.1 |
| 0.2 | 3.5 | 100 | 1 | 100 | 0 | 0 |
| 0.2 | 3.5 | 60 | 1 | 43.1 | 56.9 | 0 |
| 0.2 | 3.5 | 60 | 2 | 63.7 | 36.3 | 0 |
| 0.2 | 3.5 | 60 | 4 | 88.1 | 11.9 | 0 |
| 0.2 | 3.5 | 60 | 6 | 95.5 | 4.5 | 0 |
| 0.2 | 3.5 | 60 | 24 | 100 | 0 | 0 |
| 0.2 | 9.5 | 130 | 1 | 41.0 | 59.0 | 0 |
| 0.2 | 9.5 | 130 | 2 | 45.6 | 54.4 | 0 |
| 0.2 | 9.5 | 130 | 12 | 59.7 | 40.3 | 0 |
| 0.2 | 9.5 | 130 | 24 | 65.7 | 34.3 | 0 |
| 0.4 | 9.5 | 130 | 1 | 77.9 | 22.1 | 0 |
| 0.4 | 9.5 | 130 | 2 | 78.6 | 21.4 | 0 |
| 0.4 | 9.5 | 130 | 12 | 88.5 | 11.5 | 0 |
| 0.4 | 9.5 | 130 | 24 | 91.4 | 8.6 | 0 |

[a]Conditions: P(MBL)$_{ROP}$/La = 100/1, the amount of P(MBL)$_{ROP}$ (produced by MBL/2 = 100/1) and La[N(SiMe$_3$)$_2$]$_3$ varied according to initial P(MBL)$_{ROP}$ concentration and [P(MBL)$_{ROP}$]/[La] molar ratio.

TABLE Z4

Results of Depolymerization of P(MBL)$_{ROP}$ in the Presence of LaCl$_3$ in DMSO-d$_6$[a]

| [P(MBL)$_{ROP}$]/ [LaCl$_3$] = 100 T = 130° C. | | [P(MBL)$_{ROP}$]/ [LaCl$_3$] = 100 T = 160° C. | | [P(MBL)$_{ROP}$]/ [LaCl$_3$] = 50 T = 160° C. | |
|---|---|---|---|---|---|
| Time (h) | Conv. (%) to MBL | Time (h) | Conv. (%) to MBL | Time (h) | Conv. (%) to MBL |
| 1 | 43.8 | 1 | 44.7 | 1 | 93.7 |
| 2 | 79.5 | 2 | 76.7 | 2 | 95.9 |
| 3 | 91.7 | 3 | 91.7 | 3 | 96.9 |
| 4 | 93.6 | 4 | 94.3 | 4 | 98.0 |
| 6 | 94.8 | 6 | 95.8 | 6 | 100 |
| 24 | 97.4 | 24 | 100 | | |

[a]Conditions: [P(MBL)$_{ROP}$]$_0$ = 0.2M, the amount of LaCl$_3$ varied according to [P(MBL)$_{ROP}$]/[La] molar ratio, V$_{solvent}$ = 0.5 mL.

In conclusion, we have uncovered the thermodynamic (T$_c$=−52° C. at [MBL]$_0$=5.0 M), catalytic (La and Y catalysts), and processing (THF for polymer precipitation) conditions that enabled the first successful ROP of MBL, producing exclusively unsaturated polyester P(MBL)$_{ROP}$ via the proposed coordination-insertion mechanism. As MBL is a bifunctional monomer containing both the highly reactive Definitions The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit. For example, one or more substituents on a phenyl ring refers to one to five, or one to four, for example if the phenyl ring is disubstituted.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values, e.g., weight percentages, proximate to the recited range that are equivalent in terms of the functionality of the individual ingredient, the composition, or the embodiment. The term about can also modify the end-points of a recited range as discussed above in this paragraph.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo.

An "effective amount" refers to an amount effective to bring about a recited effect, such as an amount necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

The term "alkyl" refers to a branched or unbranched hydrocarbon having, for example, from 1-20 carbon atoms, and often 1-12, 1-10, 1-8, 1-6, or 1-4 carbon atoms. Examples include, but are not limited to, methyl, ethyl, 1-propyl, 2-propyl (iso-propyl), 1-butyl, 2-methyl-1-propyl (isobutyl), 2-butyl (sec-butyl), 2-methyl-2-propyl (t-butyl), 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl, 3,3-dimethyl-2-butyl, hexyl, octyl, decyl, dodecyl, and the like. The alkyl can be unsubstituted or substituted, for example, with a substituent described below. The alkyl can also be optionally partially or fully unsaturated. As such, the recitation of an alkyl group can include (when specifically stated) alkenyl or alkynyl groups. The alkyl can be a monovalent hydrocarbon radical, as described and exemplified above, or it can be a divalent hydrocarbon radical (i.e., an alkylene).

The term "aryl" refers to an aromatic hydrocarbon group derived from the removal of at least one hydrogen atom from a single carbon atom of a parent aromatic ring system. The radical attachment site can be at a saturated or unsaturated carbon atom of the parent ring system. The aryl group can have from 6 to 20 carbon atoms, for example, about 6 to about 10 carbon atoms. The aryl group can have a single ring (e.g., phenyl) or multiple condensed (fused) rings, wherein at least one ring is aromatic (e.g., naphthyl, dihydrophenanthrenyl, fluorenyl, or anthryl). Typical aryl groups include, but are not limited to, radicals derived from benzene, naphthalene, anthracene, biphenyl, and the like. The aryl can be unsubstituted or optionally substituted, as described for alkyl groups.

The term "substituted" indicates that one or more hydrogen atoms on the group indicated in the expression using "substituted" or "optionally substituted" is replaced with a "substituent". The number referred to by 'one or more' can be apparent from the moiety on which the substituents reside. For example, one or more can refer to, e.g., 1, 2, 3, 4, 5, or 6; in some embodiments 1, 2, or 3; and in other embodiments 1 or 2, and if the substituent is an oxo group, two hydrogen atoms are replace by the presence of the substituent. The substituent can be one of a selection of indicated groups, or it can be a suitable group recited below or known to those of skill in the art, provided that the substituted atom's normal valency is not exceeded, and that the substitution results in a stable compound. Suitable substituent groups include, e.g., alkyl, alkenyl, alkynyl, alkoxy, halo, haloalkyl, hydroxy, hydroxyalkyl, aryl, aroyl, (aryl)alkyl (e.g., benzyl or phenylethyl), heteroaryl, heterocycle, cycloalkyl, alkanoyl, alkoxycarbonyl, alkylcarbonyloxy, amino, alkylamino, dialkylamino, trifluoromethyl, trifluoromethoxy, trifluoromethylthio, difluoromethyl, acylamino, nitro, carboxy, carboxyalkyl, keto, thioxo, alkylthio, alkylsulfinyl, alkylsulfonyl, arylsulfinyl, arylsulfonyl, heteroarylsulfinyl, heteroarylsulfonyl, heterocyclesulfinyl, heterocyclesulfonyl, phosphate, sulfate, hydroxyl amine, hydroxyl (alkyl)amine, and cyano, as well as the moieties illustrated in the schemes and priority documents of this disclosure, and combinations thereof. Additionally, suitable substituent groups can be, e.g., —X, —R, —O⁻, —OR, —SR, —S⁻, —NR$_2$, —NR$_3$, =NR, —CX$_3$, —CN, —OCN, —SCN, —N=C=O, —NCS, —NO, —NO$_2$, =N$_2$, —N$_3$, —NC(=O)R, —C(=O)R, —C(=O)NRR, —S(=O)$_2$O⁻, —S(=O)$_2$OH, —S(=O)$_2$R, —OS(=O)$_2$OR, —S(=O)$_2$NR, —S(=O)R, —OP(=O)(OR)$_2$, —P(=O)(OR)$_2$, —OP(=O)(OH)(OR), —P(=O)(OH)(OR), —P(=O)(O⁻)$_2$, —P(=O)(OH)$_2$, —C(=O)R, —C(=O)X, —C(S)R, —C(O)OR, —C(O)O⁻, —C(S)OR, —C(O)SR, —C(S)SR, —C(O)NRR, —C(S)NRR, or —C(NR)NRR, where each X is independently a halogen ("halo"): F, Cl, Br, or I; and each R is independently H, alkyl, aryl, (aryl)alkyl (e.g., benzyl), heteroaryl, (heteroaryl)alkyl, heterocycle, heterocycle (alkyl), or a protecting group. As would be readily understood by one skilled in the art, when a substituent is keto (=O) or thioxo (=S), or the like, then two hydrogen atoms on the substituted atom are replaced. In some embodiments, one or more of the substituents above can be excluded from the group of potential values for substituents on the substituted group. The various R groups in the schemes of this disclosure can be one or more of the substituents recited above, thus the listing of certain variables for such R groups (including $R^1$, $R^2$, $R^3$, etc.) are representative and not exhaustive, and can be supplemented with one or more of the substituents above. For example, a substituted alkyl can be an aryl-substituted alkyl, for example, benzyl (-Bn).

The term "alkoxy" refers to the group alkyl-O—, where alkyl is as defined herein. Examples of alkoxy groups include, but are not limited to, methoxy, ethoxy, n-propoxy, iso-propoxy, n-butoxy, tert-butoxy, sec-butoxy, n-pentoxy, n-hexoxy, 1,2-dimethylbutoxy, and the like. The alkoxy can be unsubstituted or substituted.

The term "alcohol" refers to an at least mono-hydroxy-substituted alkane. A typical alcohol comprises a ($C_1$-$C_{12}$) alkyl moiety substituted at a hydrogen atom with one or more hydroxyl group. Alcohols include methanol, ethanol, n-propanol, i-propanol, n-butanol, i-butanol, s-butanol, t-butanol, n-pentanol, i-pentanol, hexanol, cyclohexanol, heptanol, octanol, nonanol, decanol, benzyl alcohol, phenylethanol, and the like. The carbon atom chain in alcohols can be straight, branched, cyclic, or aryl. Alcohols can be mono-hydroxy, di-hydroxy, tri-hydroxy, and the like (e.g. saccharides), as would be readily recognized by one of skill in the art.

A "monosaccharide" refers to any of the class of five-carbon or six-carbon sugars (saccharides). Examples of monosaccharides include six-carbon polyols having the general chemical formula $C_6H_{12}O_6$. These compounds include aldohexoses which have an aldehyde functional group at position 1 or ketohexoses which have a ketone functional group at position 2. Example aldohexoses include allose, altrose, glucose, mannose, gulose, idose, galactose, and talose, in either D or L form. Disaccharides are dimers of monosaccharides and are well known in the art, many of which are commercially available. Saccharides can be used as initiators and/or cross-linking agents.

The metal-based ring-opening catalysts described herein can have a variety of ligands, as described herein. Other useful ligands are described by, for example, Chen, *Chem. Rev.* 2009, 109, 5157; Zhang et al., *J. Am. Chem. Soc.* 2011, 133, 13674; Miyake et al., *Dalton Trans.* 2010, 39, 6710; Hu et al., *Macromolecules* 2010, 43, 9328; and U.S. Patent Publication No. 2012/0142905 (Thuilliez et al.). Many of these ligands can be obtained commercially from suppliers such as Sigma-Aldrich (Milwaukee, Wis.), Strem Chemicals, Inc. (Newburyport, Mass.), and Alfa Aesar (Ward Hill, Mass.).

The variables and limitations described for one general or specific embodiment for any polymer described herein can also be applied to other embodiments, for example, other variations of a polymer or formula described herein, and variations of the embodiments provided in the Examples.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Example 1. Completely Recyclable Biopolymers with Linear and Cyclic Topologies Via Ring-Opening Polymerization of γ-Butyrolactone All syntheses and manipulations of air- and moisture-sensitive chemicals and materials were carried out in flamed Schlenk-type glassware on a dual-manifold Schlenk line, on a high-vacuum line, or in an inert gas (Ar or $N_2$)-filled glovebox. NMR-scale reactions were conducted in Teflon-valve-sealed J. Young-type NMR tubes. HPLC-grade organic solvents were first sparged extensively with nitrogen during filling 20 L solvent reservoirs and then dried by passage through activated alumina (for dichloromethane, DCM) followed by passage through Q-5 supported copper catalyst (for toluene, TOL, and hexanes) stainless steel columns. HPLC-grade tetrahydrofuran (THF) was degassed and dried over Na/K for 3 days, followed by distillation. Toluene-$d_8$ was dried over sodium/potassium alloy and vacuum-distilled or filtered, whereas CDCl$_3$ was dried over activated Davison 4 Å molecular sieves. NMR spectra were recorded on a Varian Inova 300 (300 MHz, $^1$H; 75 MHz, $^{13}$C) or a 400 MHz spectrometer. Chemical shifts for $^1$H and $^{13}$C spectra were referenced to internal solvent resonances and are reported as parts per million relative to SiMe$_4$.

γ-Butyrolactone (γ-BL) was purchased from Acros Organics Co., dried over CaH$_2$ overnight, vacuum distillated, and stored in the glovebox for further use. Tri[N,N-bis(trimethylsilyl)amide]samarium (11.1) Sm[N(SiMe$_3$)$_2$]$_3$, tri[N,N-bis(trimethylsilyl)amide] lanthanum(III) La[N(SiMe$_3$)$_2$]$_3$, tri[N,N-bis(trimethylsilyl)amide] yttrium (III) Y[N(SiMe$_3$)$_2$]$_3$, and lanthanum(III) isopropoxide [La(O$^i$Pr)$_3$]$_x$ were purchased from Aldrich Chemical Co. and used as received. 1,5,7-Triazabicyclo[4.4.0]dec-5-ene (TBD), 2,2-diphenylethanol, diphenylmethanol and triphenylmethanol were purchased from Aldrich Chemical Co., which were purified by dissolving in toluene over CaH$_2$, filtering after stirring overnight, and removing the solvent. Isopropanol, benzyl alcohol, and 1,8-diazabicyclo[5.4.0]undec-7-ene (DBU) were purchased from Fisher Scientific Co., Alfa Aesar Chemical Co. and Aldrich Chemical Co., respectively, which were purified by distillation over CaH$_2$ and stored over activated Davison 4 Å molecular sieves. 1,4-Benzenedimethanol was purchased from Alfa Aesar Chemical Co. and purified by sublimation. Bisphenolate yttrium amido complex 1 and alkyl complex 2 were prepared according to literature procedures (Amgoune et al., *Chem. Eur. J.* 12, 169-179 (2006)).

General Polymerization Procedures.

Polymerizations were performed in 25 mL flame-dried Schlenk tubes interfaced to a dual-manifold Schlenk line using an external cooling bath. The reactor was charged with a predetermined amount of catalyst and/or initiator and solvent (as specified in the polymerization tables) in a glovebox. The reactor was sealed with a septum, taken out of the glovebox, and immersed in the cooling bath. After equilibration at the desired polymerization temperature for 10 min, the polymerization was initiated by rapid addition of γ-BL via a gastight syringe. After a desired period of time, the polymerization was quenched by addition of 5 mL methanol acidified with HCl (5%). The quenched mixture was precipitated into 100 mL of cold methanol, filtered, washed with methanol to remove any unreacted monomer, and dried in a vacuum oven at room temperature to a constant weight. A variety of results for polymer synthesis and related data is provided in Tables X1-X6.

Thermodynamic and Kinetic Studies.

In a glovebox under argon atmosphere, a teflon-valve-sealed J. Young-type NMR tube was charged with La[N(TMS)$_2$]$_3$ (31.0 mg, 0.049 mmol), Ph$_2$CHCH$_2$OH (29.8 mg, 0.148 mmol) and 0.11 mL of CD$_2$Cl$_2$. After completion of alcoholysis in 5 min with occasional shaking, γ-BL (0.42 g, 4.9 mmol, γ-BL/La/Ph$_2$CHCH$_2$OH=100/1/3) was added via syringe at room temperature and the sample was brought into the 500 MHz NMR probe precooled to −15° C. The conversion of the monomer was monitored by $^1$H NMR at different time intervals until the conversion remained constant. Then the temperature was raised back to 25° C. and equilibrated for 5 min to ensure the polymer is depolymerized back to the monomer. Then temperature was decreased to −20, −25, −30, and −35° C., respectively, to obtain the effective [γ-BL]$_e$ at different temperatures.

For kinetic studies, the dependence of monomer conversion at −30° C. on polymerization time was monitored by $^1$H NMR. The ROP reactions with different γ-BL/La/Ph$_2$CHCH$_2$OH ratios of 100/1/1 and 100/1/2 were carried out. γ-BL/La/Ph$_2$CHCH$_2$OH=100/1/1: γ-BL=0.42 g, [γ-BL]$_0$=10 M in CD$_2$Cl$_2$, La[N(SiMe$_3$)$_2$]$_3$=31.0 mg, Ph$_2$CHCH$_2$OH=9.9 mg; γ-BL/La/Ph$_2$CHCH$_2$OH=100/1/2: γ-BL=0.42 g, [γ-BL]$_0$=10 M in CD$_2$Cl$_2$, La[N(SiMe$_3$)$_2$]$_3$=31.0 mg, Ph$_2$CHCH$_2$OH=19.8 mg.

Polymer Characterizations.

Polymer weight-average molecular weight (W), number-average molecular weight (M$_e$), and molecular weight distribution or polydispersity index (Ð=M$_w$/M$_n$) were measured by gel permeation chromatography (GPC) analyses carried out at 40° C. and a flow rate of 1.0 mL/min, with DMF as the eluent on a Waters University 1500 GPC instrument equipped with one PLgel 5 μm guard and three PLgel 5 μm mixed-C columns (Polymer Laboratories; linear range of MW=200-2,000,000). The instrument was calibrated with 10 PMMA standards, and chromatograms were processed with Waters Empower software (version 2002). Analysis of the polymers for the Mark-Houwink plot depicted was performed on a Malvern Viscotek 305 Triple Detector (light scattering, refractive index, and viscometer) Array GPC instrument and equipped with two PLgel 5 μm mixed-C columns (PL1110-6500, Agilent), and carried out at 40° C. and a flow rate of 1.0 mL/min, with chloroform as the eluent; the chromatograms were processed with Malvern OmniSEC software (version 4.7).

Melting transition (T$_m$) and glass transition (T$_g$) temperatures were measured by differential scanning calorimetry (DSC) on an Auto Q20, TA Instrument. All T$_m$ and T$_g$ values were obtained from a second scan after the thermal history was removed from the first scan. The second heating rate was 10° C./min and cooling rate was 5° C./min. Decomposition onset temperatures (T$_{onset}$) and maximum rate decomposition temperatures (T$_{max}$) of the polymers were measured by thermal gravimetric analysis (TGA) on a Q50 TGA Analyzer, TA Instrument. Polymer samples were heated from ambient temperatures to 600° C. at a heating rate of 20° C./min. Values of T$_{max}$ were obtained from derivative (wt %/° C.) vs. temperature (° C.), while T$_{onset}$ values (initial and end temperatures) were obtained from wt % vs. temperature (° C.) plots.

The isolated low molecular weight samples were analyzed by matrix-assisted laser desorption/ionization time-of-flight mass spectroscopy (MALDI-TOF MS); the experiment was performed on an Ultraflex MALDI-TOF mass spectrometer (Bruker Daltonics) operated in positive ion, reflector mode using a Nd:YAG laser at 355 nm and 25 kV accelerating voltage. A thin layer of a 1% NaI solution was first deposited on the target plate, followed by 0.6 μl of both sample and matrix (dithranol, 10 mg/mL in 50% ACN, 0.1% TFA). External calibration was done using a peptide calibration mixture (4 to 6 peptides) on a spot adjacent to the sample. The raw data was processed in the FlexAnalysis software (version 2.4, Bruker Daltonics).

Dynamic mechanical analysis (DMA) was performed on PγBL thin films (ca. 16×10×1.4 mm) with an RSAG2 analyzer (TA Instruments) in tension film mode at a maximum strain of 0.3% and a frequency of 1 Hz. The sample was heated from −125° C. to 25° C. or 30° C. at a heating rate of 3° C./min. The DMA T$_g$ was selected as the temperature at the maximum (peak) value of the loss modulus. The PγBL thin films for DMA tests were prepared by compression molding at 80-85° C. for 5 min.

Thermal Feedstock Recycling of PγBL.

A sealed autoclave containing 100 mg of the purified PγBL under a nitrogen atmosphere was heated at 220° C. (for the linear polymer) for 1 h or at 300° C. (for the cyclic polymer) for 1 h. After cooling, a colorless liquid was formed and confirmed to be the cleanly recycled monomer γBL by $^1$H NMR analysis.

TBD-Catalyzed Depolymerization of PγBL. PγBL (200 mg, produced by γ-BL/La/Ph$_2$CHCH$_2$OH=100/1/2) was dissolved in 0.6 mL DCM. The degradation was started by rapid addition of a TBD solution [6.5 mg in 0.4 mL DCM, TBD/PγBL (mol/mol)=1/50] to the above solution under vigorous stirring. After the measured time interval, a 0.1 mL aliquot was taken from the reaction mixture via syringe and quickly quenched into a 1 mL vial containing 0.6 mL of undried CDCl$_3$ with 250 ppm of benzoic acid. The quenched aliquots were later analyzed by $^1$H NMR to obtain the conversion data.

La[N(TMS)$_2$]$_3$ Catalyzed Depolymerization of PγBL.

PγBL (200 mg, produced by γ-BL/La/ Ph$_2$CHCH$_2$OH=100/1/2) was dissolved in 0.6 mL THF. The degradation was started by rapid addition of a La[N (TMS)$_2$]$_3$ solution [28.9 mg in 0.4 mL THF, La/PγBL (mol/mol)=1/50] to the above solution under vigorous stirring. After the measured time interval, a 0.1 mL aliquot was taken from the reaction mixture via syringe and quickly quenched into a 1 mL vial containing 0.6 mL of undried "wet" CDCl$_3$ with 250 ppm of BHT-H. The quenched aliquots were later analyzed by $^1$H NMR to obtain the conversion data.

Example 2. Metal-Free Recyclable Polyester from Bio-Renewable Non-Strained γ-Butyrolactone Materials, Reagents, and Methods All synthesis and manipulations of air- and moisture-sensitive materials were carried out in flamed Schlenk-type glassware on a dual-manifold Schlenk line, on a high-vacuum line, or in an argon-filled glovebox. HPLC-grade organic solvents were first sparged extensively with nitrogen during filling 20 L solvent reservoirs and then dried by passage through activated alumina [for dichloromethane (DCM)] followed by passage through Q-5 supported copper catalyst [for toluene (TOL)] stainless steel columns. Tetrahydrofuran (THF) was degassed and dried over Na/K for 3 days, followed by distillation. γ-Butyrolactone (γ-BL) was purchased from Acros Organics Co, dried over CaH$_2$ overnight, vacuum-distillated, and stored in a brown bottle with molecular sieve in the glovebox for further use. 1-tert-Butyl-4,4,4-tris(dimethylamino)-2,2-bis[tris(dimethylamino)-phosphoranylidenamino]-2λ$^5$,4λ$^5$-catenadi(phosphazene) ($^t$Bu-P$_4$, ~0.8 M in hexane) and 1-tert-butyl-2,2,4,4,4-pentakis(dimethylamino)-2λ$^5$,4λ$^5$-catenadi(phosphazene) ($^t$Bu-P$_2$, ~2.0 M in THF) were purchased from Aldrich Chemical Co and the solvents were removed under vacuum prior to use. tert-Butylimino-tris(dimethylamino)phosphorane ($^t$Bu-P$_1$) was purchased from Aldrich Chemical Co and used as received. Diphenylmethanol and 1-pyrenebutanol were purchased from Aldrich Chemical Co, which were purified by dissolving in toluene over CaH$_2$, filtering after an overnight stir, and collecting by evaporation of the solvent. Isopropanol ($^i$PrOH), tert-butanol ($^t$BuOH) and benzyl alcohol were purchased from Fisher Scientific Co, Alfa Aesar Chemical Co and Aldrich Chemical Co, respectively, which were purified by distillation over CaH$_2$ and stored with molecular sieve. Benzoic acid was purchased from Fisher Scientific Co and used as received.

General Polymerization Procedures.

Polymerizations were performed in 25-mL flame-dried Schlenk tubes interfaced to the dual-manifold Schlenk line using an external cooling bath. The reactor was charged with a predetermined amount of catalyst, initiator and solvent, and kept stirring for 10 min in the glovebox. The reactor was sealed, taken out of glovebox, and then immersed in the cooling bath under the predetermined temperature. After equilibration at the desired polymerization temperature for 10 min, the polymerization was initiated by rapid addition of monomer via a gastight syringe. After a desired period of time, the polymerization was quenched by addition of 3 mL of benzoic acid/CHCl$_3$ (10 mg/mL). When the precipitated polymer was redissolved in CHCl$_3$ at −40° C. (to prevent depolymerization), a 0.2 mL of aliquot was taken from the reaction mixture and prepared for $^1$H NMR analysis to obtain the percent monomer conversion data. The quenched mixture was then precipitated into 100 mL of cold methanol, filtered, washed with methanol to remove unreacted monomer, and dried in a vacuum oven at room temperature to a constant weight. A variety of results for polymer synthesis and related data is provided in Tables Y1 and Y2.

Thermal Recycling of PγBL.

A sealed autoclave containing 200 mg of the purified PγBL under a nitrogen atmosphere was heated at 260° C. for 1 h. After cooling, a colorless liquid was formed and confirmed to be the cleanly recycled pure monomer γ-BL by $^1$H NMR analysis.

In a separate experiment, the thermal recycling of PγBL was carried out in presence of an internal standard (hexamethylbenzene). A Teflon-valve-sealed J. Young-type NMR tube was charged with 20 mg of PγBL and 3.0 mg of hexamethylbenzene. After measuring the weight, 0.5 mL of CDCl$_3$ was added for $^1$H NMR analysis to determine the ratio of the PγBL/hexamethylbenzene mixture. Then CDCl$_3$ was removed under vacuum and the NMR tube was sealed at the reduced pressure. The dried mixture was heated at 260° C. for 1 h and a colorless liquid was formed during heating. After cooling, the NMR tube was back-filled with air and the weight was measured to show the quantitative total mass recovery. The NMR solvent (0.5 mL of CDCl$_3$) was then added for $^1$H NMR analysis to determine the ratio of γ-BL/hexamethylbenzene, confirming the formation of the pure and quantitatively recycled monomer γ-BL.

Polymer Characterizations.

The polymers can be analyzed and characterized as described above in Example 1.

Example 3. Controlling Chemoselectivity for Fully Recyclable Unsaturated Polyester Materials and Methods Syntheses and manipulations of air- and moisture-sensitive chemicals and materials were carried out in flamed Schlenk-type glassware on a dual-manifold Schlenk line, on a high-vacuum line, or in an inert gas (Ar or N$_2$)-filled glovebox. NMR-scale reactions were conducted in NMR tubes sealed with Precision Seal rubber septa caps. HPLC-grade organic solvents were first sparged extensively with nitrogen during filling 20 L solvent reservoirs and then dried by passage through activated alumina (for dichloromethane, DCM) followed by passage through Q-5 supported copper catalyst (for toluene, TOL, and hexanes) stainless steel columns. HPLC-grade tetrahydrofuran (THF) was degassed and dried over Na/K for 3 days, followed by distillation. HPLC-grade N,N-dimethylformamide (DMF) was degassed and dried over CaH$_2$ overnight, followed by vacuum distillation (CaH$_2$ was removed before distillation). Dimethyl sulfoxide-d$_6$ (DMSO-d$_6$) was degassed and dried over CaH$_2$ overnight, followed by vacuum distillation. Benzene-d$_6$ was dried over sodium/potassium alloy and filtered, whereas CD$_2$Cl$_2$ and CDCl$_3$ were dried over CaH$_2$, vacuum-distilled and stored over activated Davison 4 Å molecular sieves. NMR spectra were recorded on a Varian Inova 400 MHz spectrometer (400 MHz, $^1$H; 100 MHz, $^{13}$C) or a 500 MHz Bruker spectrometer. Chemical shifts for $^1$H and $^{13}$C spectra were referenced to internal solvent resonances and are reported as parts per million relative to SiMe$_4$. Fourier transform infrared (FT-IR) spectroscopy was performed on a Thermoscientific (Nicolet iS50) FT-IR spectrometer equipped with a diamond attenuated total reflectance (ATR) at room temperature in the range of 550-4000 cm⁻.

α-Methylene-γ-butyrolactone (MBL) was purchased from TCI America, dried over $CaH_2$ overnight, vacuum distillated, and stored over activated Davison 4 Å molecular sieves in a brown bottle inside a freezer of the glovebox for further use. Tri[N,N-bis(trimethylsilyl)amide] lanthanum (III) $La[N(SiMe_3)_2]_3$, lanthanum chloride $LaCl_3$, yttrium chloride $YCl_3$, and (trimethylsilyl)methyllithium $(SiMe_3)_2CH_2Li$ solution in pentane were purchased from Sigma-Aldrich Chemical Co. and used as received. 2,2-Diphenylethanol, diphenylmethanol, and triphenylmethanol were purchased from Sigma-Aldrich Chemical Co., which were purified by dissolving in toluene over $CaH_2$, filtering after stirring overnight, and removing the solvent. Isopropanol and benzyl alcohol were purchased from Fisher Scientific Co. and Alfa Aesar Chemical Co., respectively, which were purified by distillation over $CaH_2$ and stored over activated Davison 4 Å molecular sieves. 1,4-Benzenedimethanol was purchased from Alfa Aesar Chemical Co. and purified by sublimation. 4-tert-Butylbenzylmercaptan was purchased from Alfa Aesar and used as received. 2,2-Dimethoxy-2-phenylacetophenone (DMPA) was purchased from Acros Organics and used as received. Yttrium alkyl complexes 2 and 3 were prepared according to literature procedures (Synthesis of the ligand: Tshuva et al., *Organometallics* 2002, 21, 662-670; Tshuva et al., *Organometallics* 2001, 20, 3017-3028. Synthesis of $[Y(CH_2SiMe_3)_3(THF)_2]$: Hultzsch et al., *Organometallics* 2000, 19, 228-243. Synthesis of bisphenolate yttrium alkyl complexes 2: Cai et al., *Chem. Eur. J.* 2006, 12, 169-179. Synthesis of bisphenolate yttrium alkyl complexes 3: Liu et al., *Organometallics* 2007, 26, 2747-2757).

General Polymerization Procedures.

Polymerizations were performed in 25 mL flame-dried Schlenk tubes interfaced to a dual-manifold Schlenk line using an external cooling bath. The reactor was charged with a predetermined amount of catalyst and/or initiator and solvent (as specified in the polymerization tables) in a glovebox. The reactor was sealed with a septum, taken out of the glovebox, and immersed in the cooling bath. After equilibration at the desired polymerization temperature for 10 min, the polymerization was initiated by rapid addition of MBL via a gastight syringe. After a desired period of time, the polymerization was quenched by addition of 5 mL methanol acidified with HCl (5%). The quenched mixture was precipitated into 100 mL of cold methanol, filtered, washed with methanol to remove any unreacted monomer, and dried in a vacuum oven at room temperature to a constant weight. The results were summarized in Tables Z1 and Z2.

NMR data for the ROP product $P(MBL)_{ROP}$. $^1H$ NMR (400 MHz, DMSO-$d_6$, 298K): δ 6.09 (s, 1H, =$CH_2$), 5.71 (s, 1H, =$CH_2$), 4.20 (t, J=6.1 Hz, 2H, —$CH_2O$—), 2.58 (t, J=6.0 Hz, 2H, —$CH_2$—). $^{13}C$ NMR (100 MHz, DMSO-$d_6$, 298K): δ 165.65 (C=O), 136.32 (=$CH_2$), 127.33 (C=$CH_2$), 62.64 (—$CH_2O$—), 30.76 (—$CH_2$—).

Polymer Characterizations.

The polymers can be analyzed and characterized as described above in Example 1. Additionally, dynamic mechanical analysis (DMA) was performed on $P(MBL)_{ROP}$ thin films (ca. 16×5×0.06 mm) with an RSAG2 analyzer (TA Instruments) in the tension film mode at a maximum strain of 0.3% and a frequency of 1 Hz. The sample was heated from −100° C. to 40° C. at a heating rate of 3° C./min. The DMA $T_g$ was selected as the temperature at the maximum (peak) value of the loss modulus.

Thermodynamic Studies.

In a glovebox under an argon atmosphere, a NMR tube was charged with $La[N(SiMe_3)_2]_3$ (18.6 mg, 0.03 mmol), $Ph_2CHCH_2OH$ (17.8 mg, 0.09 mmol) and 0.34 mL of $CD_2Cl_2$. The NMR tube was sealed with a Precision Seal rubber septum cap and taken out of the glovebox. After completion of alcoholysis in 5 min with occasional shaking, the NMR tube was immersed in a cooling bath at −78° C. (at which temperature MBL was frozen and not polymerized). After equilibration at −78° C. for 10 min, MBL (0.294 g, 3.0 mmol, MBL/La/$Ph_2CHCH_2OH$=100/1/3) was added via a gastight syringe and the NMR tube was brought into a 500 MHz NMR probe precooled to the desired polymerization temperature (−55, −60, and −65° C., respectively). The conversion of the monomer was monitored by $^1H$ NMR at different time intervals until the conversion remained constant.

Post-Polymerization Photocuring and Film Formation.

$P(MBL)_{ROP}$ (300 mg) and DMPA (2 wt. %) was dissolved in 3.0 mL chloroform, and the subsequent solution was filtered through a plastic frit (0.45 μm pore size) to eliminate any undissolved polymer particle. The solution was then transferred into PTFE molds (2×0.5 inches) with a syringe. Each solution (~1 mL) was allowed to slowly evaporate for at least 1 h at room temperature in the dark, after which a translucent and colorless film was formed. The mold was located in the photoreactor chamber (Luzchem, LZC-4 photoreactor with top-irradiation configuration, UVA lamps centered at 350 nm) and irradiated for 10 minutes, after which a gel was formed. The gel was allowed to dry slowly under ambient laboratory conditions overnight and then thoroughly dried in a vacuum oven at room temperature to a constant weight.

Post-Functionalization by the Thiol-Ene "Click" Reaction.

In a typical reaction by a radical photoinitiation, an isolated polymer (100 mg, produced by MBL/2=100/1) was dissolved in 1.5 mL of degassed chloroform inside a glovebox. This solution was filtered through a plastic fit (0.45 μm pore size) to eliminate any possible undissolved polymer particles, and charged in a 20 mL glass vial containing a magnetic stirrer, 0.2 equiv of DMPA, and 5 equiv of p-tert-butylbenzyl mercaptan. The reactor was then taken out of the glovebox, and placed inside a photoreactor (Luzchem, LZC-4 photoreactor with a horizontal UVA lamp configuration, radiation centered at 350 nm) where it was stirred at room temperature for 2 h. At this point, 0.1 mL of the solution was withdrawn and quenched into a 1.5 mL vial containing 0.6 mL of $CDCl_3$ for conversion quantification by $^1H$ NMR. The remaining mixture was precipitated into 100 mL of methanol; the white sticky product was separated and redissolved in 5 mL of $CHCl_3$. Any insoluble particles were removed by filtration and the filtrate was precipitated in methanol. The product was filtered, washed with methanol, and dried in a vacuum oven to a constant weight.

NMR data for $P(MBL)_{ROP}$-SR. $^1H$ NMR (400 MHz, $CDCl_3$, 298 K): δ 7.36-7.08 (m, 4H, Ar-H), 4.25-3.89 (m, 2H, —$OCH_2$—), 3.65 (s, 2H, —$SCH_2Ar$), 2.65 (m, 2H, $CHCH_2S$—), 2.62-6.47 (m, 1H, $CHCH_2S$—), 2.05-1.81 (m, 2H, $CHCH_2CH_2O$—), 1.28 (s, 9H, —$C(CH_3)_3$). $^{13}C$ NMR (100 MHz, $CDCl_3$, 298 K): δ 173.56, 150.15, 134.86, 128.67, 125.60, 62.59, 42.52, 36.37, 34.61, 33.27, 31.49, 30.47.

Reaction of $P(MBL)_{ROP}$ with $La[N(SiMe_3)_2]_3$.

$P(MBL)_{ROP}$ (200 mg, produced by MBL/2=100/1) was dissolved in 0.6 mL $CH_2Cl_2$. A solution of $La[N(SiMe_3)_2]_3$ [28.9 mg, La/$P(MBL)_{ROP}$ (mol/mol)=1/50] in $CH_2Cl_2$ (0.4 mL) was added to the above solution under vigorous stirring. After the measured time interval, a 0.1 mL aliquot was taken from the reaction mixture via syringe and quickly quenched into a 1.5 mL vial containing 0.6 mL of undried "wet" DMSO-$d_6$ with 250 ppm of benzoic acid. The quenched aliquots were later analyzed by $^1$H NMR to obtain the conversion data. After 3 min, the solution became very viscous, and the polymer product precipitated after about 5 min. On the basis of the $^1$H NMR spectra of the reaction mixture, about 64% P(MBL)$_R$OP was depolymerized to MBL in 30 seconds. However, the lanthanum complex can also initiate vinyl-addition polymerization of the MBL generated by depolymerization of P(MBL)$_{ROP}$, so the vinyl-addition polymer P(MBL)$_{ADD}$ was also produced during this process. The reaction was quenched with MeOH/HCl after 2 h, and the isolated product was the mixture of P(MBL)$_{ADD}$ and some cross-linked polymer.

Depolymerization of P(MBL)$_{ROP}$ Solution in the Presence of Catalyst.

P(MBL)$_{ROP}$ (produced by MBL/2=100/1) was dissolved in 0.45 mL "wet" DMSO-$d_6$ in a NMR tube, and the resulting solution was heated to the desired temperature (60, 100 or 130° C.). The degradation reaction was started by rapid addition of a La[N(SiMe$_3$)$_2$]$_3$ solution [0.05 mL "wet" DMSO-$d_6$, P(MBL)$_{ROP}$/La (mol/mol)=100/1] to the above solution. After the desired time, the resulting solution was analyzed by $^1$H NMR to obtain the conversion data. The results were summarized in Table Z3.

Owing to the fact that P(MBL)$_{ROP}$ can undergo cross-linking by heating the bulk polymer, the depolymerization was carried out in solution in the presence of catalyst La[N(SiMe$_3$)$_2$]$_3$. However, in dry DMSO-$d_6$, a mixture of MBL (50.5%) and vinyl-addition polymer P(MBL)$_{ADD}$ (49.5%) was obtained by heating the polymer solution with an initial concentration of 0.2 M at 130° C. for 1 h. To inhibit the vinyl-addition polymerization of MBL, a trace amount of water was added to the DMSO-$d_6$ (3.5 mM). Under such conditions, P(MBL)$_{ROP}$ can be completely recycled back to its monomer MBL. At lower temperature of 60° C., the depolymerization took a longer time (24 h), but nonetheless it reached quantitative conversion to MBL.

The depolymerization was also investigated with a simple catalyst, LaCl$_3$, which is incapable of reinitiating the vinyl-addition polymerization of MBL generated. P(MBL)$_{ROP}$ (produced by MBL/2=100/1) was dissolved in 0.45 mL DMSO-$d_6$ in a NMR tube, and the resulting solution was heated to the desired temperature (130 or 160° C.). The degradation reaction was started by rapid addition of a LaCl$_3$ solution (0.05 mL DMSO-$d_6$) to the above solution. After the desired time, the resulting solution was analyzed by $^1$H NMR to obtain the conversion data. The results were summarized in Table Z4.

Example 4. Butyrolactone Copolymerization

γ-BL/ε-CL, γ-BL/δ-VL and γ-BL/β-BL Copolymerization Behavior.

For γ-BL/ε-CL copolymerization catalyzed by La[N(TMS)$_2$]$_3$, the utilization of polar solvent (THF) resulted in higher activity (higher monomer conversion) but lower monomer incorporation compared to relatively nonpolar solvent (toluene) (Table 4-1, Run 5 vs. 6). The copolymerizations in the presence of BnOH initiator with different ratios exhibited similar monomer conversion and incorporation to that without BnOH initiator (Table 4-1, Runs 5, 7-9). However, the molecular weight of obtained copolymer decreased gradually with increasing BnOH amount from 1 equiv. to 3 equiv. When the γ-BL/ε-CL feed ratio was increased from 1/1 to 5/1, the γ-BL incorporation increased gradually from 17.5 mol % to 35.0 mol % (Table 4-1, Runs 4-5, 10). Carrying out the copolymerization at low temperature (−20° C.) not only led to further increased incorporation but also resulted in significantly enhanced molecular weight of copolymer (Table 4-1, Run 10 vs. 11). Compared to the metal catalytic system, the copolymerization by P$_4$-$^t$Bu organic catalyst with BnOH as the initiator displayed lower activity and lower molecular weight (Table 4-1, Run 4 vs. 15) at room temperature. Note that the activity enhanced significantly once the copolymerization temperature decreased to −20° C. in which quantitative conversion of ε-CL and 50.0% conversion of γ-BL can be achieved in 5 min (Table 4-1, Run 17). In sharp contrast, only 74.3% conversion of ε-CL and 35.0% conversion of γ-BL were obtained even after 24 h for the copolymerization at room temperature (Table 4-1, Run 16). High incorporation of γ-BL up to 51.8 mol % can be easily achieved at relatively low γ-BL/ε-CL feed ratio of 3/1, which is quite different from the metal catalytic system where high incorporation can only be achieved with employing γ-BL in large excess in feed (γ-BL/ε-CL=10/1, Table 4-1, Run 12).

TABLE 4-1

Results of γ-BL/ε-CL Copolymerization[a]

| Run | Cat | M/Cat/I[b] | Temp (° C.) | ε-CL/γ-BL[c] | Sol. | Time (min) | Conv.[d] (ε-CL %) | Conv.[d] (γ-BL %) | Incorp.[d] (γ-BL mol %) | M$_n$[c] (kg/mol) | Đ[e] |
|---|---|---|---|---|---|---|---|---|---|---|---|
| 1 | La | 500/1/- | 25 | 1/- | THF | 0.083 | 98.3 | — | — | — | — |
| 2 | P$_4$-$^t$Bu | 100/1/- | 25 | 1/- | THF | 0.083 | 100 | — | — | — | — |
| 3 | P$_4$-$^t$Bu | 100/1/1 | 25 | 1/- | THF | 0.083 | 80.8 | — | — | — | — |
| 4 | La | 500/1/- | 25 | 1/1 | THF | 2 | 96.9 | 26.7 | 17.5 | 69.5 | 2.05 |
| 5 | La | 500/1/- | 25 | 1/3 | THF | 2 | 92.5 | 17.2 | 31.0 | 40.6 | 2.15 |
| 6 | La | 500/1/- | 25 | 1/3 | TOL | 2 | 68.8 | 11.4 | 35.3 | 30.2 | 1.91 |
| 7 | La | 500/1/1 | 25 | 1/3 | THF | 2 | 100 | 18.4 | 28.7 | 27.6 | 1.82 |
| 8 | La | 500/1/2 | 25 | 1/3 | THF | 2 | 100 | 18.2 | 30.6 | 16.4 | 1.89 |
| 9 | La | 500/1/3 | 25 | 1/3 | THF | 2 | 100 | 15.0 | 29.3 | 11.4 | 1.71 |
| 10 | La | 500/1/- | 25 | 1/5 | THF | 2 | 82.3 | 10.0 | 35.0 | 32.1 | 1.98 |
| 11[f] | La | 500/1/- | −20 | 1/5 | THF | 2 | 55.6 | 9.10 | 45.0 | 59.1 | 1.90 |
| 12[f] | La | 500/1/- | −20 | 1/10 | THF | 180 | 51.6 | 6.00 | 53.8 | 58.0 | 1.92 |
| 13 | P$_4$-$^t$Bu | 100/1/- | 25 | 1/0.5 | THF | 360 | 34.0 | 21.7 | 22.3 | 9.71 | 1.68 |
| 14 | P$_4$-$^t$Bu | 100/1/1 | 25 | 1/0.5 | THF | 90 | 90.3 | 53.2 | 21.5 | 15.8 | 1.73 |

TABLE 4-1-continued

Results of γ-BL/ε-CL Copolymerization[a]

| Run | Cat | M/Cat/I[b] | Temp (° C.) | ε-CL/γ-BL[c] | Sol. | Time (min) | Conv.[d] (ε-CL %) | Conv.[d] (γ-BL %) | Incorp.[d] (γ-BL mol %) | $M_n$[e] (kg/mol) | Đ[e] |
|---|---|---|---|---|---|---|---|---|---|---|---|
| 15 | $P_4$-$^t$Bu | 100/1/1 | 25 | 1/1 | THF | 90 | 74.3 | 35.0 | 29.4 | 9.65 | 1.76 |
| 16 | $P_4$-$^t$Bu | 100/1/1 | 25 | 1/3 | THF | 1440 | 72.7 | 22.0 | 42.4 | 5.25 | 1.59 |
| 17[f] | $P_4$-$^t$Bu | 100/1/1 | −20 | 1/3 | THF | 5 | 100 | 50.0 | 51.8 | 8.90 | 1.91 |

[a] Conditions: La[N(TMS)$_2$]$_3$ (La) = 10 umol, $P_4$-$^t$Bu = 50 umol, [ε-CL + γ-BL] = 6.67M.
[b] BnOH was used as initiator.
[c] Molar ratio of ε-CL/γ-BL in feed.
[d] Monomer conversions and γ-BL incorporation of the copolymer were measured by $^1$H NMR.
[e] Number-average molecular weights ($M_n$) and polydispersity indices (PDI = $M_w/M_n$) were determined by GPC at 40 ° C. in DMF relative to PMMA standards.
[f] [ε-CL + γ-BL] = 10.0M.

The behavior of γ-BL/δ-VL copolymerization was similar to γ-BL/ε-CL copolymerization (Table 4-2). The incorporation of δ-VL can be tuned in a wide range of 8.0-48.5 mol % by changing the conditions (catalytic system, temperature, γ-BL/δ-VL ratio in feed).

TABLE 4-2

Results of γ-BL/δ-VL Copolymerization[a]

| Run | Cat | M/Cat/I[b] | Temp (° C.) | δ-VL/γ-BL[c] | Time (min) | Conv.[d] (δ-VL %) | Conv.[d] (γ-BL %) | Incorp.[d] (γ-BL mol %) | $M_n$[e] (kg/mol) | Đ[e] |
|---|---|---|---|---|---|---|---|---|---|---|
| 1 | La | 500/1/- | 25 | 1/0.5 | 1 | 83.2 | 18.2 | 8.00 | 47.4 | 1.90 |
| 2 | La | 500/1/- | 25 | 1/1 | 1 | 86.5 | 17.5 | 13.5 | 39.1 | 2.33 |
| 3 | La | 500/1/3 | 25 | 1/1 | 1 | 96.3 | 28.1 | 15.1 | 24.0 | 2.50 |
| 4 | $P_4$-$^t$Bu | 100/1/1 | 25 | 1/1 | 5 | 94.6 | 26.6 | 19.8 | 10.2 | 1.71 |
| 5 | $P_4$-$^t$Bu | 100/1/1 | 25 | 1/3 | 30 | 90.2 | 14.4 | 23.7 | 5.28 | 1.70 |
| 6[f] | $P_4$-$^t$Bu | 100/1/1 | −20 | 1/3 | 5 | 100 | 35.0 | 48.5 | 8.33 | 1.88 |

[a] Conditions: La[N(TMS)$_2$]$_3$ (La) = 10 umol, $P_4$-$^t$Bu = 50 umol, [δ-VL + γ-BL] = 6.67M.
[b] BnOH was used as initiator.
[c] Molar ratio of δ-VL/γ-BL in feed.
[d] Monomer conversions and γ-BL incorporation of the copolymer were measured by $^1$H NMR.
[e] Number-average molecular weights ($M_n$) and polydispersity indices (PDI = $M_w/M_n$) were determined by GPC at 40 ° C. in DMF relative to PMMA standards.
[f] [δ-VL + γ-BL] = 10.0M.

Due to a methyl group placed adjacent to the ester group in β-BL, the behavior of γ-BL/β-BL copolymerization was strikingly different from γ-BL/ε-CL and γ-BL/δ-VL copolymerizations. For β-BL homopolymerization, La[1\1(TMS)$_2$]$_3$ has low activity compared to La[N(TMS)$_2$]$_3$/BnOH and $P_4$-$^t$Bu/BnOH catalytic systems (Table 4-3, Runs 1-4). Employing BnOH as initiator, metal catalytic system promoted moderate activity towards γ-BL/β-BL copolymerization (Table 4-3, Runs 5-8), providing copolymer with high incorporation of γ-BL (16.0-46.0 mol %) but with low molecular weight ($M_n$ ≤ 4.11 kg/mol).

TABLE 4-3

Results of γ-BL/β-BL Copolymerization[a]

| Run | Cat | M/Cat/I[b] | Temp (° C.) | β-BL/γ-BL[c] | Time (min) | Conv.[d] (β-BL %) | Conv.[d] (γ-BL %) | Incorp.[d] (γ-BL mol %) | $M_n$[e] (kg/mol) | Đ[e] |
|---|---|---|---|---|---|---|---|---|---|---|
| 1 | La | 500/1/- | 25 | 1/- | 1440 | 16.7 | — | — | — | — |
| 2 | La | 500/1/2 | 25 | 1/- | 60 | 46.5 | — | — | — | — |
| 3 | La | 500/1/3 | 25 | 1/- | 60 | 60.8 | — | — | — | — |
| 4 | $P_4$-$^t$Bu | 100/1/1 | 25 | 1/- | 60 | 83.3 | — | — | — | — |
| 5 | La | 100/1/2 | 25 | 1/1 | 60 | 100 | 27.3 | 27.3 | 3.82 | 1.31 |
| 6 | La | 100/1/3 | 25 | 1/1 | 60 | 100 | 29.4 | 29.4 | 3.16 | 1.30 |
| 7 | La | 100/1/3 | 25 | 1/0.5 | 60 | 100 | 38.5 | 16.0 | 4.11 | 1.22 |
| 8[f] | La | 100/1/3 | −20 | 1/3 | 180 | 85.5 | 18.6 | 46.0 | 2.00 | 1.16 |

[a] Conditions: La[N(TMS)$_2$]$_3$ (La) = 10 umol, $P_4$-$^t$Bu = 50 umol, [δ-VL + γ-BL] = 6.67M.
[b] BnOH was used as initiator.
[c] Molar ratio of β-BL/γ-BL in feed.
[d] Monomer conversions and γ-BL incorporation of the copolymer were measured by $^1$H NMR.
[e] Number-average molecular weights ($M_n$) and polydispersity indices (PDI = $M_w/M_n$) were determined by GPC at 40 ° C. in DMF relative to PMMA standards.
[f] [β-BL + γ-BL] = 10.0M.

Macrostructures of γ-BL/ε-CL, γ-BL/δ-VL and γ-BL/β-BL Copolymers.

Based on $^1$H NMR spectra, the incorporation of monomer can be calculated: γ-BL mol % (γ-BL/ε-CL)=[$I_{2.38ppm}$/($I_{2.38ppm}$+$I_{2.30ppm}$)]×100%; γ-BL mol % (γ-BL/δ-VL)=($I_{1.96ppm}$/$I_{2.32\text{-}2.40ppm}$)×100%; γ-BL mol % (γ-BL/β-BL)=[$I_{4.08ppm}$/($I_{4.08ppm}$+$I_{5.23ppm}$×2)]×100%. $^{13}$C NMR spectra provided more detail information of macrostructure. Taking the γ-BL/ε-CL copolymer as an example, the signal of carbonyl carbon of ε-CL ring-opened structure was split into two peaks, in which the major peak was attributed to CL-CL blocked sequence while the minor peak was attributed to CL-BL alternating sequence. For γ-BL ring-opened structure, a small amount of BL-BL sequence can be detected except BL-CL alternating sequence. Similar structure sequences were also observed for γ-BL/δ-VL and γ-BL/β-BL copolymers.

Thermal Properties of γ-BL/ε-CL, γ-BL/δ-VL and γ-BL/β-BL Copolymers.

DSC curves of γ-BL copolymers are shown in FIG. 13. For γ-BL/ε-CL copolymer, single melting peak can be observed, indicating the homogeneous composition of copolymer. With increasing γ-BL incorporation, $T_m$ value decreased and $T_g$ value increased slightly. Different from γ-BL/ε-CL and γ-BL/δ-VL copolymers, the melting peak is not detectable for γ-BL/β-BL copolymer which only exhibits a $T_g$ at −42° C. (vicious oil due to low molecular weight and non-stereocontrolled β-BL sequence).

Figure 14:
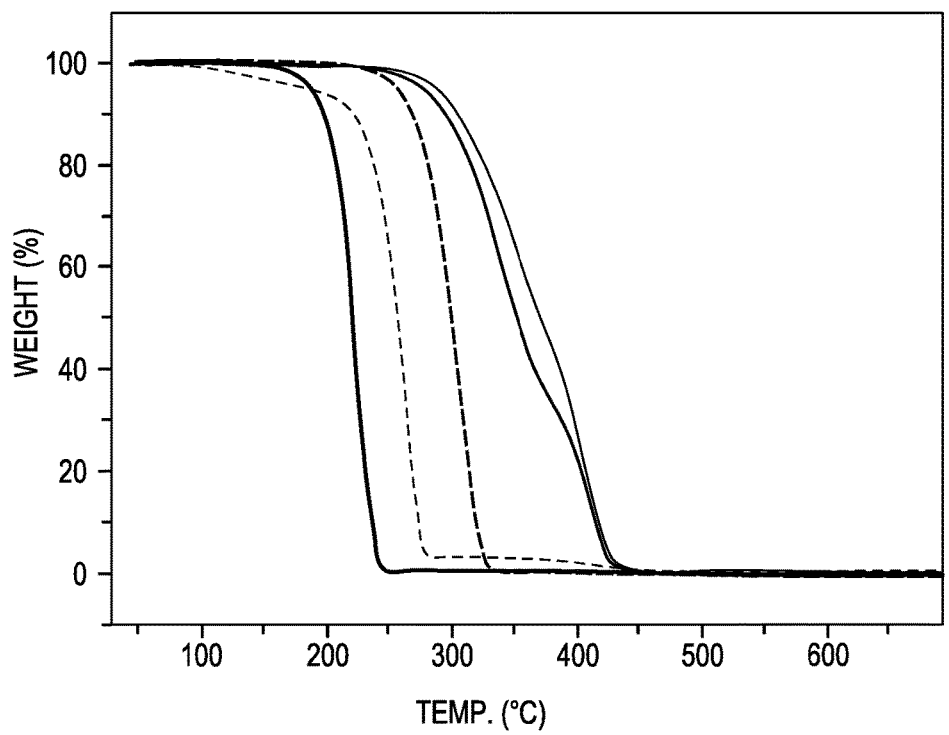
FIG. 14. TGA and DTG curves: (Purple) ε-CL/γ-BLcopolymer (γ-BL mol %=17.5%, Table 4-1, Run 4, T$_{onset}$=280.0° C., T$_{max1}$=340.5° C., T$_{max2}$=409.7° C.); (Black) ε-CL/γ-BLcopolymer (γ-BL mol %=31.0%, Table 4-1, Run 5, T$_{onset}$=256.1° C., T$_{max}$=308.2° C.); (Blue) ε-CL/γ-BLcopolymer (γ-BL mol %=45.0%, Table 4-1, Run 11, T$_{onset}$=287.5° C., T$_{max1}$=347.5° C., T$_{max2}$=406.1° C.); (Red) δ-VL/γ-BL copolymer (γ-BL mol %=13.5%, Table 4-2, Run 2, T$_{onset}$=188.0° C., T$_{max}$=218.3° C.); (Green) β-BL/γ-BL copolymer (γ-BL mol %=16.0%, Table 4-3, Run 7, T$_{onset}$=193.0° C., T$_{max}$=263.5° C.). Key: at 50 Weight (%), far left=red, second from left=green, middle=black, second from right=purple, far right=blue.

FIG. 14 depicts the TGA curves of copolymers. The thermal stability of γ-BL/ε-CL copolymer mainly depends on the molecular weight. For the copolymer with high molecular weight produced at low temperature (γ-BL mol %=45.0%, $M_n$=59.1 kg/mol, Table 4-1, Run 11, $T_{onset}$=287.5° C., $T_{max1}$=347.5° C., $T_{max2}$=406.1° C.) or low γ-BL/ε-CL feed ratio (γ-BL mol %=17.5%, $M_n$=69.5 kg/mol, Table 4-1, Run 4, $T_{onset}$=280.0° C., $T_{max1}$=340.5° C., $T_{max2}$=409.7° C.), two-step degradation profile can be observed in which $T_{max}$ value of the second degradation step is similar to that of PCL homopolymer ($T_{onset}$=363.0° C., $T_{max}$=406.0° C.), indicating that different polymer sequences decompose separately. In contrast, γ-BL/ε-CL copolymer with relatively low molecular weight exhibits one-step degradation profile with relatively low thermal stability (γ-BL mol %=31.0%, $M_n$=40.6 kg/mol, Table 1, Run 5, $T_{onset}$=256.1° C., $T_{max}$=308.2° C.). Different from γ-BL/ε-CL copolymer, γ-BL/δ-VL ($T_{onset}$=188.0° C.) and γ-BL/β-BL ($T_{onset}$=193.0° C.) copolymers exhibit low thermal stability with one-step degradation profile.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A polymer of Formula II:

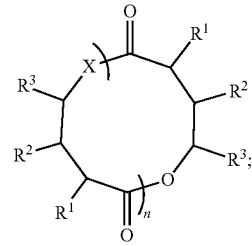

wherein
X is O, S, or $NR^a$ wherein $R^a$ is H, alkyl, or aryl;
$R^1$ is H, alkyl, aryl, methylene (=$CH_2$), or substituted methylene (=$CR_2$ where each R is independently H, alkyl, aryl, substituted alkyl, or substituted aryl);
$R^2$ is H, alkyl, or aryl;
$R^3$ is H, alkyl, or aryl; and
n is about 5 to about 1,000.

2. The polymer of claim 1 wherein n is about 50 to about 300.

3. The polymer of claim 1 wherein X is O.

4. The polymer of claim 1 wherein $R^1$ is methyl.

5. The polymer of claim 1 wherein $R^2$ is methyl.

6. The polymer of claim 1 wherein $R^3$ is methyl.

7. The polymer of claim 1 wherein two of $R^1$-$R^3$ are H.

8. The polymer of claim 1 wherein $R^1$ is methylene or substituted methylene.

9. The polymer of claim 1 wherein $R^1$ is methylene and one or more moieties of the polymer are crosslinked by photocuring or functionalized by thiol-ene reaction.

10. The polymer of claim 1 wherein the polymer is a polymer of Formula III:

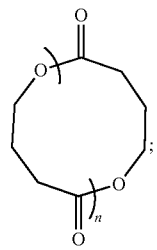

wherein n is about 10 to about 300.

11. A polymer comprising Formula V:

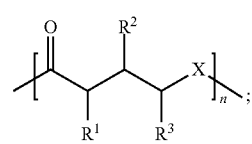

wherein
X is O, S, or $NR^a$ wherein $R^a$ is H, alkyl, or aryl;
$R^1$ is H, alkyl, aryl, methylene (=$CH_2$), or substituted methylene (=$CR_2$ where each R is independently H, alkyl, aryl, substituted alkyl, or substituted aryl);

$R^2$ is H, alkyl, or aryl;
$R^3$ is H, alkyl, or aryl; and
n is about 50 to about 1,000.

12. The polymer of claim 11 wherein the polymer is a polymer of Formula VI:

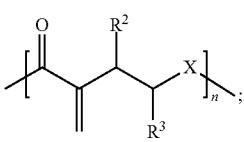

(VI)

wherein
$R^2$ is H and $R^3$ is Me;
$R^2$ is Me and $R^3$ is H; or
$R^2$ and $R^3$ are both H;
wherein
the polymer may be crosslinked by photocuring or functionalized by a thiol-ene reaction.

13. A random copolymer prepared by ring opening copolymerization of a lactone and a compound of Formula X:

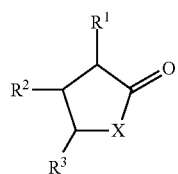

(X)

wherein
X is O, S, or $NR^a$ wherein $R^a$ is H, alkyl, or aryl;
$R^1$ is H, alkyl, aryl, methylene (=$CH_2$), or substituted methylene (=$CR_2$ where each R is independently H, alkyl, aryl, substituted alkyl, or substituted aryl);
$R^2$ is H, alkyl, or aryl;
$R^3$ is H, alkyl, or aryl;
in the presence of a ring-opening catalyst to provide the resulting random copolymer having a number average molecular weight of at least 10 kDa.

14. The copolymer of claim 13 wherein X is O.

15. The copolymer of claim 13 wherein the compound of Formula X is selected from the group consisting of:

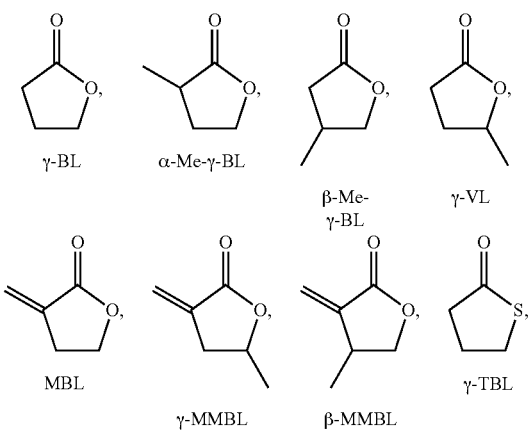

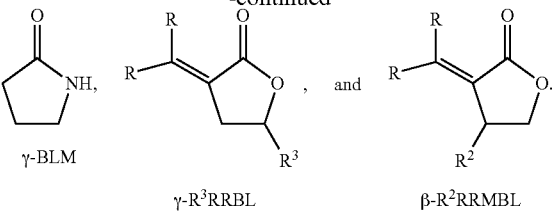

16. A method comprising polymerizing a compound of Formula X by ring-opening polymerization:

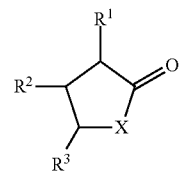

(X)

wherein
X is O, S, or $NR^a$ wherein $R^a$ is H, alkyl, or aryl;
$R^1$ is H, Me, methylene (=$CH_2$), or substituted methylene (=$CR_2$ where each R is independently H, alkyl, aryl, substituted alkyl, or substituted aryl);
$R^2$ is H or Me;
$R^3$ is H or Me;
wherein the polymerization is carried out at about 1 atm and at less than about 25° C. in the presence of a ring-opening catalyst, wherein the ring opening catalyst is a lanthanide homoleptic complex; a yttrium heteroleptic complex; an organometallic catalyst comprising Li, Mg, or Zn; a strong organic base; or an inorganic base;
to provide the resulting ring opened polymer in the form of a linear polymer or cyclic polymer.

17. The method of claim 16 wherein the ring-opening polymerization is carried out under conditions that cause the polymerization product to crystallize or precipitate out of solution during the polymerization.

18. The method of claim 16 wherein the ring-opening catalyst is a lanthanide complex of Formula A:

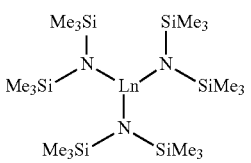

(A)

wherein Ln is La, Y, or Sm, or
a yttrium complex of Formula B:

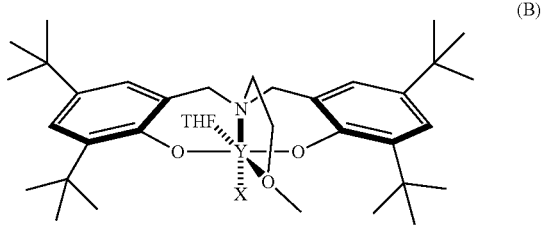

(B)

wherein X is $N(SiHMe)_2$ or $CH_2SiMe_3$.

19. The method of claim 16 wherein the reaction conditions further comprise a protic initiator.

20. The method of claim 16 wherein the ring-opening catalyst is an organometallic catalyst comprising Li, Mg, or Zn selected from RLi, MgR$_2$, LM-X wherein M is Mg or Zn, L is an anionic ligand, and X is R, OR, SR, or NR$_2$, Al(OR)$_3$, and L$_2$AlOR wherein L is an anionic ligand, wherein R is alkyl, aryl, substituted alkyl, or substituted aryl.

21. The method of claim 16 wherein the ring-opening polymerization is carried out below 0° C.

22. The method of claim 16 wherein:
R$^1$ is H, Me, or methylene (=CH$_2$);
R$^2$ is H or Me; and
R$^3$ is H or Me.

23. The method of claim 16 wherein the compound of Formula X is selected from the group consisting of:

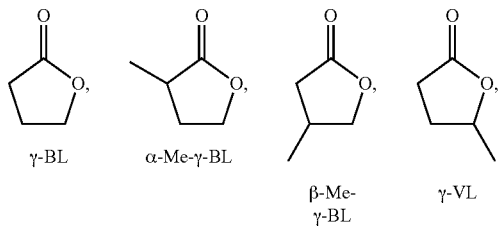

γ-BL    α-Me-γ-BL    β-Me-γ-BL    γ-VL

-continued

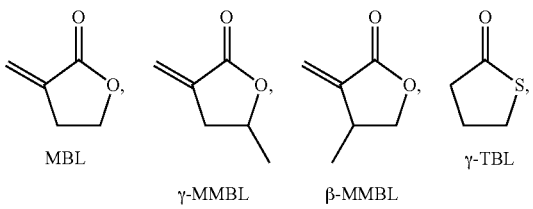

MBL    γ-MMBL    β-MMBL    γ-TBL

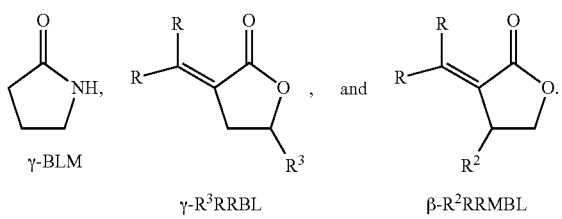

γ-BLM    γ-R³RRBL    and    β-R²RRMBL

* * * * *